(12) United States Patent
Goyal et al.

(10) Patent No.: US 9,531,647 B1
(45) Date of Patent: Dec. 27, 2016

(54) MULTI-HOST PROCESSING

(71) Applicant: Cavium, Inc., San Jose, CA (US)

(72) Inventors: Rajan Goyal, Saratoga, CA (US);
Gregg A. Bouchard, Georgetown, TX (US); Troy S. Dahlmann, Raleigh, NC (US); Jeffrey Richard Hardesty, Apex, NC (US); Karen A. Szypulski, Cary, NC (US)

(73) Assignee: Cavium, Inc., San Jose, CA (US)

( * ) Notice: Subject to any disclaimer, the term of this patent is extended or adjusted under 35 U.S.C. 154(b) by 307 days.

(21) Appl. No.: 13/841,743

(22) Filed: Mar. 15, 2013

(51) Int. Cl.
*G01R 31/08* (2006.01)
*H04L 12/861* (2013.01)

(52) U.S. Cl.
CPC ..................... *H04L 49/90* (2013.01)

(58) Field of Classification Search
CPC .......... H04L 47/10; H04L 47/22; H04L 47/35; H04L 49/90
USPC ..... 370/230, 230.1, 231, 235, 252, 412, 413
See application file for complete search history.

(56) References Cited

U.S. PATENT DOCUMENTS

| | | | | |
|---|---|---|---|---|
| 5,732,286 A | * | 3/1998 | Leger | G06F 5/06 710/56 |
| 5,995,511 A | | 11/1999 | Zhou et al. | |
| 6,108,736 A | * | 8/2000 | Bell | G06F 13/14 709/231 |
| 6,778,530 B1 | | 8/2004 | Greene | |
| 7,277,425 B1 | | 10/2007 | Sikdar | |
| 8,606,959 B2 | | 12/2013 | Goyal et al. | |
| 8,711,861 B2 | | 4/2014 | Goyal et al. | |
| 2002/0138614 A1 | * | 9/2002 | Hall | H04L 29/12009 709/225 |
| 2002/0159480 A1 | * | 10/2002 | Sekihata | H04L 47/10 370/468 |
| 2003/0069933 A1 | * | 4/2003 | Lim | H04L 12/585 709/206 |
| 2003/0225909 A1 | | 12/2003 | Glasco et al. | |
| 2004/0260832 A1 | | 12/2004 | Kota et al. | |
| 2006/0036720 A1 | * | 2/2006 | Faulk, Jr. | H04L 41/0622 709/223 |
| 2006/0136570 A1 | | 6/2006 | Pandya | |
| 2006/0212524 A1 | * | 9/2006 | Wu | H04L 67/10 709/206 |

(Continued)

FOREIGN PATENT DOCUMENTS

| | | |
|---|---|---|
| WO | WO 2011/078812 | 6/2011 |
| WO | WO 2013/019996 | 2/2013 |
| WO | WO 2013/020001 | 2/2013 |

*Primary Examiner* — Ricky Ngo
*Assistant Examiner* — Christine Ng
(74) *Attorney, Agent, or Firm* — Hamilton, Brook, Smith & Reynolds, P.C.

(57) ABSTRACT

A packet processor provides for rule matching of packets in a network architecture. The packet processor includes a lookup cluster complex having a number of lookup engines and respective on-chip memory units. The on-chip memory stores rules for matching against packet data. A lookup front-end receives lookup requests from multiple hosts, manages traffic among the hosts, and processes these lookup requests to generate key requests for forwarding to the lookup engines. As a result of the rule matching, the lookup engine returns a response message indicating whether a match is found. The lookup front-end further processes the response message and provides a corresponding response to the host.

27 Claims, 39 Drawing Sheets

(56) References Cited

U.S. PATENT DOCUMENTS

| | | | |
|---|---|---|---|
| 2007/0118653 A1* | 5/2007 | Bindal | H04L 47/10 709/226 |
| 2008/0031258 A1 | 2/2008 | Acharya et al. | |
| 2008/0086479 A1* | 4/2008 | Fry | G06F 17/30575 |
| 2012/0324108 A1* | 12/2012 | Kohli | H04L 69/16 709/226 |
| 2013/0034100 A1 | 2/2013 | Goyal et al. | |
| 2013/0036152 A1 | 2/2013 | Goyal et al. | |
| 2013/0058332 A1 | 3/2013 | Goyal | |
| 2014/0119378 A1 | 5/2014 | Goyal et al. | |

* cited by examiner

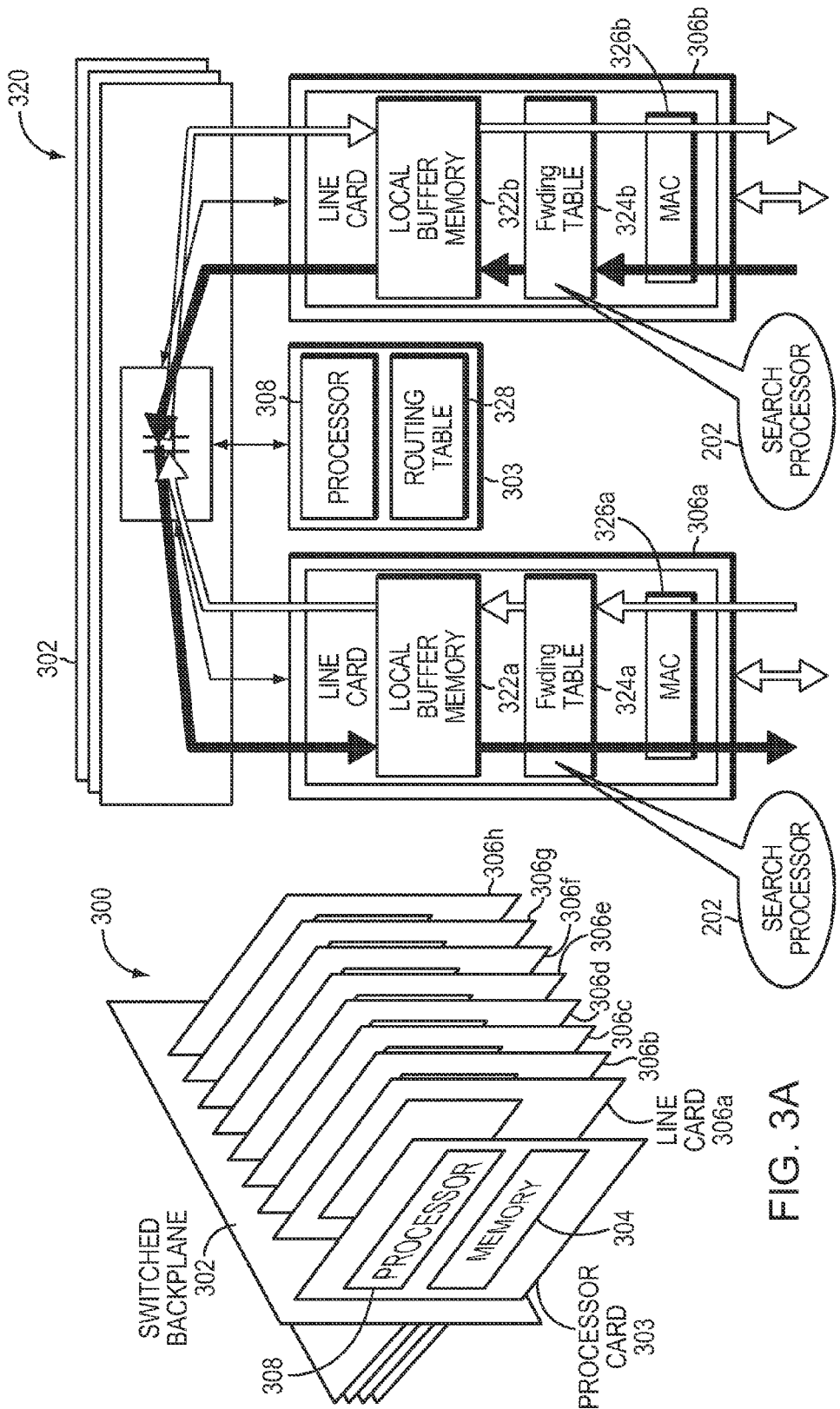

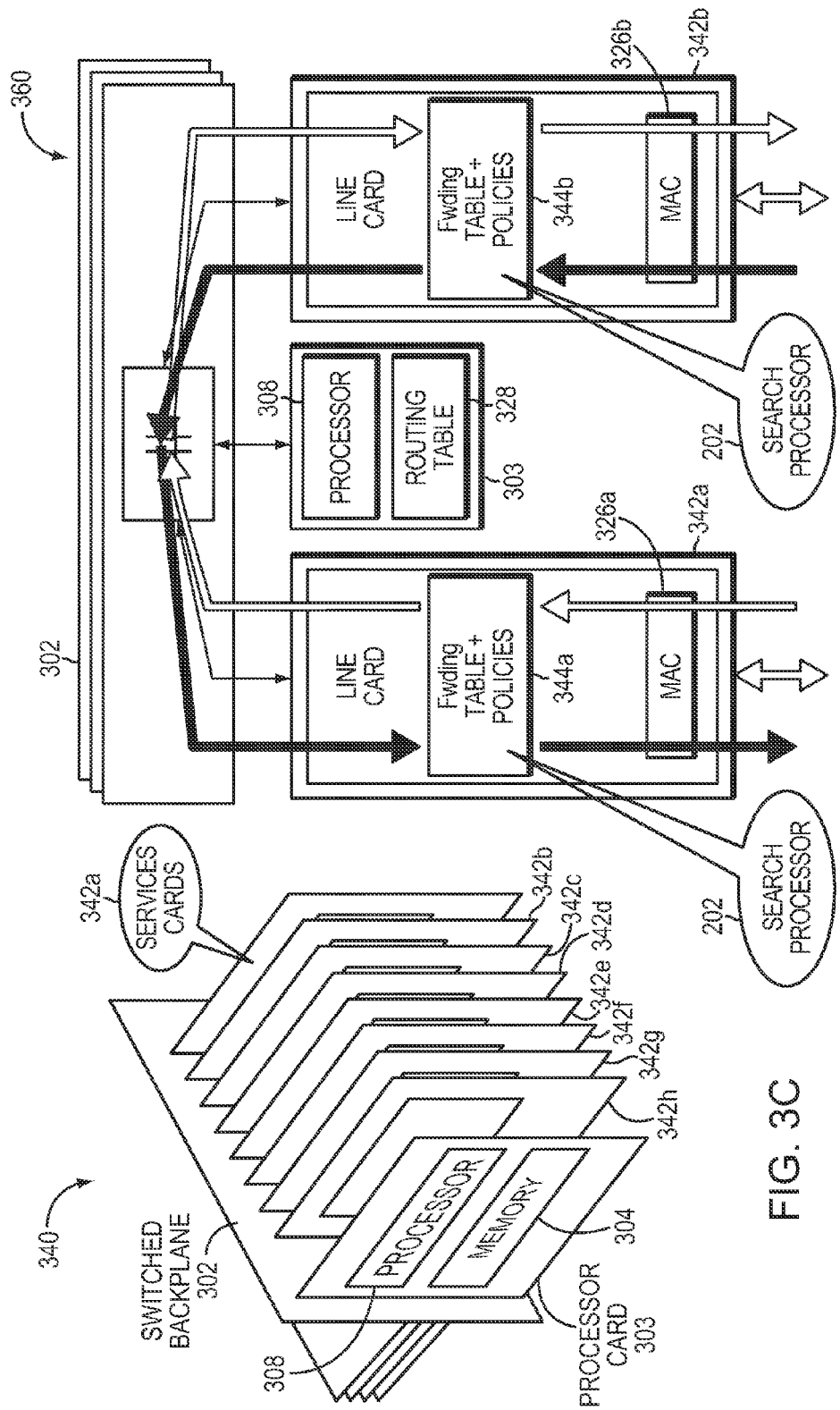

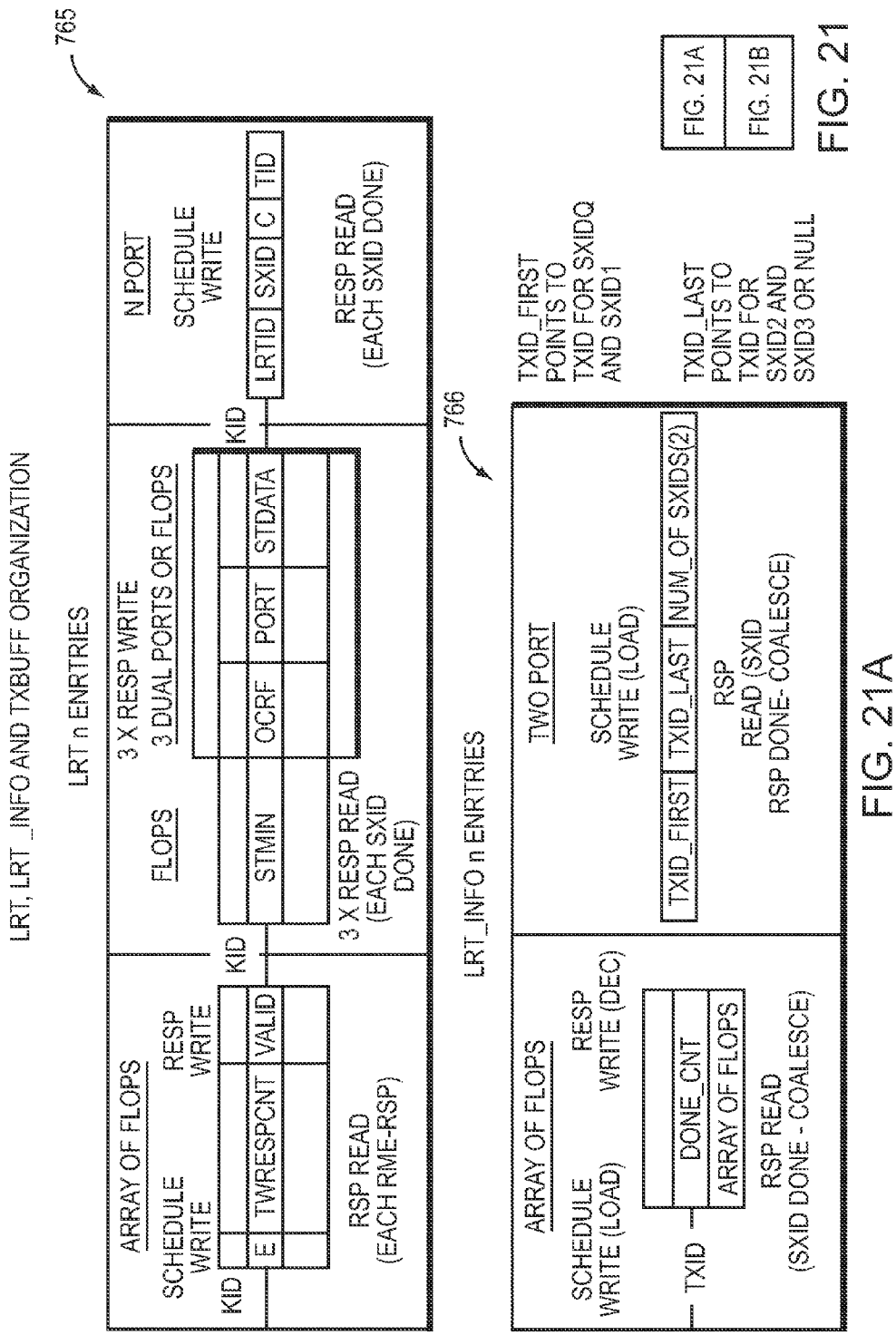

MULTI-HOST PROCESSING

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

Example embodiments of the present disclosure provide methods of processing packets from multiple hosts. The method may be operated by a lookup front-end (LUF) processor that interfaces between multiple host providing lookup requests via packet header data and a search cluster for providing rule-matching of the packet data. Lookup requests are received from a plurality of hosts to a queue register, where each lookup request corresponds to a packet. A count of the number of lookup requests per host in a queue register is maintained by a per-host request counter. The count for each host is compared against a respective input threshold. If the count for the given host exceeds the respective input threshold, additional lookup requests from a given host are prevented until the count returns to below the respective input threshold or below a second, lower threshold.

In further embodiments, lookup responses to be directed to a plurality of hosts are received from a processing cluster, where each lookup response corresponds to a packet. A count of the number of lookup responses per host in an output queue is maintained by a per-host output counter. The count for each host is compared against a respective output threshold. If the count for the given host exceeds the respective output threshold, additional lookup requests from a given host are prevented until the count returns to below the respective output threshold or below a second, lower threshold.

Further embodiments provide an apparatus for processing a packet, including a packet processor to operate rule matching for packets received from a plurality of hosts, as well as an input processor. The input processor includes a queue register, a request counter, a queue manager and a scheduler output manager. The queue register may receive lookup requests from the plurality of hosts, where each lookup request corresponds to a packet. The request counter maintains a request count of the number of lookup requests per host in the queue register. The queue manager compares the request count for each host against a respective input threshold, and further prevents receipt of additional lookup requests from a given host to the queue register in response to the request count for the given host exceeding the respective input threshold. The scheduler output manager forwards the lookup requests from the queue register to the packet processor.

In still further embodiments, the queue register may transmit a message to a given host in response to the request count for the given host exceeding the respective input threshold, where the message indicates to the given host to pause transmission of lookup requests. The queue manager, in response to the request count for the given host returning below the respective input threshold, or falling below a second, lower threshold, may enable receipt of additional lookup requests for the given host. This enabling may be completed by transmitting a message to the given host to resume transmission of lookup requests. The respective input thresholds may be configurable to distinct values among the plurality of hosts.

In yet further embodiments, the apparatus may include an output processor having an output queue, a response counter, a controller, and a scheduler output manager. The output queue may receive an indication of lookup responses from the packet processor for transmission to the plurality of hosts. The response counter may maintain a response count of the number of lookup responses per host in the output queue. The controller may compare the response count for each host against a respective output threshold, and may also prevent receipt of additional lookup requests from a selected host to the queue register in response to the response count for the selected host exceeding the respective output threshold. The scheduler output manager may forward the lookup responses from the output queue to the plurality of hosts.

In still further embodiments, the output queue may transmit a message to a given host in response to the request count for the given host exceeding the respective input threshold, where the message indicates to the given host to pause transmission of lookup requests. The controller, in response to the request count for the given host returning below the respective output threshold, or falling below a second, lower threshold, may enable receipt of additional lookup requests for the given host. This enabling may be completed by transmitting a message to the given host to resume transmission of lookup requests. The respective output thresholds may be configurable to distinct values among the plurality of hosts.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3A is a diagram of an example embodiment of a router architecture.

FIG. 3B is a block diagram illustrating an example embodiment of a router employing a search processor.

FIG. 3C is a block diagram of another embodiment of a router including a switched backplane.

FIG. 3D is a block diagram illustrating an example embodiment of a router employing a search processor.

DETAILED DESCRIPTION

Figure 1:
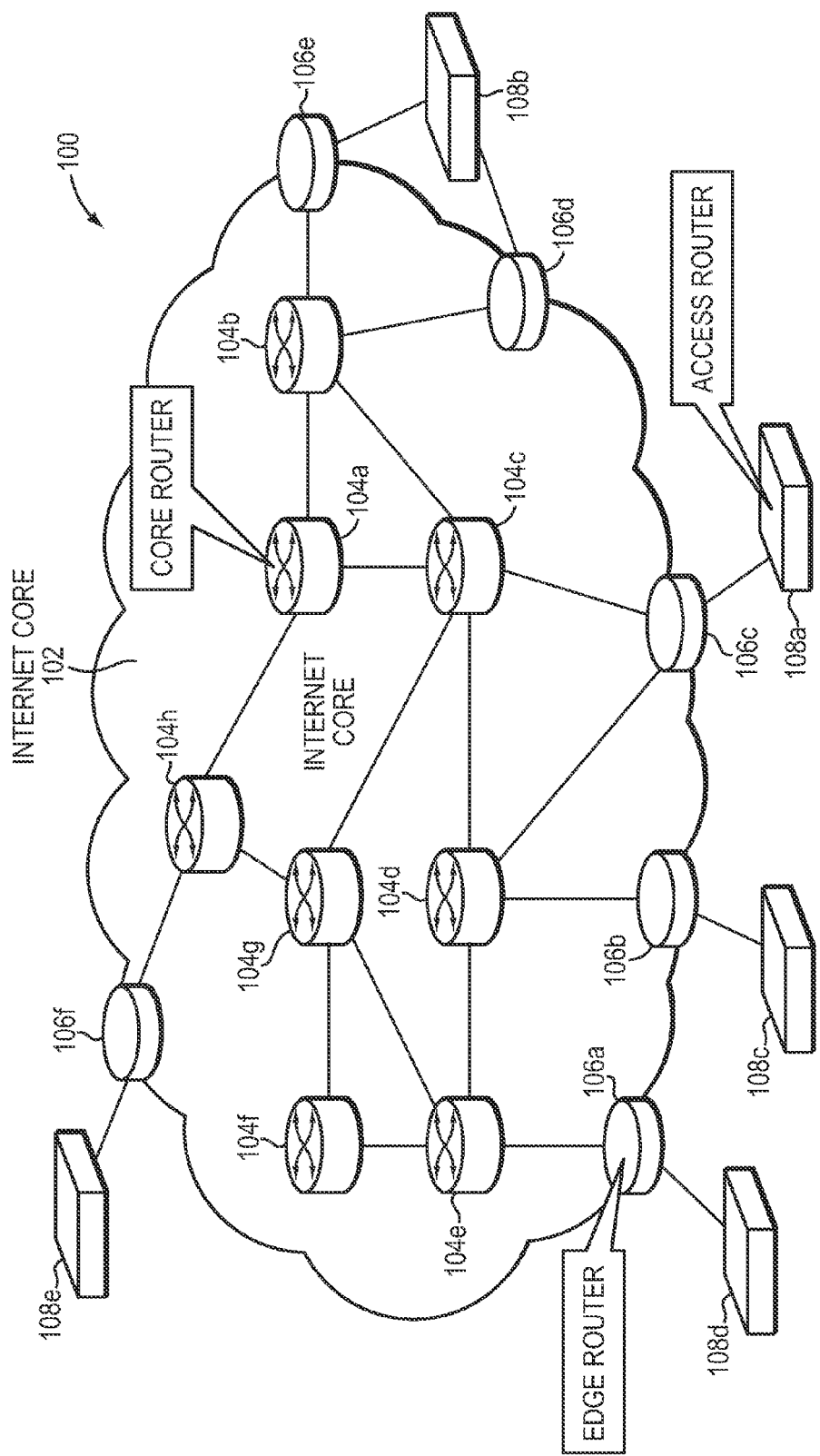
FIG. 1 is a block diagram of a typical network topology including network elements employing example embodiments of a search processor described in this application.

Although packet classification has been widely studied for a long time, researchers are still motivated to seek novel and efficient packet classification solutions due to: i) the continued growth of network bandwidth, ii) increasing complexity of network applications, and ii) technology innovations of network systems.

Explosion in demand for network bandwidth is generally due to the growth in data traffic. Leading service providers report bandwidths doubling on their backbone networks about every six to nine months. As a consequence, novel packet classification solutions are required to handle the exponentially increasing traffics on both edge and core devices.

Complexity of network applications is increasing due to the increasing number of network applications being implemented in network devices. Packet classification is widely used for various kinds of applications, such as service-aware routing, intrusion prevention and traffic shaping. Therefore, novel solutions of packet classification must be intelligent to handle diverse types of rule sets without significant loss of performance.

In addition, new technologies, such as multi-core processors provide unprecedented computing power, as well as highly integrated resources. Thus, novel packet classification solutions must be well suited to advanced hardware and software technologies.

Existing packet classification algorithms trade memory for time. Although the tradeoffs have been constantly improving, the time taken for a reasonable amount of memory is still generally poor.

Because of problems with existing algorithmic schemes, vendors use ternary content-addressable memory (TCAM), which uses brute-force parallel hardware to simultaneously check packets against all rules. The main advantages of TCAMs over algorithmic solutions are speed and determinism (TCAMs work for all databases).

A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleen star '*'. In operation, a whole packet header can be presented to a TCAM to determine which entry (rule) it matches. However, the complexity of TCAMs has allowed only small, inflexible, and relatively slow implementations that consume a lot of power. Therefore, a need continues for efficient algorithmic solutions operating on specialized data structures.

Current algorithmic methods remain in the stages of mathematical analysis and/or software simulation (observation based solutions).

Proposed mathematic solutions have been reported to have excellent time/special complexity. However, methods of this kind have not been found to have any implementation in real-life network devices because mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these algorithmic methods generally only work well with specific type of rule sets. Because packet classification rules for different applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to according to criteria on 'F' fields of the packet header and associates an identifier (e.g., class ID) with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier determines the rules relative priority. In other words, a packet that matched multiple rules belongs to the class identified by the identifier (class ID) of the rule among them that appears first in the classifier.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Decision trees may be used to select match a received packet with a rule in a classifier table to determine how to process the received packet.

FIG. 1 is a block diagram 100 of a typical network topology including network elements employing example embodiments of a search processor. The network topology includes an Internet core 102 including a plurality of core routers 104a-h. Each of the plurality of core routers 104a-h are connected to at least one other of the plurality of core routers 104a-h. Core routers 104a-h that are on the edge of the Internet core 102 (i.e., core routers 102b-e and 102h) are coupled with at least one edge router 106a-f. Each edge router 106a-f is coupled to at least one access router 108a-e.

The core routers 104a-h are configured to operate in the Internet core 102 or Internet backbone. The core routers 104a-h are configured to support multiple telecommunications interfaces of the Internet core 102 and are further configured to forward packets at a full speed of each of the multiple telecommunications protocols.

The edge routers 106a-f are placed at the edge of the Internet core 102. Edge routers 106a-f bridge access routers 108a-e outside the Internet core 102 and core routers 104a-h in the Internet core 102. Edge routers 106a-f can be configured to employ a bridging protocol to forward packets from access routers 108a-e to core routers 104a-h and vice versa.

The access routers 108a-e can be routers used by an end user, such as a home user or an office, to connect to one of the edge routers 106a-f, which in turn connects to the Internet core 102 by connecting to one of the core routers 104a-h. In this manner, the edge routers 106a-f can connect to any other edge router 106a-f via the edge routers 106a-f and the interconnected core routers 104a-h.

The search processor described herein can reside in any of the core routers 104a-h, edge routers 106a-f, and access routers 108a-e. The search processor described herein, within each of these routers, is configured to analyze Internet protocol (IP) packets based on a set of rules and forward the IP packets along an appropriate network path.

Figure 2A:
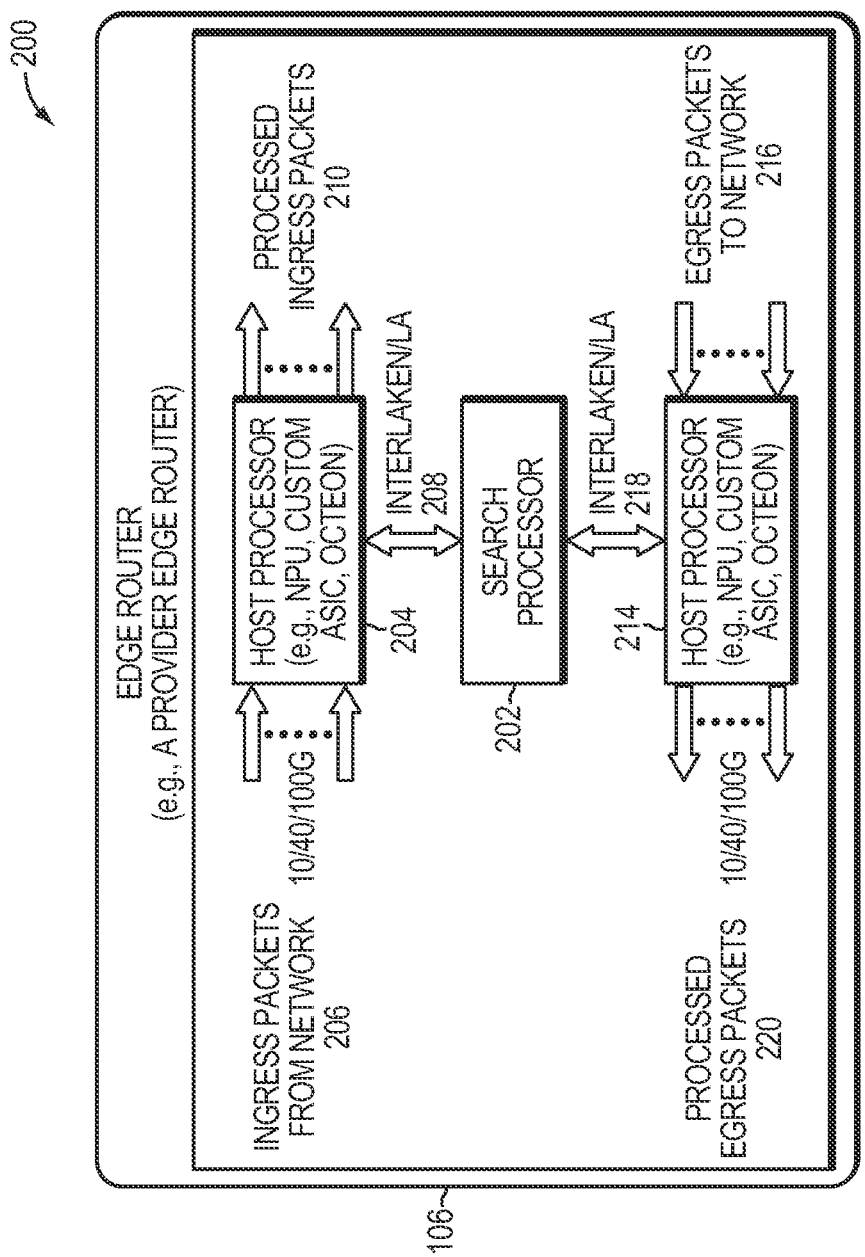
FIGS. 2A-2C are block diagrams illustrating example embodiments of a search processor employed in routers.

FIG. 2A is a block diagram 200 illustrating an example embodiment of a search processor 202 employed in an edge router 106. An edge router 106, such as a provider edge router, includes the search processor 202, a first host processor 204 and a second host processor 214. The first host processor 204 is configured as an ingress host processor. The first host processor 204 receives ingress packets 206 from a network. The first host processor 204 forwards a lookup request including a packet header (or field) from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. The second host processor 214 receives egress packets to send from the network 216. The second host processor 214 forwards a lookup request with a packet header (or field) from the egress packets 216 to the search processor 202 over a second Interlaken interface 218. The search processor 202 then processes the packet header using a plurality of rule processing engines employing a plurality of rules to determine a path to forward the packets on the network. The second host processor 214 forwards the processed ingress packets 220 to another network element in the network.

Figure 2B:
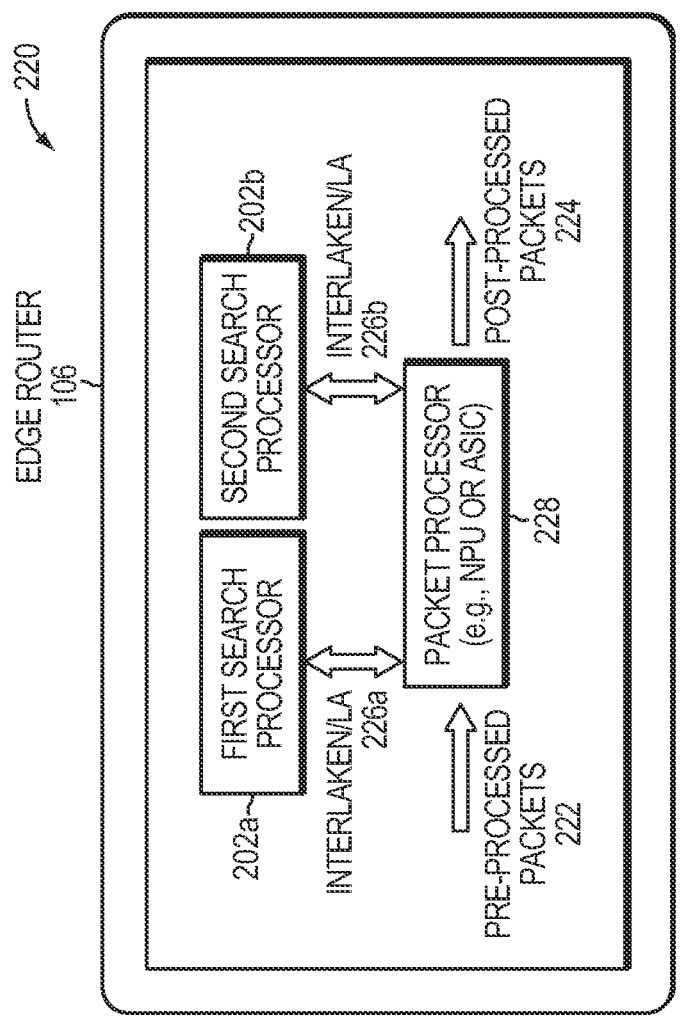

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The plurality of search processors 202a-b are coupled to a packet processor 228 using a plurality of Interlaken interfaces 226a-b, respectively. The plurality of search processors 202a-b can be coupled to the packet processor 228 over a single Interlaken and interface. The edge router 106 receives a lookup request with a packet header (or fields) of pre-processed packets 222 at the packet processor 228. One of the search processors 202a-b searches the packet headers for an appropriate forwarding destination for the pre-processed packets 222 based on a set of rules and data within the packet header, and responds to the lookup request to the packet processor 228. The packet processor 228 then sends the post processed packets 224 to the network based on the lookup request performed by the search processors 202a-b.

Figure 2C:
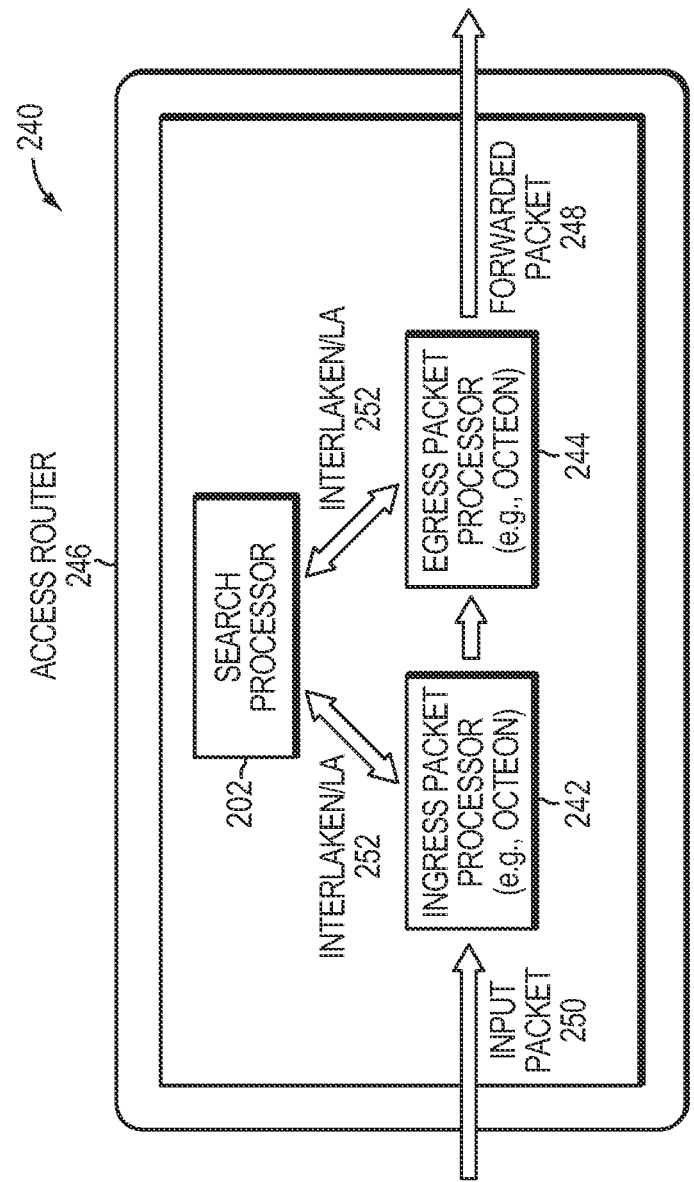

FIG. 2C is a block diagram 240 illustrating an example embodiment of an access router 246 employing the search processor 202. The access router 246 receives an input packet 250 at an ingress packet processor 242. The ingress packet processor 242 then forwards a lookup request with a packet header of the input packet 250 to the search processor 202. The search processor 202 determines, based on packet header of the lookup request, a forwarding path for the input packet 250 and responds to the lookup requests over the Interlaken interface 252 to the egress packet processor 244. The egress packet processor 244 then outputs the forwarded packet 248 to the network.

FIG. 3A is a diagram 300 of an example embodiment of a router architecture. The router architecture includes a switched backplane 302 coupled with a processor card 303 that includes a processor 308 and a memory 304. The switched backplane 302 is further coupled with a plurality of line cards 306a-h. Each line card 306a-h includes a search processor as described herein.

FIG. 3B is a block diagram 320 illustrating an example embodiment of a router employing the search processor 202. The router includes the switched backplane 302 which is coupled to the line cards 306a-b and the processor card 303. The processor card 303 includes a processor 308 and a routing table 328, which can be stored in the memory 304 of the processor card 303. Each line card 306a-b includes a respective local buffer memory 322a-b, a forwarding table 324a-b, and a media access control (MAC) layer 326a-b. The search processor 202 exists within the forwarding table 324a-d of the line card 306a-b.

As an example, a packet is received by the line card 306a at the MAC layer 326a. The MAC layer 326a sends the packet to the forwarding table 324a. Then, the packet and appropriate forwarding table information is stored in the local buffer memory 322a. The processor card 303 then accesses its routing table 328 to determine where to forward the received packet. Based on the determination, the router selects an appropriate line card 306b, stores the packet and forwarding information in the local buffer memory 322b of the appropriate line card, and forwards the packet out to the network.

FIG. 3C is a block diagram 340 of another embodiment of a router including the switched backplane 302. The switched backplane 302 is coupled to the processor card 303, the line cards 342b-h, and a service card 342a. The processor card 303 includes the memory 304 and the processor 308. The service card 342a is a type of line card 342b-h. Further, the search processor described herein can also exist on the service card 342a.

FIG. 3D is a block diagram 360 illustrating an example embodiment of a router employing the switched backplane 302. The switched backplane 302 is coupled with the processor card 303 and the service card 342a or line cards 342b-h. The line cards 342a-b can either be a service card 342a or line card 342b-h. The line card 342a-b includes a forwarding table and corresponding policies module 344a-b, and a MAC layer 326a-b. The search processor 202 is included in the line card 342a-b. The line card 342a receives a packet from a network through the MAC layer 326a at the forwarding table and policies module 344a. The search processor 202 processes the packet according to the forwarding table and policies module 344a according to the routing table 328 in the processor card 303 and forwards the packet to an appropriate line card 342b to be forwarded into the network.

Figure 4A:
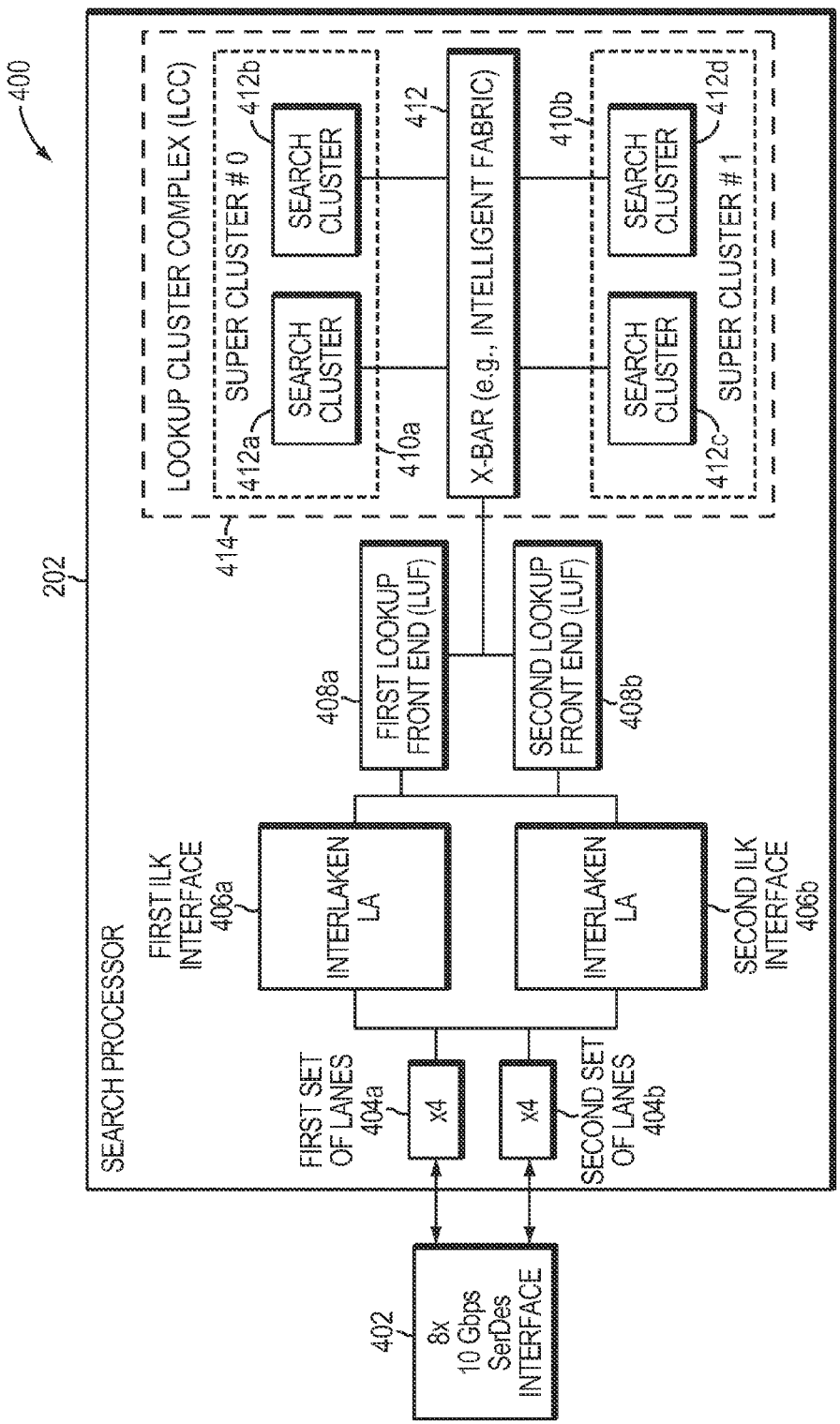
FIGS. 4A-B are block diagrams of example embodiments of a search processor.

FIG. 4A is a block diagram 400 of an example embodiment of the search processor 202. The search processor 202 is coupled with a serializer/deserializer (SerDes) interface 402. In one embodiment, the SerDes interface 402 includes eight transport lanes capable of data transfer speeds of up to at least 10 Gb per second. The search processor 202 includes two sets of quad lane interfaces 404a-b coupled with the SerDes interface 402. Each of the quad lanes interfaces 404a-b are coupled with a first Interlaken interface 406a and a second Interlaken interface 406b. The Interlaken interfaces 406a-b are then coupled with a first lookup front end (LUF) 408a and a second look up front end (LUF) 408b. The LUFs 408a-b are coupled with a crossbar 412 (also described as an intelligent fabric or 'X-bar').

The crossbar 412 is coupled with a first super-cluster 410a and a second super-cluster 410b. Within each super-cluster 410a-b are a plurality of search blocks 412a-d. Each search block 412, or search cluster, is configured to receive a key from a received packet, determine and load a set of rules to process the key, and output results of the search executed using those rules. The crossbar 412 and the super-clusters 410a-b are part of a lookup cluster complex (LCC) 414.

Figure 4B:
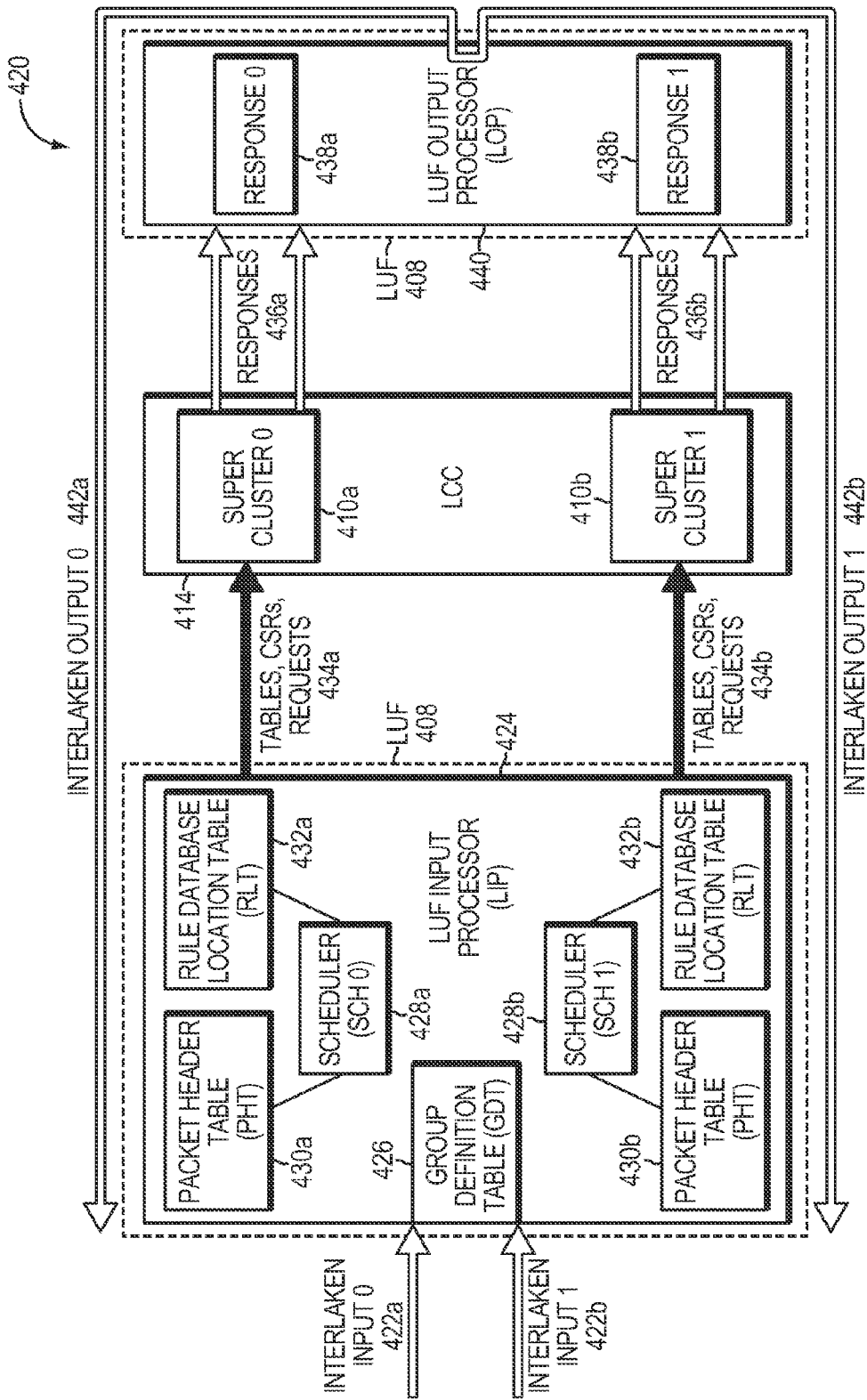
Figure 4C:
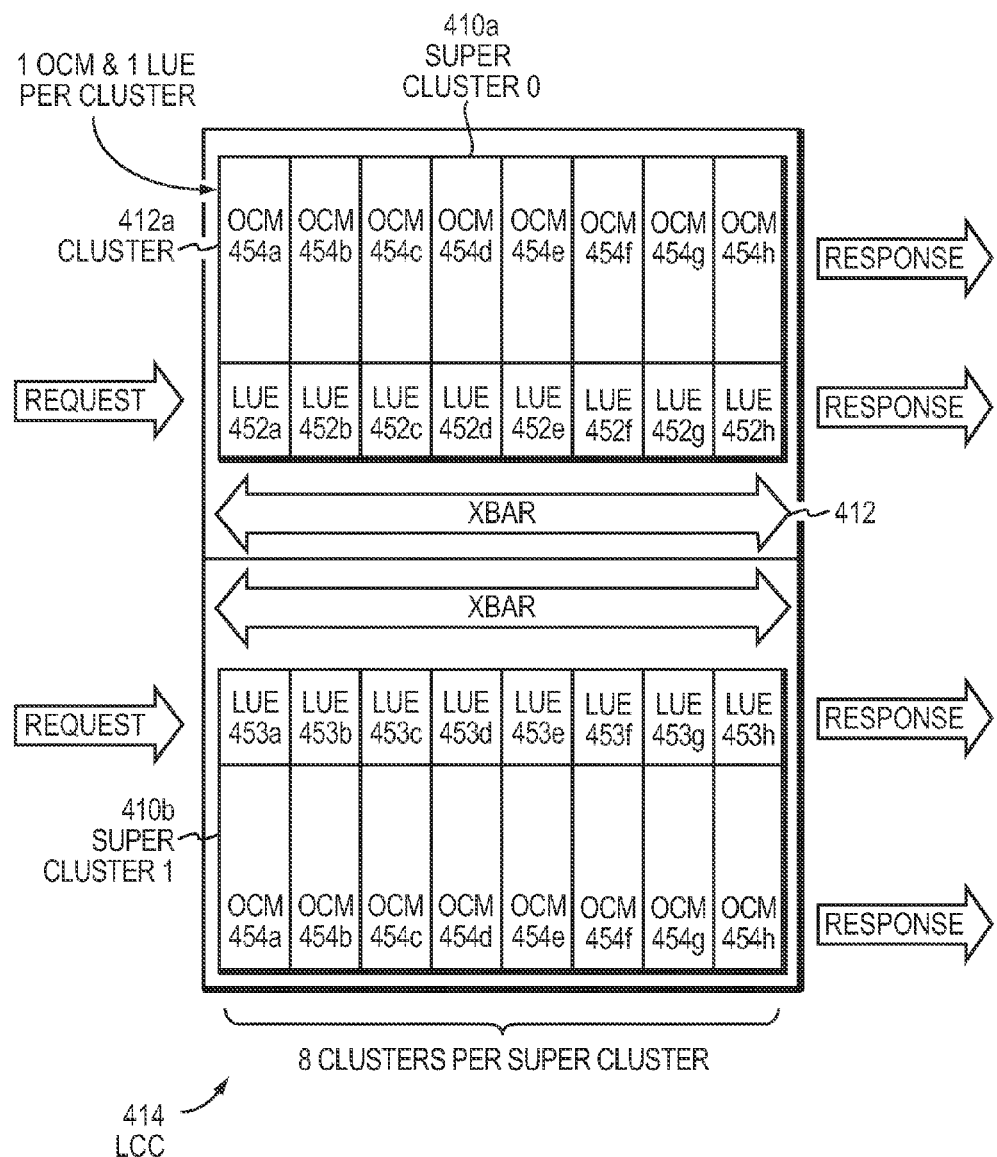
FIG. 4C is a block diagram of a Lookup Cluster Complex (LCC) in one embodiment.

FIG. 4B is a block diagram 420 of an example embodiment of the search processor described herein. The search processor includes the LUF 408 as shown as being a LUF input processor (LIP) 424 and a LUF output processor (LOP) 440. The processor further includes the LCC 414, which includes super-clusters 410a-b. The LIP 424 receives an Interlaken input 422a and Interlaken input 422b. The LIP 424 includes a scheduler 428a-b, packet header tables 430a-b, rule database location table 432a-b and a group definition table 426. The LIP 424 generates tables, CSRs, and requests 434a-b to the LCC 414. The LCC 414, based on the super-clusters 410a-b and the search clusters (not shown) therein, generate responses 436a-b. The LOP 440 then receives the responses and outputs them over Interlaken output 442a and Interlaken output 442b.

The processor described herein loads one or more rules (e.g., matching rules) that match a packet. In general, a packet may be broken down into parts, such as a header, a payload, and a trailer. The header of the packet (or packet header) may be further broken down into fields, for example. So, the processor may further find one or more rules that match one or more parts (or fields) of the packet.

The processor can execute a "lookup request," which finds one or more rules matching a packet or parts of a packet. The lookup request first leads to finding one or more matching rules.

From the standpoint of the processor described herein, executing a lookup request begins with 1) receiving the lookup request from a host processor. The lookup request includes a packet header and group identifier (GID).

2) The GID indexes to an entry in a global definition/ description table (GDT). Each GDT entry includes (a) n number of table identifiers (TID), (b) a packet header index (PHIDX), and (c) key format table index (KFTIDX).

3) Each TID indexes an entry in a tree location table (TLT). Each TLT entry identifies which lookup engine or processor core looks for the one or more matching rules. In this way, each TID specifies both which lookup engine or processor core looks for the one or more matching rules and where the particular one or more matching rules are stored.

4) Each TID also indexes an entry in a tree access table (TAT). Each TAT entry provides the starting address (e.g., a root node) in memory of a collection of rules (or pointers to rules) called a table or tree of rules. The terms table of rules, tree of rules, table, or tree are used interchangeably throughout the Application. In all, the TID identifies the TAT, which identifies the collection or set of rules in which to look for one or more matching rules.

5) The PHIDX of the GDT entry indexes an entry in a packet header table (PHT). Each entry in the PHT instructs the processor how to extract n number of keys from the packet header.

6) The KFTIDX of the GDT entry indexes an entry in a key format table (KFT). Each entry in the KFT provides instructions for extracting one or more fields (i.e., parts of the packet header) from each of the n number of keys extracted from the packet header.

7) The processor looks for subsets of the rules using each of the fields extracted from the packet together with each of the TIDs. Each subset contains rules that may possibly match each of the extracted fields.

8) The processor then compares each rule of each subset against an extracted field. The processor provides rules that match in responses or lookup responses.

The above description of a lookup request and its enumerated stages are described to present concepts of lookup requests. These concepts may be implemented in numerous ways. For example, according to example embodiments of the present invention, these concepts may be implemented by a search processor.

As described above, the search processor processes a lookup request for a packet. In processing the lookup request, the processor can extract a header or field from the packet that is then applied to one or more rules. The header or field can be referred to as a key.

The search processor stores at least one tree of rules. In one embodiment, the tree of rules is a memory structure employed by the processor to narrow down a set of rules for a given key and a rule is a test of a value of a key. The tree has a root node, or a starting address. The search processor uses a tree walk engine (TWE) to traverse the tree for a particular key. The TWE eventually reaches a pointer to a memory address in the tree. The pointer can be either to a bucket of rules or a pointer to rules in memory directly.

A bucket of rules is a set of pointers to rules. If the pointer is to a bucket of rules, a bucket walk engine (BWE) determines, based on the key and the bucket, a pointer to rules in a memory, such as an on chip memory. A group of rules in memory is called a chunk. The chunk can be sequentially addressed rules or rules grouped in another manner. If the pointer is to rules in the memory directly, the pointer may point directly to the chunk.

Once the processor loads the chunk of rules from memory, it sends the key and the chunk of rules to a rule match engine (RME). The RME determines whether the key matches rules within the chunk. Then, the RME and the search processor can respond to the lookup request with the selected rule and match result.

Figure 4D:
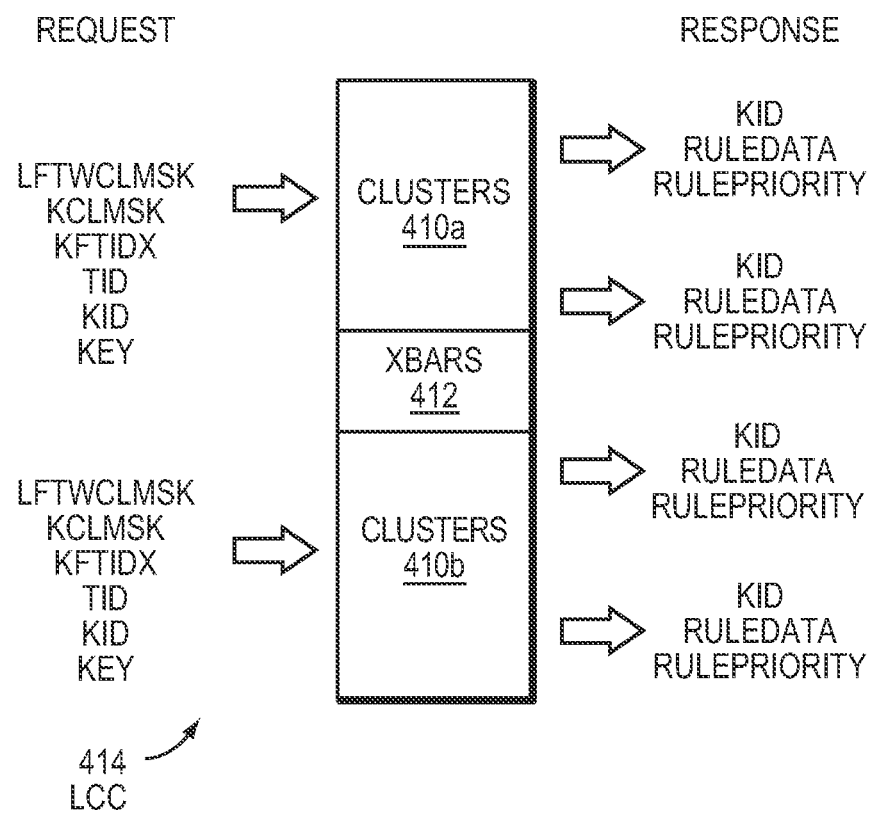
FIG. 4D is a block diagram illustrating input and output data at a LCC in one embodiment.

FIG. 4D is a block diagram illustrating input and output data at a LCC 414 in one embodiment. The LCC 414 may be configured to receive, in a lookup request or other communication, the following information:

1) Least Full Cluster Mask (LFTWCLMSK) is the bit mask used to select which clusters to enable per Super Cluster for a given search.
2) Key Cluster Mask (KCLMSK) indicates which clusters within the LCC must accept key request data. The KCLMSK allows clusters, which may not be involved at the beginning of the search, to perform the final portions of processing. The Xbar segments within the Super Clusters allow searches to migrate from one cluster to another. The KCLMSK informs all the clusters that may potentially be involved.
3) Tree ID (TID) & Key Format Index (KFTIDX) together with the masks select tree roots where execution (walking a tree or RCDS representing a set of rules) begins.
4) Key ID (KID) is maintained such that the LUF may track in-flight inventory and match returns to requests.
5) KEY is the data extracted from the header tuples to search the trees or RCDS for.

The search processor provides a method to launch from 1 to 4 searches off of a single packet header. Each of these requests may search completely different and completely independent field sets within the headers. The searches are in every way independent searches with the caveat that they are related to the same packet header. The search fabric (LCC) treats them as completely different searches and has no knowledge (other than passing sub-key IDs in and out) of the initial request expansion.

Further, the LCC 414 may be configured to output, in a response to a lookup request or other communication, the following information:

1) KID is the returned Key ID
2) RuleData is part of the response back to the host
3) RulePriority is a metric associated with a sub-tree (or sub-RCDS) response allowing the LUF to select the single best response from multiple cluster returns. MinRule is also part of the response back to the host.

Multiple response messages corresponding to a common packet, when passed back to the host, may share a common ID and are coalesced to produce the multiple responses per clock to achieve the desired throughput. The responses need not be coalesced but more efficient use of interface bandwidth is attained if the responses are coalesced. In an example embodiment, between one and four responses may be coalesced into a response message, matching the number of requests in the originating search request.

Figure 5:
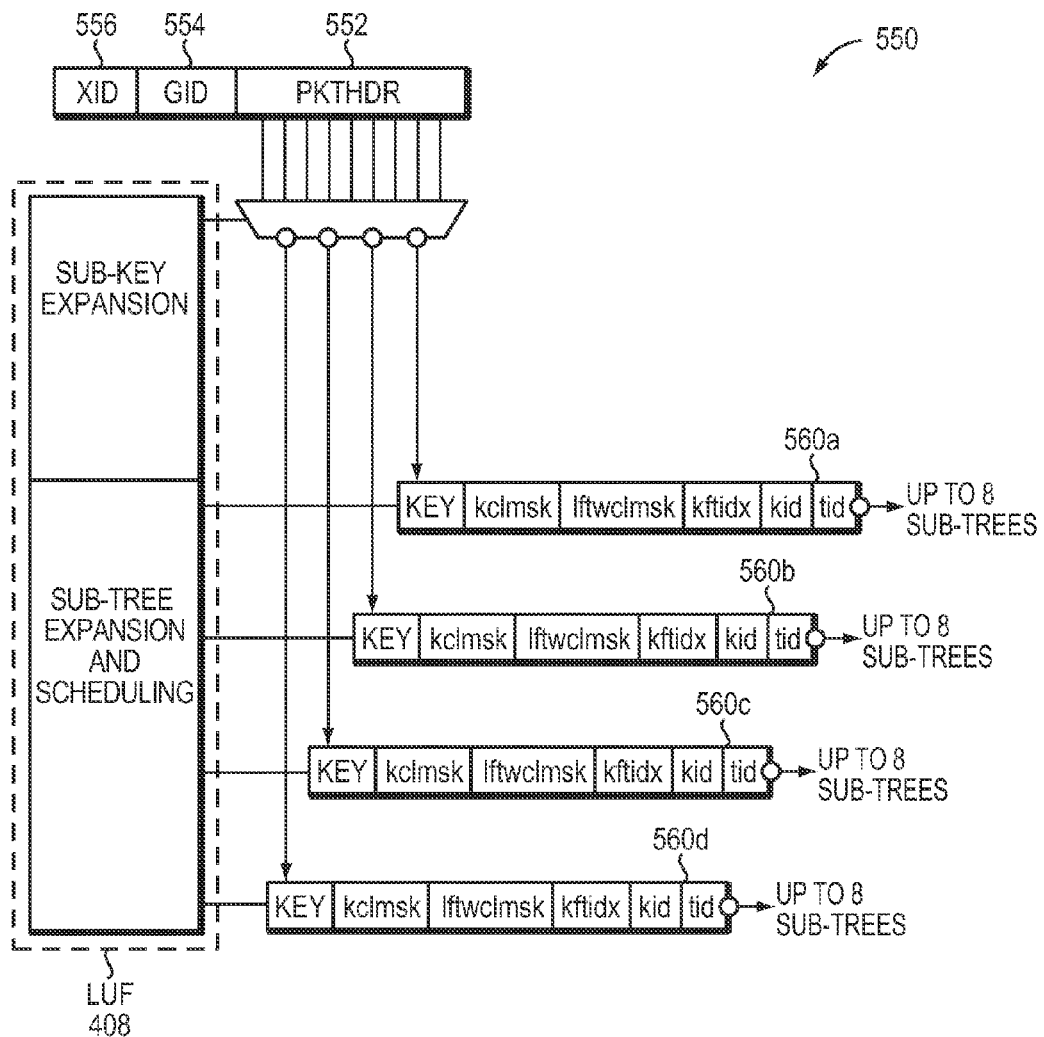
FIG. 5 is a block diagram illustrating generation of multiple lookup requests from a single packet header.

FIG. 5 is a block diagram illustrating generation of multiple key requests from a single lookup request 550. A lookup request 550, including packet header 552, arrives at a LUF 408 across the command interface. The Group ID (GID) 554 field indexes various internal LUF 408 tables and allows the LUF 408 to generate up to 4 different key requests 560*a-d* having distinct keys (also referred to as "sub-keys"), which can be used to initiate four independent searches. In an example embodiment, a key of a key request 560*a* can be up to 476 bits wide, while the packet header 552 can be up to 512 bits wide. The keys can be reconstructed on a nibble granularity basis, and can be completely reordered by the customer application layer. In an example embodiment, the search processor can pre-store up to 16 ways of key reconstruction.

A sub-key expansion index module of the LUF 408 determines how the packet header 552 is to be divided into a plurality of sub-keys for the respective key requests 560a-d. After expanding the packet header 552 into a plurality of sub-keys, a subtree expansion and scheduling module of the LUF 408 directs each of the key requests 560a-d to an appropriate part of the search processor.

Downstream of the sub-key expansion, the LUF 408 schedulers choose the clusters to perform multiple sub-RCDS walks per sub-key, for example. Each of the sub-keys is considered an individual search sharing a common XID 556 eventually returned to the host but not used internally. Thus, the LUF 408 expands and tracks 4 sub-keys relative to a single request.

Figure 6:
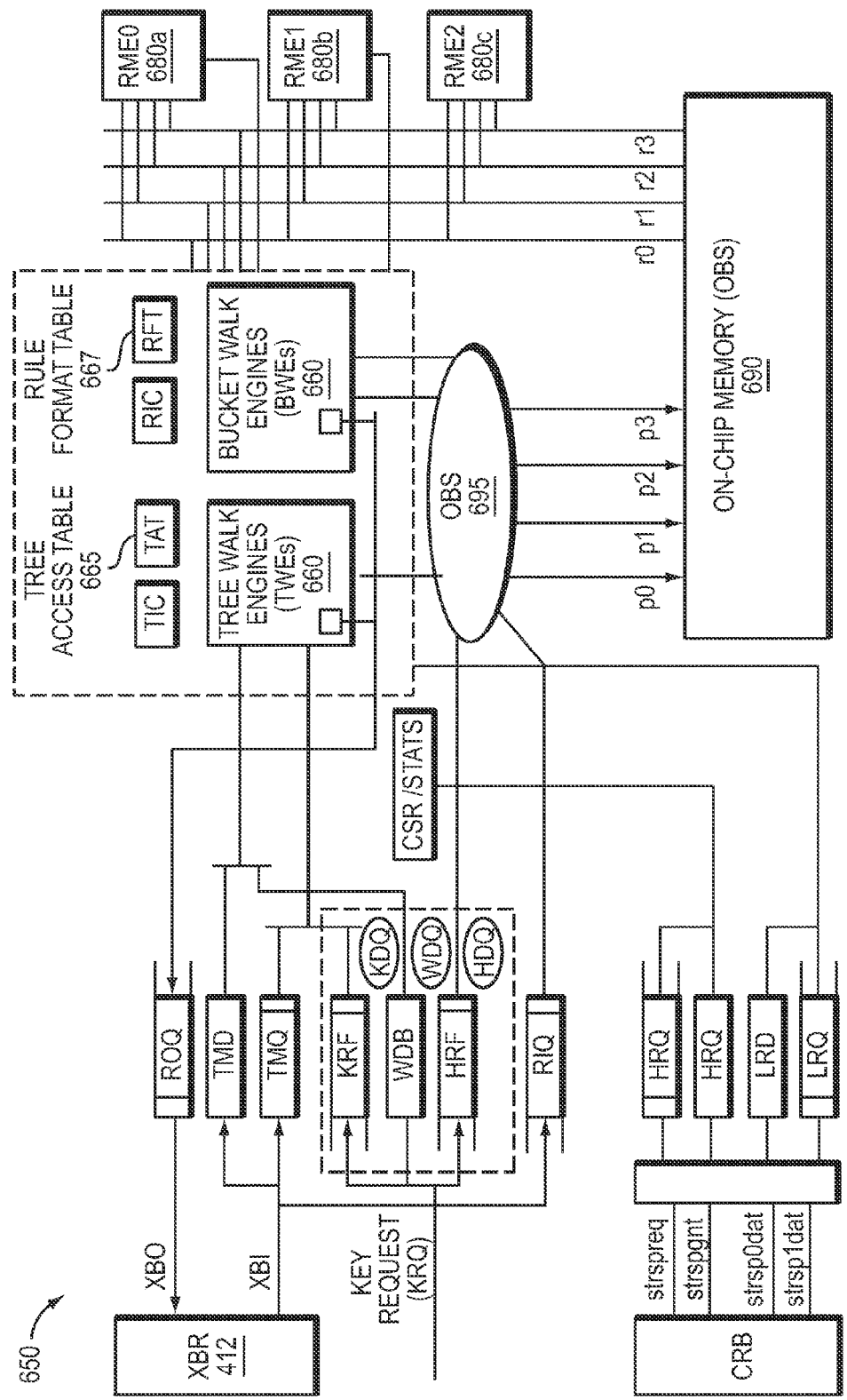
FIG. 6 is a block diagram of a Lookup Engine (LUE) and associated on-chip memory (OCM) in one embodiment.

FIG. 6 is a block diagram of a Lookup Engine (LUE) 650 and associated on-chip memory (OCM) 690 in one embodiment. The LUE 650 may be implemented in the search processor and LCC configurations described above with reference to FIGS. 4A-D. According to one embodiment, for rule processing, the LUE 650 includes a complex of one or more tree walk engines (TWEs) 660, a complex of one or more bucket walk engines (BWEs) 670, and rule match engines (RMEs) 680a-c. In another embodiment in which rule processing is extended to external memory (described below), the LUE 650 may also include a bucket post-processor (BPP) having an additional RME. The OCM 690 associated with the LUE 650 stores rules for rule-matching by the LUE 650.

In an operation of an example search processor, a host interface (FIG. 4A) receives a lookup request from the host. The LUF (e.g., LUF 408a in FIG. 4A) processes the lookup request into one or more key requests, each of which has a key (FIG. 5). The LUF schedules the requests to the super cluster, selecting a set of clusters to process the lookup request.

Turning to FIG. 6, the LUE 650 component of the selected cluster processes the lookup request. Here, the TWE 660 uses the key (included in the key request) to walk a tree representing a set of rules that may match the key. When the TWE 660 reaches a leaf in the tree, the TWE 660 passes a subset of the rules, called a bucket of rules (or bucket), to the BWE 670. The terms tree and Rule Compiled Data Structure (RCDS) are used interchangeably, herein. The BWE 670 processes the bucket of rules and then engages the RME 680a-c. The RME 680a-c compares the key to rules, which were identified by the TWE 660. The search processor provides "match found" or "no-match found" as a response to the host.

Prior to receipt of the lookup request to the LUE 650, a LUF (e.g., LUF 408a in FIG. 4A) receives the lookup request from a host processor. The lookup request includes a packet header and group identifier (GID). The GID indexes to an entry in a global definition/description table (GDT). Each GDT entry includes (a) n number of table identifiers (TID), (b) a packet header index (PHIDX), and (c) key format table index (KFTIDX). Each TID, in turn, indexes an entry in a tree location table (TLT). Each TLT entry identifies which lookup engine or processor core looks for the one or more matching rules. In this way, each TID specifies both which lookup engine or processor core looks for the one or more matching rules and where the particular one or more matching rules are stored.

Each TID also indexes an entry in a tree access table (TAT) 665 at the LUE 650. Because there may be more than one collection or set of rules on the LUE (e.g., stored in memory), the TID identifies which one of them in which to look for one or more matching rules. Each TAT 665 entry provides the starting address (e.g., a root node) in memory of a collection of rules (or pointers to rules) called a table or tree of rules. (The terms table of rules, tree of rules, table, or tree are used interchangeably throughout the Application.) Thus, the TID identifies the TAT 665, which identifies the collection or set of rules in which to look for one or more matching rules.

The PHIDX of the GDT entry indexes an entry in a packet header table (PHT). Each entry in the PHT instructs the processor how to extract n number of keys from the packet header. The KFTIDX of the GDT entry indexes an entry in a key format table (KFT). Each entry in the KFT provides instructions for extracting one or more fields (i.e., parts of the packet header) from each of the n number of keys extracted from the packet header. For example, a KFT entry (or key format type) specifies which bits out of a 100-bit key correspond to a source IP address of an IP packet header.

The LUF assembles one or more key request from the lookup request, as shown for example in FIG. 5, and forwards a key request to the LUE 650.

In operation, the LUE 650 receives the key request (KRQ) from the (LUF) (such as the LUF 408a of FIG. 4A). The KRQ includes a key (KEYDATA), key format table index (KFTIDX), and table identifier (TID), and may include additional data associated with the lookup as shown by the key requests 560a-d described above with reference to FIG. 5.

The key is parsed according to the instructions provided from the KFT (and indexed by the KFTIDX). The TWE 660 then uses the parsed key to walk a tree representing a set of rules that may match the parsed key. The tree walked by the TWE 660 includes nodes and leaves. The TWE 660 starts the walk at a root node of the tree. The location of the root node is provided from the TAT 665 (and indexed by the TID). The TWE 660 walks the tree until it reaches a leaf. Each leaf in the tree represents a subset of the rules, called a bucket of rules (or simply bucket). When the TWE 660 reaches a leaf, it passes a corresponding bucket to the BWE 670 for processing.

The BWE 670 fetches the bucket, which may include one or more rules. In a convenient embodiment, the bucket includes one or more pointers (or addresses) to rules stored in memory. The rules may be stored in on-chip memory (OCM), in which case, the BWE 670 fetches the rules from the OCM and directs the rules to the RME (local RME). An OCM Bank Slotter (OBS) 695 provides scheduling for requests to the OCM 690, ensuring that associated access ports p0-p3 are occupied and shared among the multiple TWEs 660, BWEs 670 and RMEs 680a-c.

The rules may also be stored in memory located external to the LUE 650 (and search processor that includes the LUE). In this case, the BWE 670 fetches the rules from external memory and directs the rules to a Bucket Post Processor (and its associated RME), in the procedure called "rule extension," described below.

Returning to FIG. 6, the KFTIDX also indexes an entry in a rule format table (RFT) 667. Each entry in the RFT 667 provides instructions for parsing bits of a fetched rule to extract one or more fields from the rule. The rule is parsed according to the instructions provided from the RFT 667 (and indexed by the KFTIDX). The RME 680a-c then compares the parsed rule to the parsed key to a find a match. The RME provides "match found" or "no-match found" in a response, called a sub-tree response (STRSP), to the LUF.

According to one embodiment, each super-cluster contains distributed on-chip memory (OCM), as well as 'm' pools of 'n' HW-assist thread engines where 'n' is determine by the latency of each thread iteration (n=10 cycles). To maximize performance at each cluster, if the minimum thread iteration latency='n' cycles and if each HW thread requires a single cycle OCM access, then 'n' thread engines can time division multiplex (TDM) the use of the single ported SRAM to allow fully pipelined OCM accesses every cycle, for example.

In an example embodiment, each cluster's LUE may contain 10 Tree Walk Engines (TWEs), 10 Bucket Walk Engines (BWEs) and 3 Rule Match Engines (RMEs), which are used to process incoming Host Lookup/Key Requests. Each TWE/BWE/RME engine contains its own HW context state (or HW thread), which keeps track of the state of each Key request as it is processed. At each cluster's LUE, the TWE minimum thread iteration latency of 10 cycles, allows up to 10 active TWE threads to TDM (time division multiplex) the OCM single-ported SRAM, without interference (i.e., OCM is fully-pipelined-access every cycle).

With reference to FIG. 6, in a more detailed example operation of the LUE 650, new host requests and key requests are received from the LUF over the KRQ bust. Each LUE 650 may be configured to receive up to 16 outstanding KRQ requests (either key or host requests). Host requests (host R/W access for CSR/Table/OCM) enter the host request (HRF) FIFO and host write data is written into the common write data buffer (WDB). Host requests (R/W) may be processed "in order" for each LUE 650 cluster. Host responses are returned to the HRQ/HRD FIFOs where they await transfer over the STRSP bus via the central resource block (CRB) and eventually are returned to the host over Interlaken packets.

New key requests enter the key request FIFO (KRF) and their associated key data is written into the common write data buffer (WDB). Migrated tree walk requests (TWMIGs) are transferred from the source LUE 650 cluster to the destination LUE cluster via the XBR 412 bus. New TWMIGs are enqueued to the TMQ/TMD and await pending TWEs 660 for processing.

New key requests (KRF) and migrated tree requests (TMQ) arbitrate for the TIC/TAT 665 access using the tree ID (TID). The TIC/TAT 665 structure contains tree access table information used during a sub-tree walk to an assigned one of the TWEs 660. For new key requests, the RIC/RFT 667 is also accessed to get rule format table information loaded by software. A Tree Migration request may not re-fetch the RIC/RFT table, but instead may carry RIC/RFT info in the migration request itself from the source cluster. Also, the key data for a tree migration request may be stored in the Tree Migration Data (TMD).

Once TAT 665 and/or RFT 667 info is fetched, a new key request is assigned to one (of n) TWEs 660. To expedite a new key request search (implementing HW parallelism), the key request can be partitioned (by software operation) into up to eight unique sub-tree walks, where each sub-tree walk thread is assigned to a separate one of the TWEs 660. A TW migration request may always be assigned to just a single TWE.

Once a TWE's sub-tree walk has detected a leaf node, control for processing is transferred to the pool of bucket walk engines BWEs 670. BWEs 670 use the bucket info descriptor from the leaf node to fetch bucket entries. Bucket entries (BEs) are then processed by rule match engines (RMEs) 680a-c. The RMEs 680a-c process the Bucket Entries (BEs), which contain pointers to rule chunks (RulChkPtr). The RWEs 680a-c fetch rule data and deliver to the pending pool of RMEs 680a-c. The RMEs 680a-c will use the fetched OCM Rule chunk data along with the corresponding rule format data (from the RFT 667), to process the chunk of rules specified by each bucket entry (BE). The RMEs 680a-c will aggregate partial RME match results for each rule chunk for all Bucket entries (BE) within the entire bucket. Once a match/no match result is acquired, the lookup response (LURSP) is driven back to the LRQ/LRD, which are driven back to the lookup front-end (LUF) via the STRSP bus.

At any time during a rule-matching operation, a BWE 670 may make a remote Bucket Entry (BE) request, or an RME 680a-c may make a remote rule chunk request to another cluster via the remote output queue (ROQ). The OCM Bank Select (OBS) 695 arbiter is responsible for all accesses to the common OCM, which houses all tree/bucket and rule data structures. A remote cluster may access the OCM of another cluster by making a remote OCM request over the XBR 412, which is enqueued to the remote input queue (RIQ). The TWE pool, BWE pool, RIQ and HRF can all make requests into the common OCM, which has complex dynamic arbitration schemes to minimize overall OCM latency and to maximize OCM bandwidth (bank conflict avoidance) for optimal overall search performance.

As described above, the rules may reside on the on-chip memory (OCM). In such a case, the RME 680a-c engaged by the BWE 670 is part of the same LUE 650 as the BWE 670. As such, it can be said that the BWE 670 engages a "local" RME 680a-c. The rules may also reside on memory located external to the processor, i.e., off-chip. In such a case, which may be referred to as rule processing extended to external memory, or "rule extension," the BWE 670 does not engage its local RME 680a-c. Instead, the BWE 670 sends a request message to a memory controller to read a portion of the bucket of rules, called a "chunk." The BWE 670 also sends a "sideband" message to the BPP informing the BPP to expect the chunk (associated with a given key) to come from external memory.

The BPP starts processing the chunk of rules received from the external memory. As part of the processing, if the BPP finds a match, the BPP sends a response, called a lookup response (also called a sub-tree response) to the LUF. The BPP also sends a message to the LUE informing the LUE that the BPP is done processing the chunk and the LUE is now free to move on to another request.

If the BPP does not find a match and the BPP is done processing the chunk, the BPP sends a message to the LUE informing the LUE that the BPP is done processing and to send the BPP more chunks to process. The LUE then sends a "sideband" message, through the MWA and MBC, to send a next chunk of the bucket of rules to the BPP, and so on.

For the last chunk of the bucket of rules, the LUE 650 sends a "sideband" message to the BPP informing the BPP that the chunk, which is to be processed by the BPP, is the last chunk. The LUE knows that the chunk is the last chunk because the LUE knows the size of the whole bucket. Given the last chunk, if the BPP does not find a match, the BPP sends a "no-match" response to the LUF informing the LUF that the BPP is done with that bucket. In turn, the LUE 650 frees up the context (i.e., details of the work done) and moves on to another request.

In further embodiments, multiple clusters may be configured to contain identical Rule Compiled Data Structure (RCDS) or sub-RCDS. In such a configuration, the LUF may load balance the work by choosing the least busy cluster to perform the search.

Figure 7:
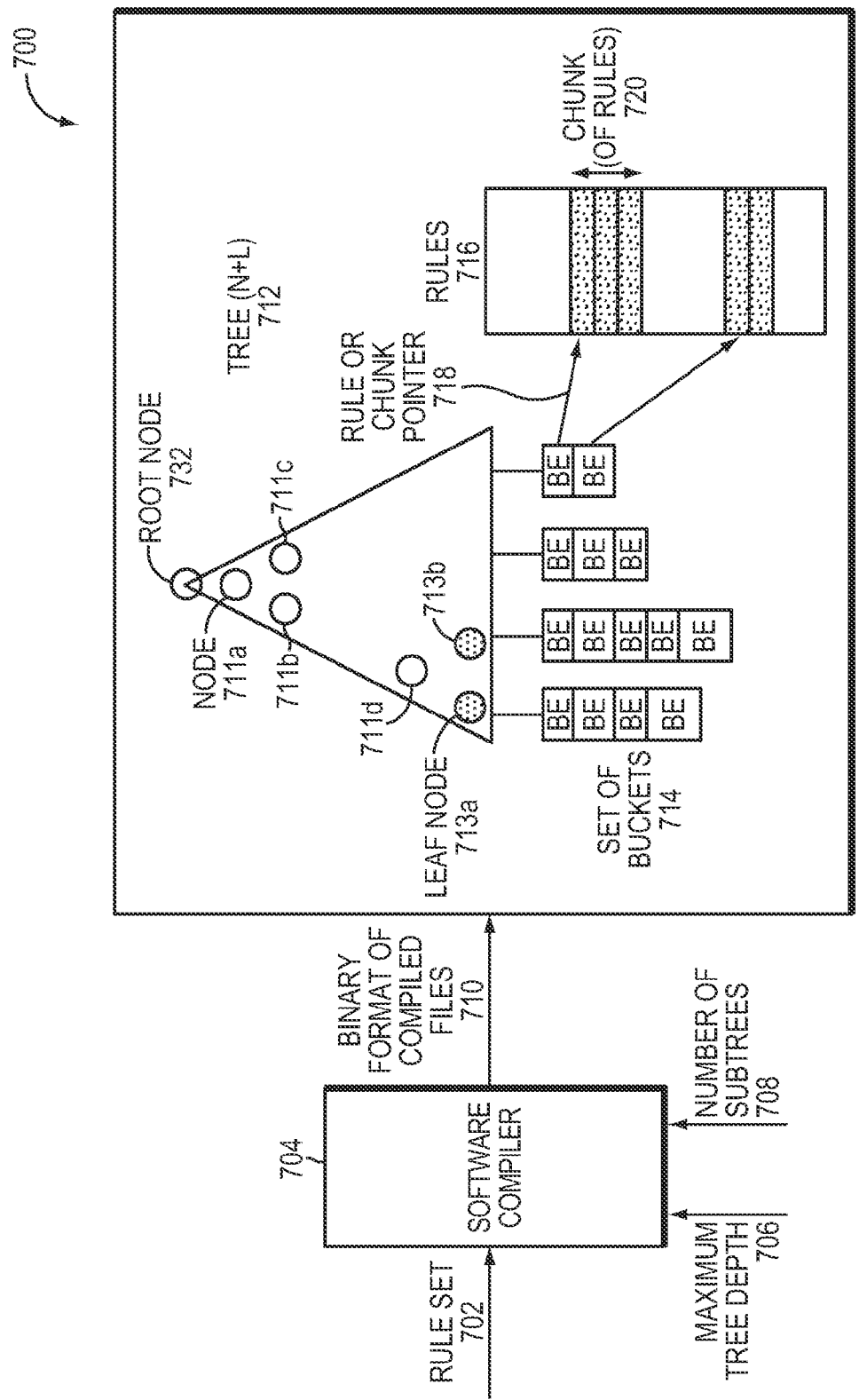
FIG. 7 is a block diagram illustrating an example embodiment of a compiler loading rules into a memory structure.

FIG. 7 is a block diagram 700 illustrating an example embodiment of a compiler loading rules into a memory structure. A software compiler 704 receives a rule set 702.

The software compiler 704 generates a binary format of compiled rules 710. The binary format of compiled rules 710 includes a tree 712, buckets 714 and rules 716. The tree 712 includes nodes 711a-d, leaf nodes 713a-b, and a root node 732. Each leaf node 713a-b of the tree 712 points to one of a set of buckets 714. Within each bucket are bucket entries which contain rule or chunk pointers 718. The rules 716 include chunks of rules 720. A chunk 720 (of rules) can be a sequential group of rules, or a group of rules scattered throughout the memory, either organized by a plurality of pointers or by recollecting the scattered chunk 720 (e.g., using a hash function).

Figure 8:
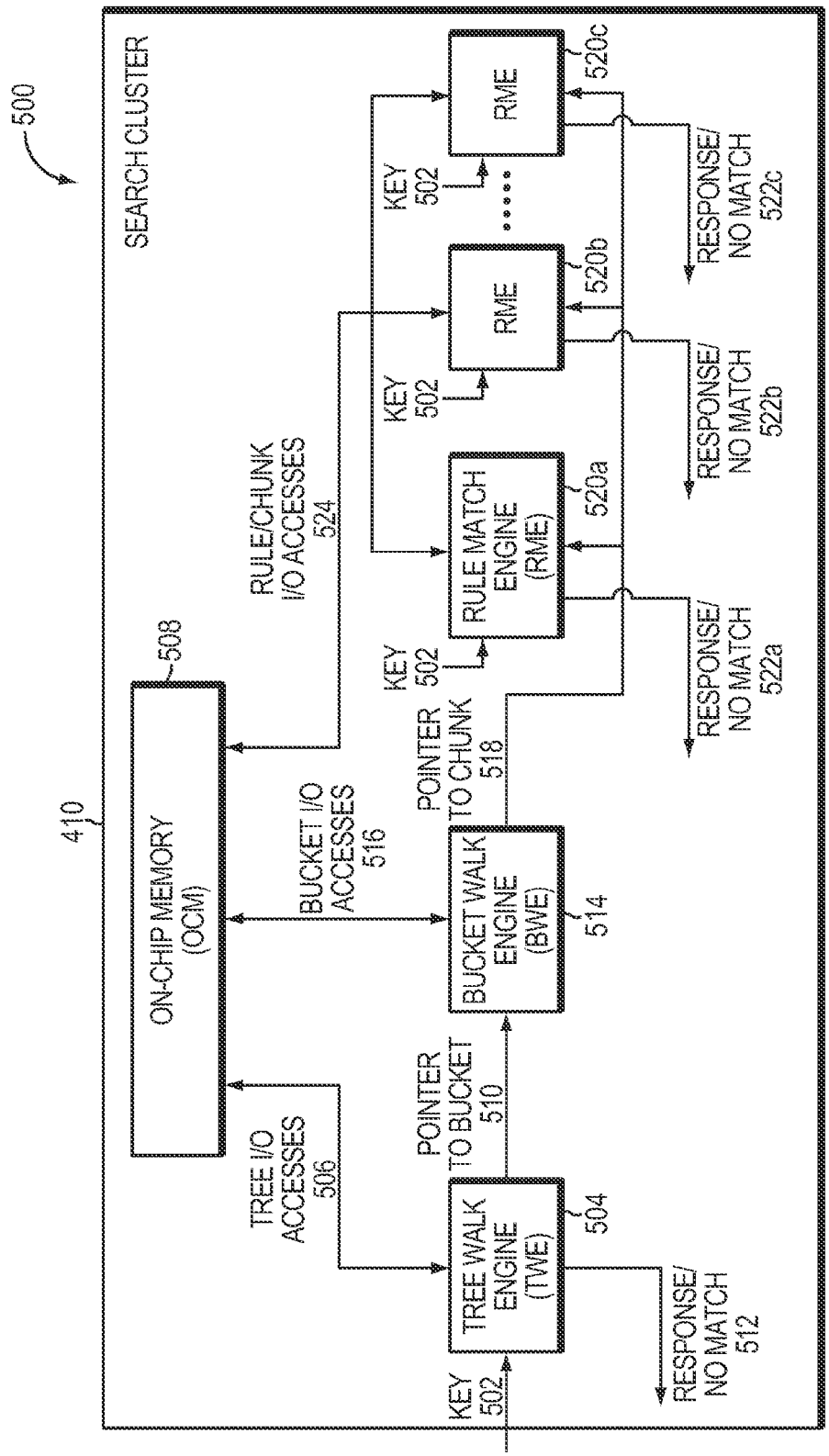
FIG. 8 is a block diagram illustrating an example embodiment of a search block or search cluster.

FIG. 8 is a block diagram 500 illustrating an example embodiment of a search block or search cluster 410. The search cluster 410 includes an on-chip memory (OCM) 508, a tree walk engine (TWE) 504, a bucket walk engine (BWE) 514 and a plurality of rule match engines (RME) 520a-c. The OCM 508 stores a tree data structure, a bucket storage data structure, and a chunk and/or rule data structure.

The search cluster 410 receives a key 502 from the LUF 408 (FIG. 4A) at the TWE 504. The TWE 504 issues and receives a plurality of tree input/output (I/O) accesses 506 to the OCM 508. Based on the key 502, the TWE 504 walks the tree from a root node to a possible leaf node. If the TWE 504 does not find an appropriate leaf node, the TWE 504 issues a nomatch 512 (e.g., a no match). Then, if the TWE 504 finds an appropriate leaf node, the leaf node can indicate a pointer 510 to a bucket. The TWE 504 provides the pointer 510 to the bucket to the BWE 514. The BWE 514 accesses the OCM 508 by issuing bucket I/O accesses 516 to the OCM 508. The bucket I/O accesses 516 retrieve at least one pointer 518 to a chunk to the BWE 514. The BWE 514 provides the pointer 518 to the chunk to one of the plurality of RMEs 520a-c. The one of the chosen RMEs 520a-c also receives the key 502. Each of the plurality of RMEs 520a-c are configured to issue rule and/or chunk I/O accesses 524 to the OCM 508 using the pointer 518 to the chunk to download appropriate rules from the chunk in the OCM to analyze the key 502. The RMEs 520a-c then analyze the key using the rules accessed from the OCM 508 and issue a response or nomatch 522a-c corresponding to whether the key matched the rule or chunk indicated by the tree and bucket stored in the OCM 508.

Figure 9A:
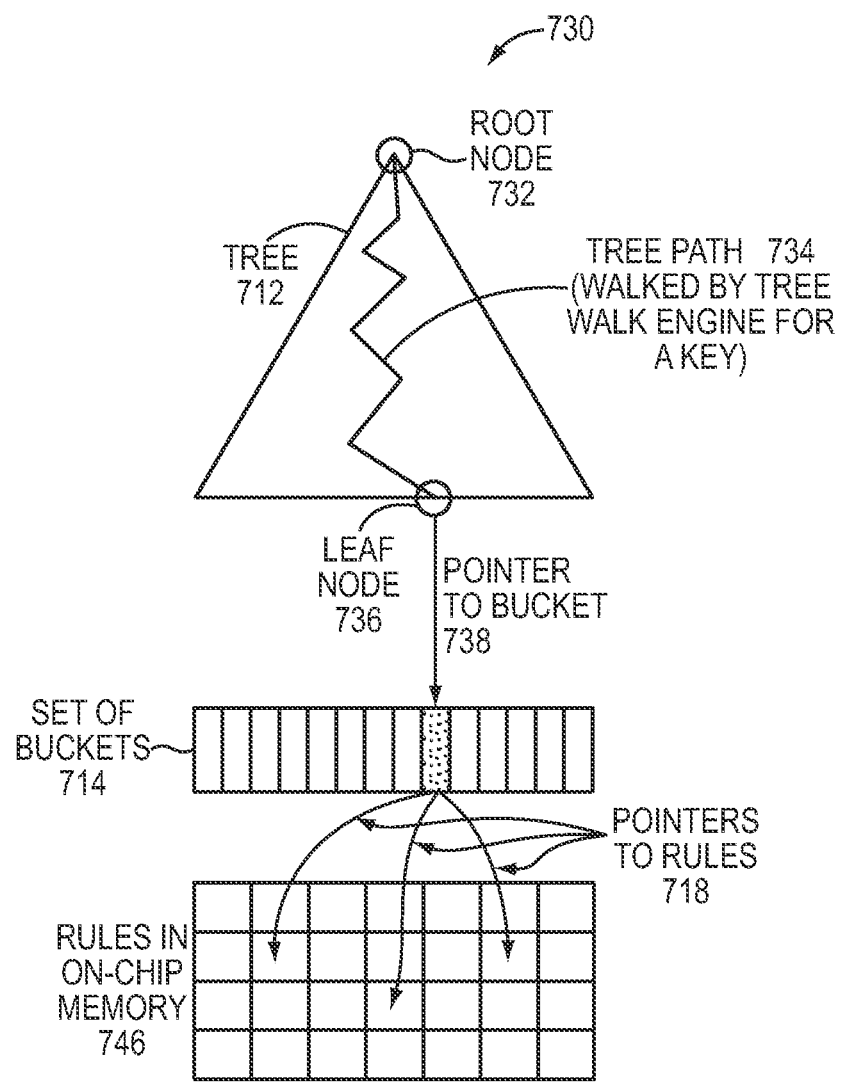
FIG. 9A is a block diagram illustrating an example embodiment of a memory structure used to load rules for a given key in a packet.

FIG. 9A is a block diagram 730 illustrating an example embodiment of a memory structure used to load rules for a given key in a packet. The TWE (e.g., TWE 660 in FIG. 6) begins walking the tree 712 for a particular key, starting at its root node 732 and walking along a tree path 734. The TWE walks the tree path 734 through the tree 712 for each key it receives. Eventually, the tree path 734 reaches a leaf node 736 which either contains null or nomatch, in which case the TWE returns a nomatch, or contains a pointer to a bucket 738. In this case, the TWE sends the pointer to the bucket 738 to a BWE, which loads the particular bucket out of the set of buckets 714. The particular bucket can contain at least one pointer 718 to rules or chunks of rules. The BWE loads rules based on the pointer 718 to the rule 746 from the OCM to one of the RMEs in the search cluster.

Figure 9B:
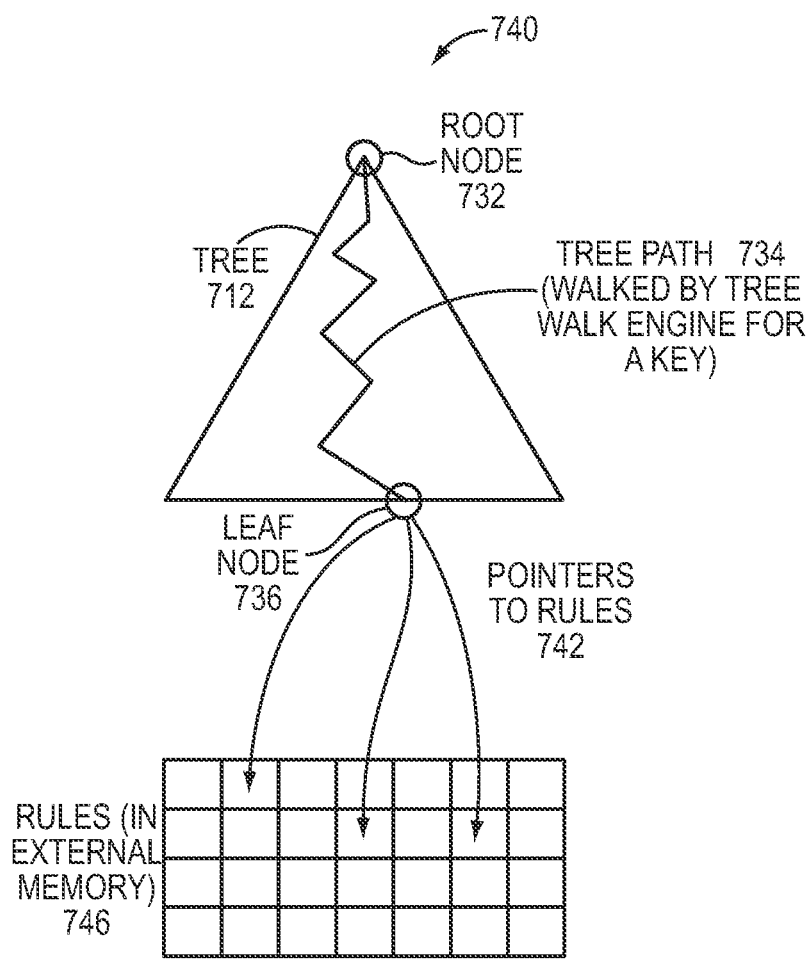
FIG. 9B is a diagram illustrating an example embodiment of a memory structure employed by a tree-walk engine (TWE) that receives a key and loads a set of rules from the memory structure, where the rules are stored in an external memory.

FIG. 9B is a diagram 740 illustrating an example embodiment of a memory structure employed by a TWE that receives a key and loads a set of rules from the memory structure, where the rules are stored in an external memory, as opposed to an on-chip memory. Again, the TWE receives the key and walks the tree 712 along the tree path 734 from the root node 732 until it reaches a leaf node 736, either storing a null value, in which case the TWE returns a nomatch, or storing pointers 742 to rules. In the external memory embodiment, the leaf node 736 points directly to the rules and/or chunks 746 in the external memory. When rules are stored in the OCM, the leaf node 736 may point to buckets, and the buckets then point to the rules and/or chunks. However, when the rules are stored in the external memory, the TWE loads the rules based on the pointer 742 to rules from the external memory and sends the rules 746 to the Bucket Post Processor (BPP). The BPP is employed to process rules from the external memory 746. The same tree structure can point to either buckets or rules in the external memory. For example, each leaf node 736 can point to an address in memory (or null). The system can determine whether the address points to the rule in the external memory or the bucket in the OCM. Based on the determination, the system accesses the appropriate memory, and the same tree can be used for both the external memory and the OCM simultaneously in one embodiment. However, the search processor can be configured to employ only the external memory embodiment or only the OCM embodiment separately.

Figure 10A:
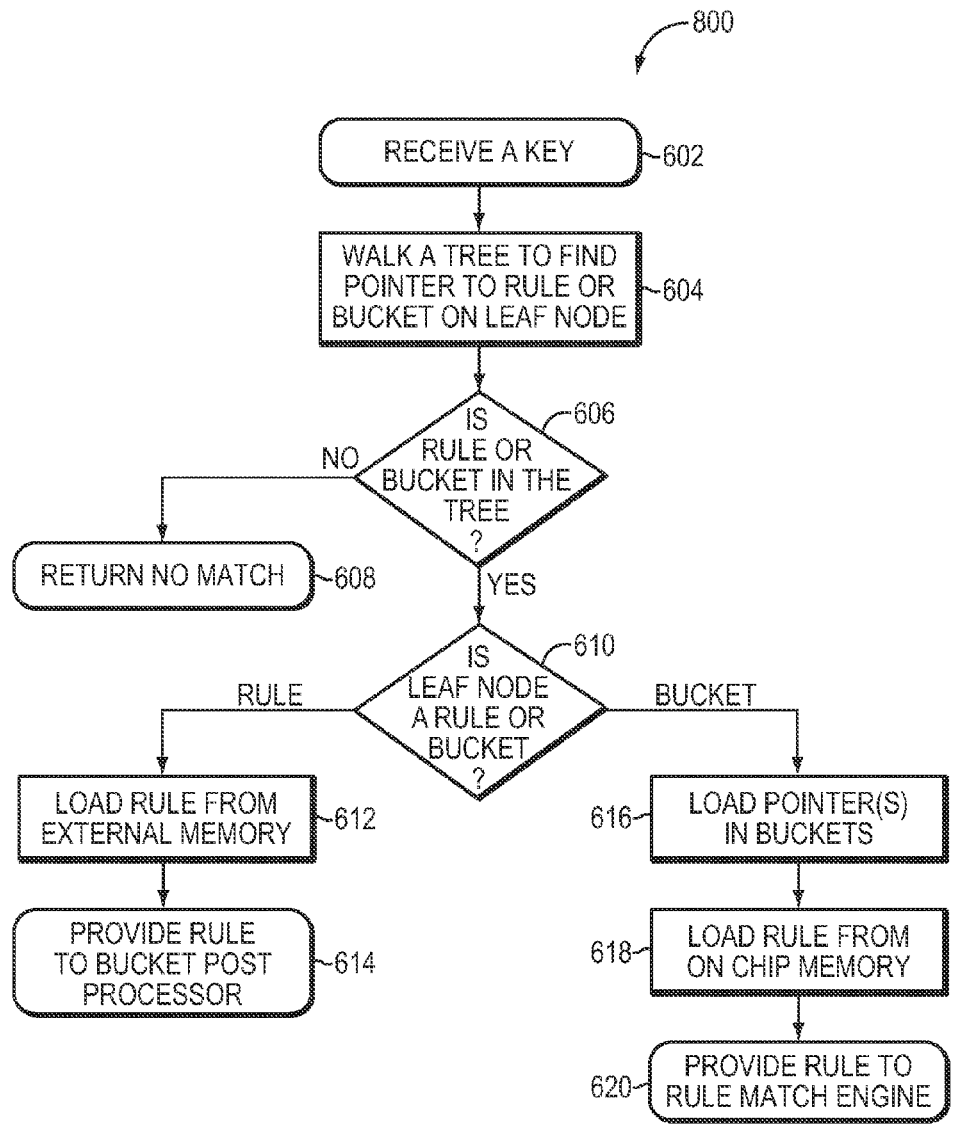
FIG. 10A is a flow diagram illustrating an example process employed by the search processor.

FIG. 10A is a flow diagram 600 illustrating an example process employed by the search processor. First, the search processor receives a key from the header area of a received packet (602). The search processor, using a TWE, then walks a tree data structure to find a pointer to a rule or a bucket on a leaf node of the tree (604). The leaf node can be nonexistent or null, which automatically causes a nomatch for the received key.

The search cluster of the search processor then determines whether the rule or bucket is in the tree (606) by searching for a non-null leaf node. If not, for instance, if the leaf node is nonexistent or null, the search cluster returns a nomatch (608). If the leaf node stores a rule or bucket, then the search cluster determines whether the leaf node points to a rule or points to a bucket (610). If the leaf node points directly to the rule, then search cluster loads the rule from an external memory (612). Then the system provides the rule to the BPP (614). The system provides the rule to the BPP by either (i) the BPP pulling the rule from the external memory using the pointer from the leaf node or (ii) a navigation unit within the search cluster sending a command to the external memory to forward the requested memory addresses to the BPP.

The BPP is a processor similar to the RME that is configured to process a chunk of rules and compare the rules to keys, however, the BPP is further configured to process rules from the external memory. Loading rules from an external memory (610, 612, 614) is an optional embodiment of the search processor and corresponding search clusters. The search processor can store all of the rules and/or chunks of rules on an OCM. Therefore, the tree data structure may store pointers to buckets instead of pointers to rules directly. Even in an embodiment where rules and/or chunks of rules are stored solely on the OCM, the leaf nodes can point directly to the rules and/or chunks of rules in the OCM without the use of buckets.

If the leaf node points to a bucket (610), then the search processor loads pointers stored in the bucket (616). Then, the search processor loads the rules that are stored in the OCM where the pointers from the bucket are pointing (618). Then, the system provides the rule(s) to RMEs (620).

Figure 10B:
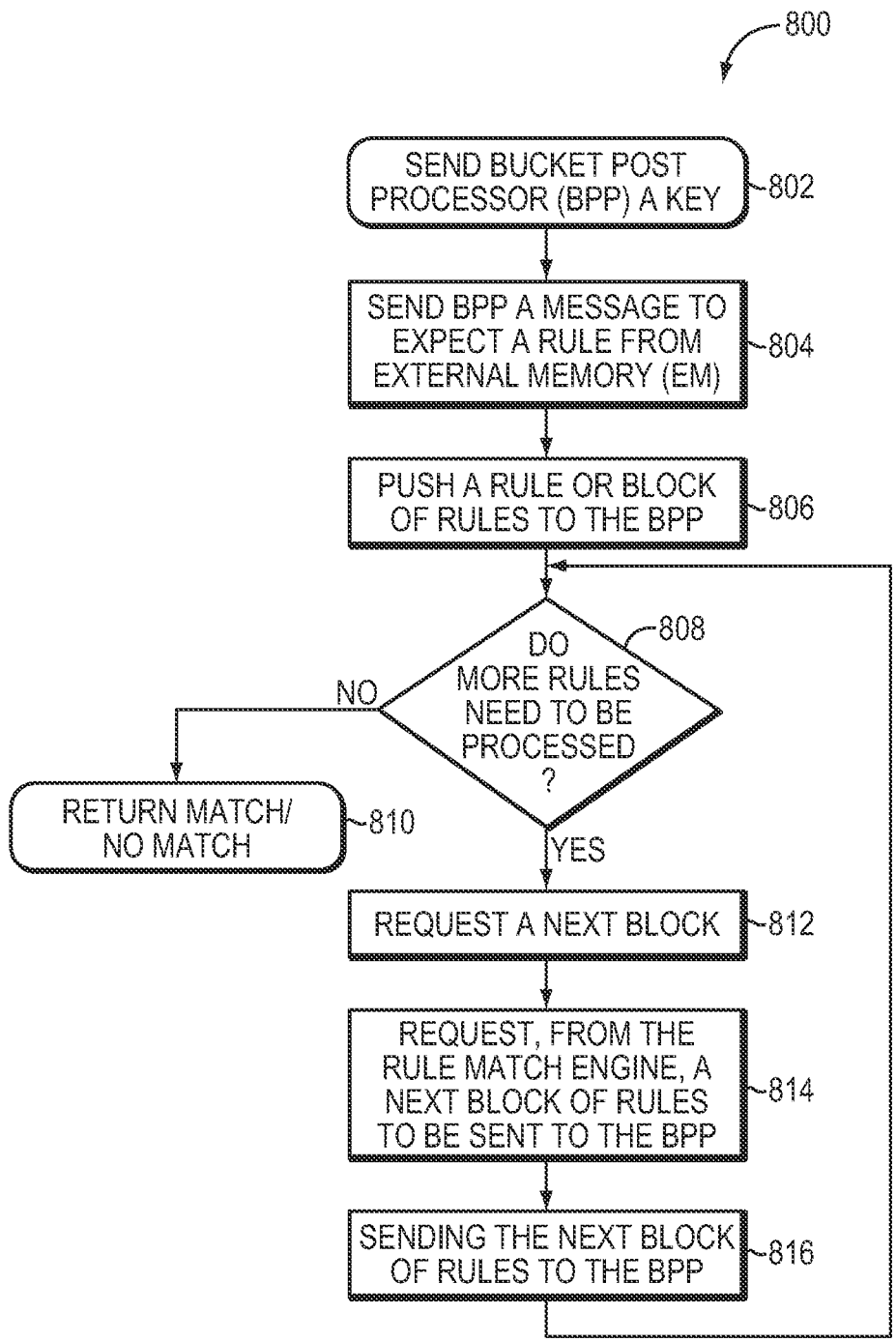
FIG. 10B is a flow diagram illustrating an example process of performing a search on a key using a set of rules by a Bucket Post Processor (BPP).

FIG. 10B is a flow diagram 800 illustrating an example process of performing a search on a key using a set of rules by the BPP. First, a packet processing engine sends a BPP a key (802). The BWE sends the BPP a message to expect to receive a rule from external memory (EM). Then the BWE pushes a rule or a block of rules to the BPP (806). Then, the BPP determines whether more rules need to be processed (808). If no additional rules need to be processed, the BPP returns a match or nomatch of the processed rules (810). If additional rules need to be processed, for instance, if only part of a chunk is processed, the BPP requests a next block of rules (812). Then, the BWE requests a next block of rules to be sent to the BPP (814). Then, the BWE sends the next block of rules to the BPP (816). The BPP determines, again, whether more rules need to be processed (808). If not, the BPP returns a match or nomatch (810). However, if more rules do need to be processed, then the BPP requests a next block of rules (812).

Returning to FIGS. 4A-B, the Lookup Front End (LUF) 408 provides an interface to the lookup cluster complex (LCC) 414, and performs several operations related to the lookup request. The LUF 408 receives lookup requests from the host, processes them for forwarding to the LCC 414, and returns responses received from the LCC 414. The LUF 408 may also receive read/write requests (or commands) from the host, which are processed. Responses are then returned from the LUF 408 to the host.

The architecture and operation of the LUF 408, including its constituent LUF input processor (LIP) 424 and LUF Output Processor (LOP) 446, are described in further detail below with reference to FIGS. 11-22B. General functions of the LUF include tracking a number of pending requests at each cluster. This tracking can be used to inform assignment of lookup requests to lookup clusters, as the 'least' full cluster 1 (of m) can be determined by selecting the cluster with the smallest number of pending cluster requests across all "m" possible clusters. (Cluster Requests that are tracked may include KeyReq, HostOCMReq, HostTABReq and HostCSRReq.) Further, LUF 408 may choose to use Super-Cluster load balancing, by loading the same Rule Table image onto both super-clusters (i.e., super-cluster redundancy). Each new lookup request can then be programmably steered to the "least full" super-cluster.

In some packet classifying applications, the LUF 408 may be a processor or part of a processor, such as the search processor 202 of FIG. 2. In other packet classifying applications, the LUF may be a physical network node (or device), such as a switch or router, in a network of other nodes. In still other packet classifying applications, the LUF may be part of a physical network node (or device) as a component, module, blade or card of that node. In still yet other packet classifying applications, the LUF 408 may have software and hardware components or blocks.

Figures 11, 11A:
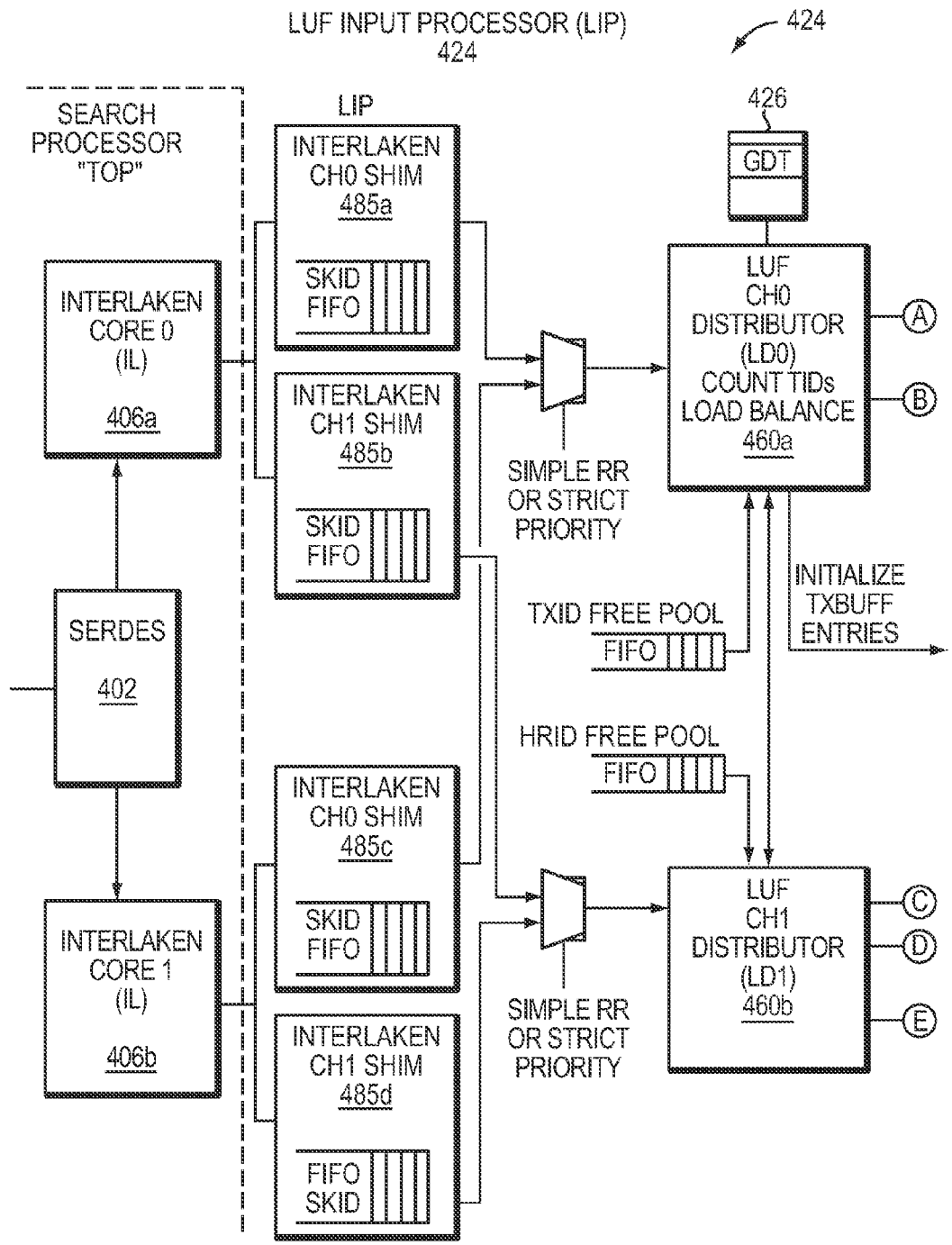
FIGS. 11A and B (collectively referred to as FIG. 11) are block diagrams of an example LUF input processor (LIP).
Figure 11B:
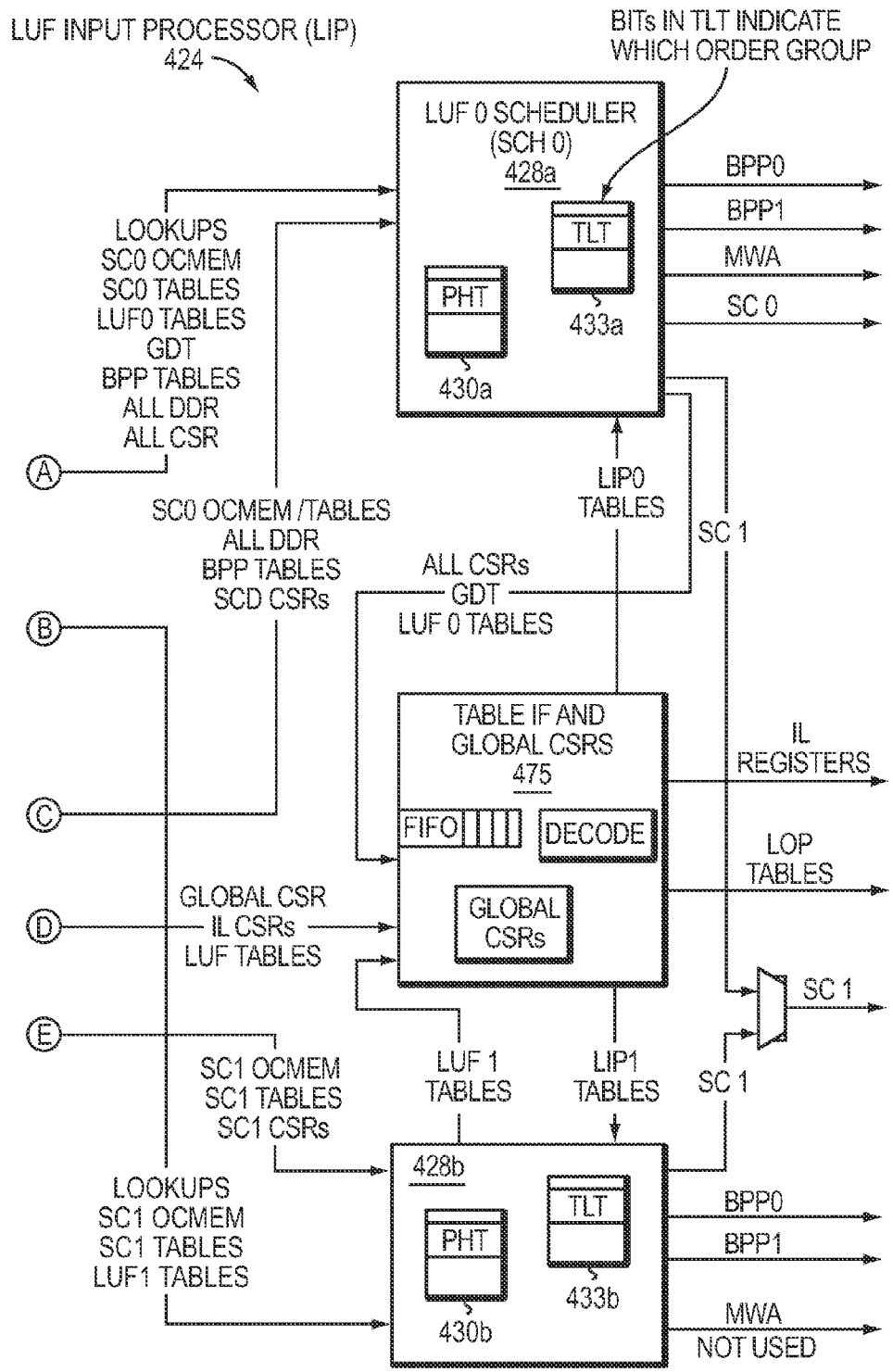

FIG. 11 is a block diagram of an example LUF input processor (LIP) 424. The LIP 424 receives lookup requests (LUREQs) and host commands from the Interlaken or I2C interfaces 485a-d. The LIP 424 parses the requests and commands, and then schedules them to internal resources, such as the lookup clusters, double data rate (DDR) memory, BPP or global control status registers (CSRs) and tables.

The LIP 424 includes one or more distributors 460a-b that receive the aforementioned lookup requests and host commands from the Interlaken or I2C interfaces 485a-d. The distributors 460a-b may provide load-balancing between super clusters or within a super cluster. The distributors 460a-b then forward the lookup requests to schedulers 428a-b for output to the lookup clusters (e.g., the LCC 414 in FIG. 4B).

The distributors 460a-b and schedulers 428a-b may together provide for several functions, including load balancing, cluster assignment, key extraction, generation of key requests, splitting key requests into sub-tree requests, and scheduling output of key requests and sub-tree requests to lookup clusters. To facilitate those functions, and to control how searches are performed at an associated lookup cluster, the LIP 424 may employ a number of tables. A Group Definition/Description Table (GDT) 426 provides indexes to other tables. A Packet Header Table (PHT) 430a-b provides instructions on how to parse a packet. A Tree Location Table (TLT) 433a-b provides information about which clusters should do a search.

The TLT table 433a-b (also referred to as a rule database location table) contains information about which m (of n) possible clusters can honor a particular tree ID (set of rules). If a Host Lookup Request is for that particular tree ID, then the LUF's least full cluster hardware logic selects the "least full" 1 (of m) clusters to service the Key Request. In this manner, the LUF load balances the Host Lookup requests equally amongst the possible clusters to provide minimum overall lookup latency, which will increase the overall lookup rate across the processor.

Each of the schedulers 428a-b processes each lookup request (LUREQ) to generate up to four key requests (KRQs) having keys. An example of this key extraction is described above with reference to FIG. 5, and is also described in further detail below with reference to FIG. 14. The KRQs (with keys) are scheduled and sent to the lookup cluster complex (LCC) for processing. In further embodiments, where a tree at one or more clusters is divided into a number of "sub-trees," the key requests may be "split" into a number of "sub-tree requests," each of which are associated with a particular sub-tree. The sub-trees, in turn, may be associated with different clusters within the LCC, or may be associated with a common cluster. In this manner, a subset of rules that are specified by a tree may be further narrowed to a smaller subset of rules specificed by a sub-tree, thereby providing further refinement to a search.

Following key request generation, the schedulers 428a-b schedule the KRQs out of the LIP 424. The schedulers 428a-b include a payload header extractor (PHE) (described below with reference to FIG. 12) and a scheduler output manager (described below with reference to FIG. 15).

To support ordering of host lookup requests with respect to the host read/write requests used to incrementally update the rule table image, specialized HW mechanisms may be used at the scheduler 428a-b. Host R/W requests (exclude Host Lookups) include access to CSR, TABLE, OCM and DDR RCDS image data structures required during the Lookup/Key Request process.

For all Host R/W Commands, Host SW may use three 'ordering' flags contained within the control header.

1) HOST_RSP—When set, the search processor will send an explicit command response to the host when the command completes. This has no effect for read commands, however, for Host Write Requests (with HOST_RSP=1 flag set), a Host Write Response packet will be transferred back to the Host CPU which will also contain the same HXID (Host Transaction ID) sent in with the Host Request packet.

2) LOCAL_RSP—When set, the search processor will ensure Host R/W requests are executed in bus order. In other words, a Host Write request (tree update) is forced to 'complete' or execute, before any subsequent Host Lookup Requests are issued. (Used where RAW conflict avoidance is required=Lookup Read after Write HW ordering must be maintained)

3) ATOMIC—When set, the NSP HW will ensure that all previously issued Host Lookup Requests (with the same TID=TreeID) have completed before the Host R/W Request is issued. This HW is used to ensure Host Write requests for incremental SW updates (for the same TreeID) do not execute out of order with respect to earlier Host Lookup requests. (Used where WAR Conflict avoidance to the same TID is required=Write after Lookup Read HW ordering must be maintained). Special HW must detect/drain the retry queue, and then block scheduling of this instruction until all previous Host Lookup requests using the same TID (=TreeID) have executed or completed. This will cause temporary HOL blocking for channel 0 until all Host Lookup Requests for that TID are drained. Channel 1 commands (Host R/W requests) are not affected by this.

Figure 12:
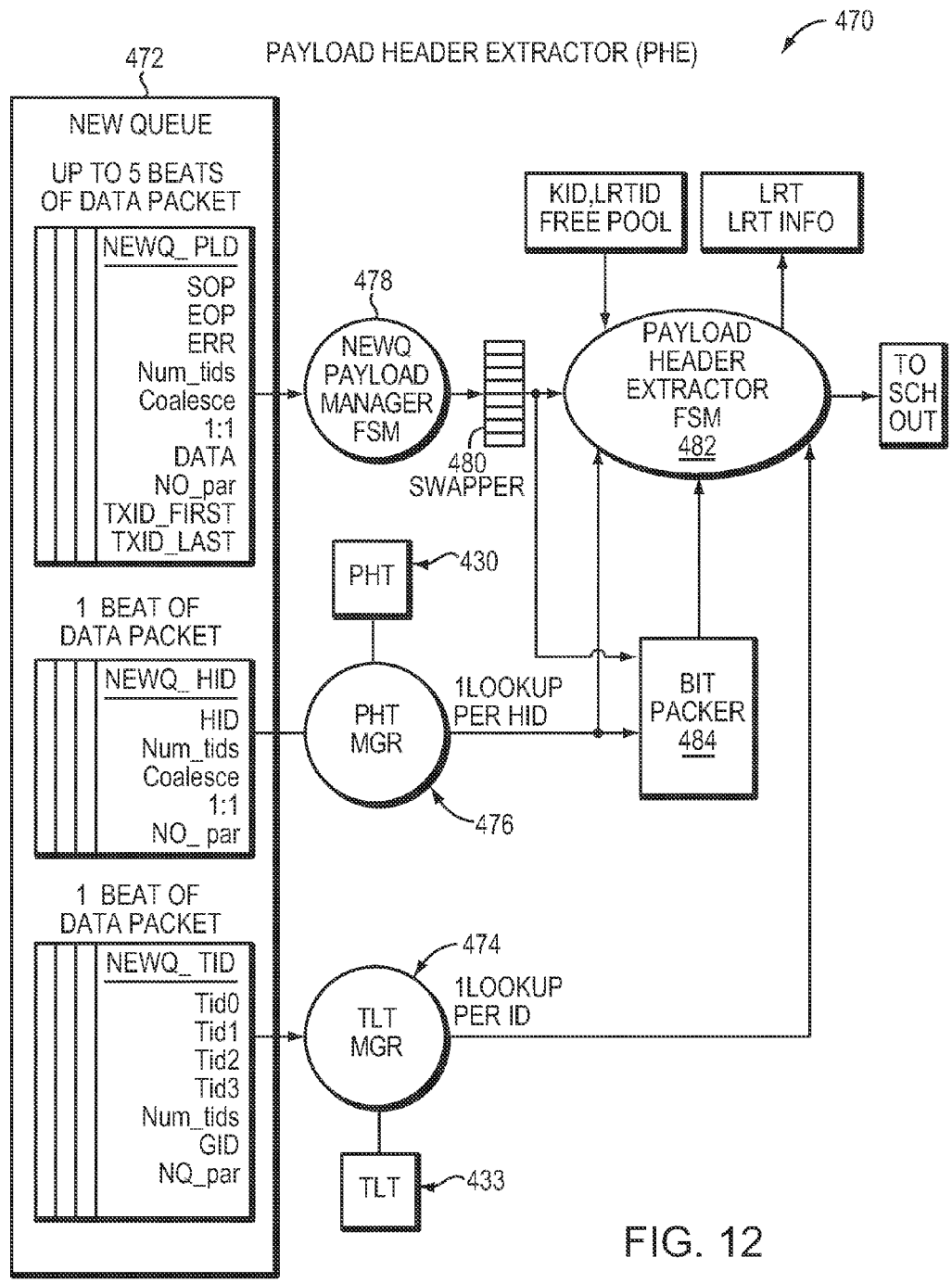
FIG. 12 is a block diagram of an example Payload Header Extractor (PHE).

FIG. 12 is a block diagram of an example Payload Header Extractor (PHE) 470, which may be a component of the schedulers 428*a-b* of the LIP 424 described above with reference to FIG. 11. The PHE 470 includes one or more of the following blocks: New Queue(s) 472, Tree Location Table (TLT) 433, Payload Header Table (PHT) 430, TLT Table Manager 474, PHT Table Manager 476, New Queue Payload Manager 478, PHT Byte Swapper 480, bit packer 484, and Payload/Packet Header Extractor Finite State Machine (482), each of which is described below.

The PHE 470 in general may be configured to perform one or more of the following functions:
Receives Lookup Requests (LUREQ) and Read/Write Requests from the New Queue.
Performs Byte Swapping as needed for the selected Endian Mode.
Performs TLT table lookups for all valid TIDs of each LUREQ.
Performs PHT table lookups for all valid TIDs of each LUREQ.
Extracts and processes header data to convert LUREQs and Read/Write Requests into Key Requests (KRQs).
Initializes data in the LRT and LRT Info tables of the LOP.

As an overview, in operation, the PHE 470 pulls requests from the 3 parts of the new queue, performs byte swapping and table lookups as needed, processes data into key requests (KRQs) and sends the KRQs along with table data to the scheduler output manager (described below with reference to FIG. 15).

Each scheduler 428*a-b* has a new queue 472 (or "new work queue") at the front end. If the size of these new queues is sufficiently large, then short term overloading of one scheduler will not cause head of line (HOL) blocking for the entire system, the scheduler backlog will be absorbed by the queue, allowing new work to flow to the other scheduler 428*a-b*.

The new queue 472 may be 16 locations deep for receiving packet headers. The packet headers are buffered in a 160 bits wide slice of this FIFO, and may limit the number of lookup packets that the queue will hold, as each header, regardless of size, will take up at least 1×160 bits of FIFO. The new queue 472 is loaded as packets flow into the device. The queue will contain lookup requests and IL Channel 0 DDR/OCM/Table requests from LUF Distributer 0 (LD0). The new queue 472 provides elasticity for the scheduler 428*a-b* because the bit packer 484 can generate between 1 and 4 KRQs for each lookup received. The Host read/write commands are placed unparsed in the new queue with format identical to that sent from the host.

The new queue may be divided into 3 sections (Payload, HID, and TID) such that the scheduler 428*a-b* can more efficiently manage the processing of each packet. LD0 may write all 3 sections simultaneously at Start of Packet (SOP). The HID and TID sections of the new queue 472 may have one entry per packet. The packet payload is stored in the payload section of the new queue 472 in 128-bit entries. Up to 5 entries in the FIFO may be required for a single packet. LD0 calculates parity across the entire New Queue and writes that value as a common entry (NQ_par) in all 3 section of the New Queue to assist the PHE in monitoring data alignment.

The PHE 470 may pull from each section of the new queue 472 independently. This allows the PHE 470 to pipeline and pre-process table data while simultaneously pulling multiple clocks of payload data. The NQpar entries are compared across all 3 sections to monitor data alignment and an error indication in a status register may be flagged if this check fails.

The PHT New Queue Payload Manager 478 pulls data from the payload section of the new queue 472 and presents it to the PHT Byte Swapper 480 and Payload Header Extractor blocks to be formed into a single data field up to 512 bits long. Operation of the PHT byte swapper 480 is described in further detail below and with reference to FIG. 13.

The Tree Location Table (TLT) 433 is used by the least full cluster generator 492 (LFCG) of the scheduler 428*a-b* to determine which clusters can process a given job. The tree identifier (TID) is used as an index into the TLT 433. The TLT 433 may be host-loadable and may contain one or more of the following fields:
KFTIDX—Key format Index—Sent to Clusters as payload with a KEYREQ. The clusters use this to reference 1 (of 64) Key Formats which define how the clusters should extract up to 28(max) DIMENSIONs within the KEYDATA for each KEY. Also used to index RFT (Rule Format Table). Sent with every KEYREQ command and is stored at each Cluster's KDT table (along with the KEYDATA).
TWRSPCNT—The number of responses expected. This is written to the TWRSPCNT field of the LRT. A value of 3'b000 indicates 8 responses are expected.
TWCLMSK—TreeWalk Cluster Mask [1 per ST=subtree up to 8(max)]: specifies which clusters (within the super-cluster) may accept TreeWalk Requests (TWReq). For LUF0, these relate to SC0, for LUF1, these relate to SC1. Used by HW to determine 'least full cluster' when scheduling a new TreeWalk request into the cluster complex. SW may have previously loaded Tree(N+L) image into specified clusters in the mask.
TWCLMSK_ALT—Alternate TreeWalk Cluster Mask [1 per ST=subtree up to 8(max)]: Same as TWCLKSK above but specifies which clusters within the opposite super-cluster may accept TreeWalk Requests (TWReq). Valid in Single LUF mode only. For LUF0, these relate to SC1. For LUF1 these are not valid. USAGE IS AS FOLLOWS:
DUAL LUF MODE(LUF0 or LUF1): Each TWCL Mask={8'h00, TWCLMSK}
SINGLE LUF MODE(LUF0 Only): Each TWCL Mask={TWCLMSK_ALT, BWCLMSK}
BWCLMSK—BucketWalk Cluster Mask: specifies which clusters will be responsible for BucketWalks. SW must have knowledge of which clusters will be used in the LUCTNA.rulclnum field. This field helps HW to determine which clusters must 'capture' the KEYDATA during the multi-cast KEYREQ command sent from LUF→Cluster complex (KRQ Bus). The KEYDATA has to be locally available (redundant) at ALL clusters with active TWE or BWE threads. The TWE uses KEYDATA during the TreeWalk process, and the BWE uses the KEYDATA the Rule Matching by RME.

BWCLMSK_ALT—Alternate BucketWalk Cluster Mask: Same as BWCLMSK above, but specifies which clusters within the opposite super-cluster will be responsible for BucketWalks. Valid in Single LUF mode only. For LUF0, these relate to SC1. For LUF1 these are not valid. USAGE IS AS FOLLOWS:
DUAL LUF MODE(LUF0 or LUF1): Full Bucket mask={8'h00, BWCLMSK}
SINGLE LUF MODE(LUF0 Only): Full Bucket mask={BWCLMSK_ALT, BWCLMSK}

The TLT table manager 474 in the PHE 470 generates up to 4 lookups in the TLT 433 for each entry in the New Queue TID section. This data may not be processed in the PHE 470 but instead may be sent to the Scheduler Output Manger (FIG. 15, below) to be used in the LFCG 492 there.

The PHT 430 may be configured as a 64-entry table to specify how to mask and multiplex a header of up to 512 bits into a key of up to 384 bits. Each HID may select a group of four PHT lines (or entries). Each line in the PHT 430 may correspond to one of the four TIDs in the GDT as follows:
PHT Index for TID0=HID+0
PHT Index for TID1=HID+1
PHT Index for TID2=HID+2
PHT Index for TID3=HID+3

Each line of the PHT 430 may contain 9 dimensions that specify how to mask and multiplex the header data, as well as four 4-bit key-map fields. Each of these dimensions may specify the following:
Source Field Start Bit Position
Source Field End Bit Position
Destination Field Start Bit Position
Destination Field Size (in bits)

Using this information, the PHT 430 can map 9 chunks from the header into the keys with bit resolution.

The PHT table manager 476 generates lookups into the PHT 430 for each entry in the new queue 472 HID section. A lookup is generated for each key. Therefore, a single new queue HID entry can generate up to 4 lookups. This data is used by the bit packer 484 to extract header payload data and generate a resulting Key Request (KRQ).

A programmable PHT byte swapper 480 is provided to adjust the Byte Endianness of host lookup request packets. Host read/write request packets are not affected. The PHT Byte Swapper 480 does not operate on the search processor header, which is the first 64 bits transmitted after the Interlaken Control word for each user packet. The PHT Byte Swapper operates on all data following the search processor header within the lookup request packet. A diagram illustrating different byte-swapping modes is described below with reference to FIG. 13.

The Payload/Packet Header Extractor Finite State Machine (PHE FSM) 482 brings together data from the PHT Byte Swapper 480, output of the Bit Packer 484, PHT 430 data (including a key in which dimensions extracted from a packet header are packed), and TLT 433 data (including identity of which cluster to process a given lookup request). The PHE FSM 482 may use these inputs to retrieve or generate KRQs that are then sent to the scheduler output manager (FIG. 15).

For each KRQ retrieved or generated, a 2 bit SXID is generated. LRT and LRT INFO entries at the LOP are reserved for each Key by pulling a KID from the free pools. The KIDs need to be pulled in advance and cached. If the system runs out of KIDs, the scheduler HOL blocks until KIDs become available through search completion.

The PHE FSM 482 checks the CMD field from the payload header data to determine the type of KRQ to form.

If it is a LUREQ and not in one-to-one mode, the PHE retrieves the KRQ from the bit packer 484, otherwise it generates the KRQ by parsing the payload header data to extract the necessary header fields for the KRQ type.

Figure 15:
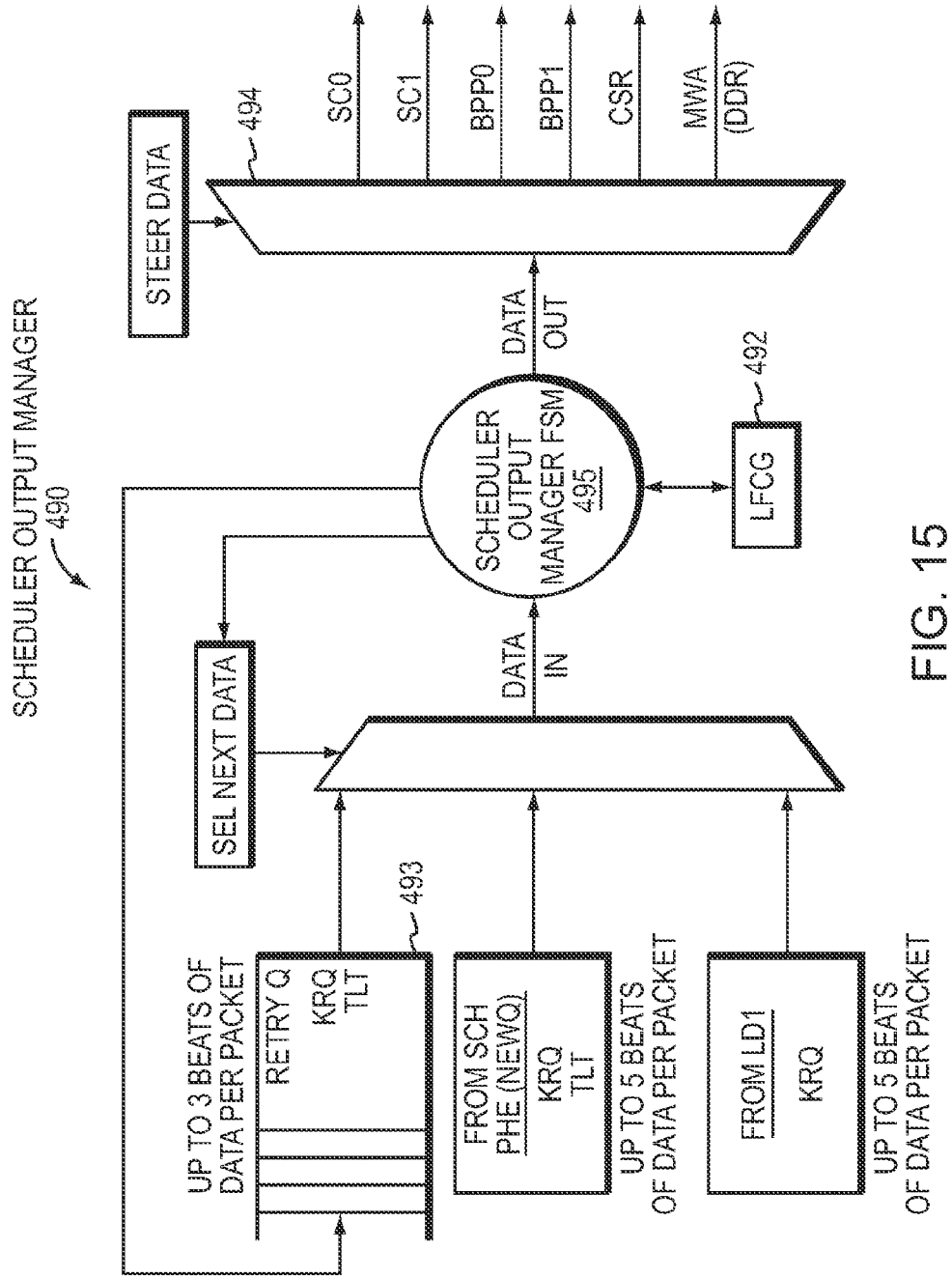
FIG. 15 is a block diagram of an example Scheduler Output Manager of a LIP.

The KRQ, along with the corresponding TLT 433 data, is sent to the scheduler output manager (FIG. 15). The KRQ data may be transmitted in 160-bit increments. The TLT 433 data may be sent in a single transmission with the KRQ start of packet (SOP).

Figure 13:
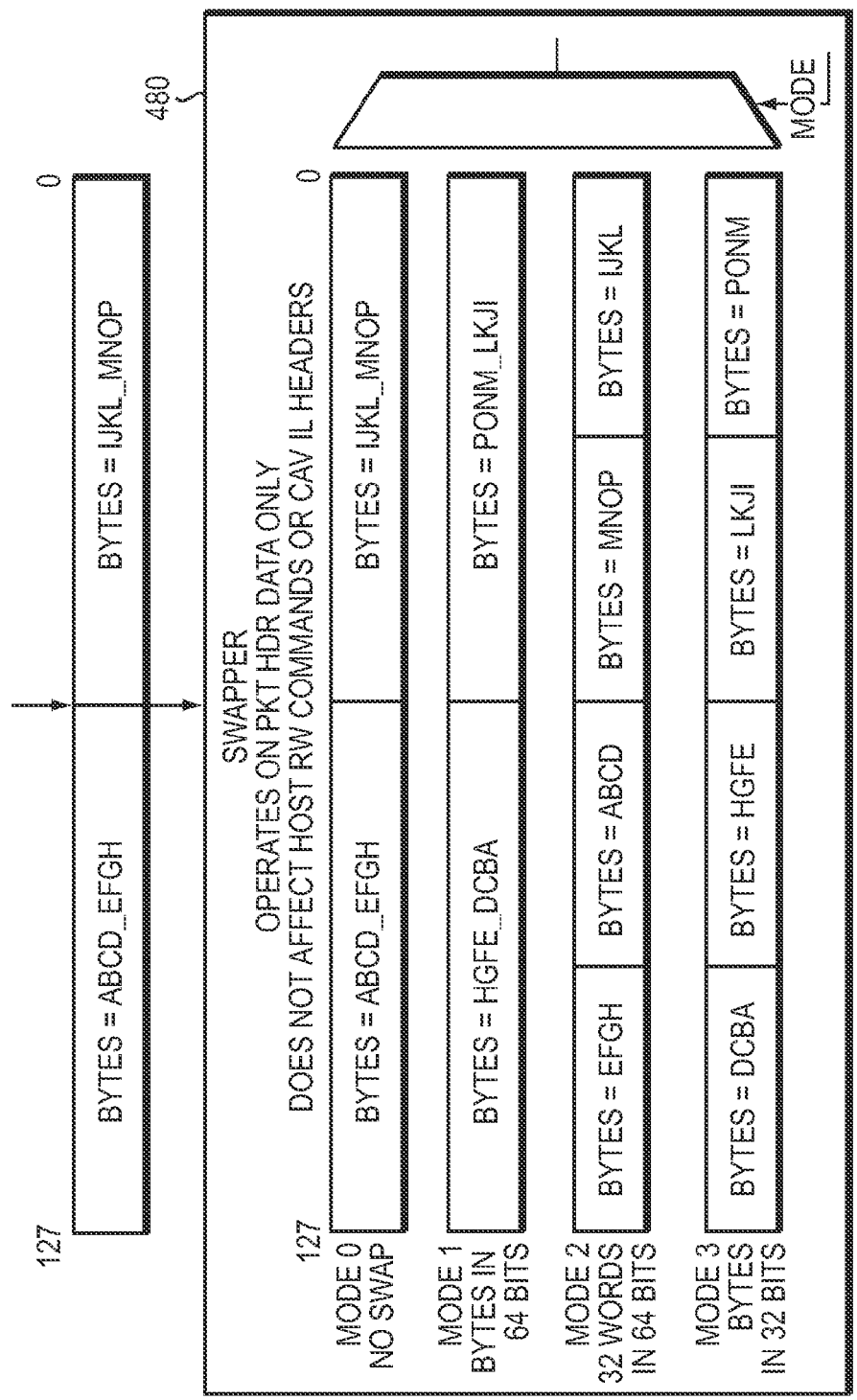
FIG. 13 is a packet diagram showing different byte swapping modes selectable by the LIP.

FIG. 13 is a packet diagram showing different byte swapping modes selectable by the PHT byte swapper 480 component of the PHE 470. The programmable byte swapper 480 adjusts the Byte Endianness of host lookup request packets. Host read/write request packets may not be affected. The PHT byte swapper 480 does not operate on the search processor header, which is the first 64 bits transmitted after the Interlaken Control word for each user packet. The PHT Byte Swapper 480 operates on all data following the search processor header within the lookup request packet.

The PHT Byte Swapper 480 Endian Mode is set in a configuration register, in accordance with a convenient embodiment of the present invention. In some cases, the minimum granularity of swapping is bytes and bit mirroring is not supported. Illustrated in FIG. 13 are example swap modes, which are mutually exclusive:
No Swap—do nothing
Swap Bytes in 64 bits—Reverse bytes within each 64 bit word.
32 bit words in 64 bits—Reverse 32 bit words within 64 bit words.
Swap Bytes in 32 bits—Reverse bytes within each 32 bit word.

Figure 14:
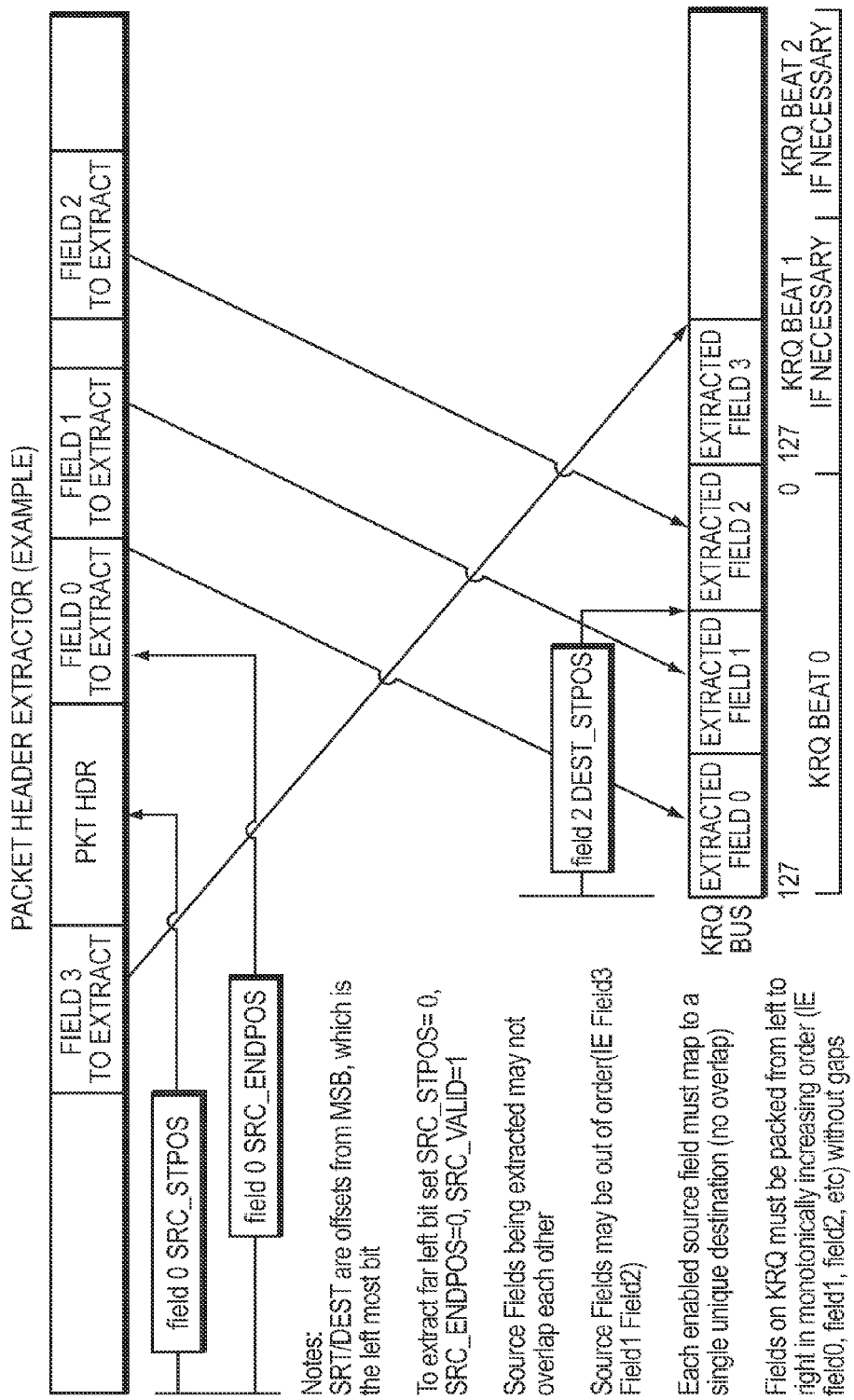
FIG. 14 is a packet diagram showing the PHE operating in Normal Key Expansion Mode.

FIG. 14 is a packet diagram showing the PHE 470 operating in normal key expansion mode. In this example embodiment, the PHE 470 extracts and processes header data to convert LUREQs and read/write requests into key requests (KRQs) in a LUF procedure referred to as key expansion or packet header extraction. There are two modes of key expansion for LUREQs: normal key expansion mode (when GID>0, which uses the Bit Packer block), and one-to-one Mode (which may be configured as a result of GID=0).

In normal key expansion mode, each LUREQ can spawn up to 4 Key Requests (KRQs), as described above with reference to FIG. 5. Although the example KRQ shown comprises 128 bits, a KRQ in further embodiments may include greater (e.g., 160) or fewer bits. Fields of the KRQ may be packed without gaps, or may include boundaries (e.g., zero fills) between fields. The programmable tables stored in the Packet Header Table (PHT) may be used to parse the LUREQs into the Key Requests. As shown in FIG. 5, a LUREQ may include the following fields:
XID (32 bits) ID from the host. Not used by the search processor; simply returned to the host with the response.
GID (8 bits)—Group ID—Identifier of what class of packet this is; controls how packet is to be processed.
Lookup Data—(Up to 512 bits)—Keys are formed from this data Returning to FIG. 14, in an example of the PHE operating in normal key expansion mode, 4 Chunks are being extracted from the packet header. The extraction of chunk 0 (CHUNK0) is shown in detail, with the field0 SRC_STPOS, SRC_ENDPOS shown. Note that dimensions of the Header need not be in order but when packed into the Key (KRQ), CHUNK0 must be the far left field. Note also that the bit offsets are from the far left bit.

Using the PHT 430 (FIG. 12), up to 4 Keys (KRQs) are generated from each LUREQ. Generated Keys (KRQs) are then passed to the PHE FSM 482 (FIG. 12), which sends them as KRQs to the scheduler output manager (FIG. 15) in 160-bit increments.

Conversely, in one-to-one mode, if the GID=0, then the header is to bypass the bit packer and is to be used directly as a single key. In Interlaken LA Compact mode, directly using a header as a single key reduces latency by one cycle for headers greater than 384 bits.

FIG. 15 is a block diagram of an example scheduler output manager 490, which may be a component of the scheduler 428*a-b* of the LIP 424. The scheduler output manager may operate as the "back-end" of the scheduler 428*a-b*. The scheduler output manager includes one or more of the following blocks: least full cluster generator (LFCG) 492, retry queue 493, output source selector 494, and scheduler output manager Finite State Machine (FSM) 495, each of which are described below.

The scheduler output manager 490, in example embodiments, may perform one or more of the following functions:
  Receives KRQs from the Scheduler PHE and from LUF Distributer 1 (LD1).
  Manages KRQs on the Retry Queue 493.
  Forces head of line blocking (HOLB) as required for the command flags: Atomic and Local Response.
  Uses the Least Full Cluster Generator (LFCG) 492 to determine which LUE clusters shall process each LUREQ KRQ.
  Schedules KRQs using a priority scheme and credit counters to select the next KRQ source (PHE, LD1, Retry Queue).
  Directs scheduled KRQs out one or more of several (e.g., 6) possible KRQ busses.

The scheduler output manager 490 selects one KRQ at a time from 3 possible sources, the PHE, LD1, and Retry Queue. The scheduler output manager 490 schedules each KRQ to be sent out one or more of the possible KRQ busses (e.g., SC0, SC1, BPP0, BPP1, MWQ (DDR), Global CSR/Tables). Alternatively, the scheduler output manager 490 can move LUREQ KRQs from the PHE to the Retry Queue or recirculate KRQs from the front of the Retry Queue to the back of the queue. The scheduler output manager 490 makes those decisions based on the KRQ CMD, noting credits available from each KRQ destination and running the Least Full Cluster Generator (LFCG) for LUREQ KRQs.

Host Read/Write requests flow through the scheduler pipeline in series with the lookup requests so that they are scheduled onto the KRQ bus, in order, with successful lookup requests. Lookup requests that fail scheduling and go to the retry queue will get out of order. Using the atomic or local response flags can be used to force certain ordering conditions (described later in greater detail).

The least full cluster generator (LFCG) 492 block determines which engines should process a given lookup request. The LFCG 492 uses data from the Tree Location Table (TLT) 433 (FIG. 12) to retrieve the necessary information to locate clusters that could do the work.

In an example embodiment, the LCC includes 2 super-clusters and, and each super-cluster may include 8 clusters. The activity levels of the search engines in each cluster are monitored by the LFCG 492 using one credit/debit counter for each cluster. In single-LUF mode, the single SCH0 maintains all 16 counters to cover both super clusters. In dual-LUF mode, the 2 Schedulers maintain 8 counters each. Each credit represents one FIFO location in the cluster Input Queues. The credit/debit counters are reset to the depth of the FIFO. The counters are decremented by the LFCG when a job is scheduled to the cluster. They are incremented when a cluster indicates it has removed an entry from the FIFO.

The LFCG 492 may generate the following fields:
  LFTWCLMSK—Least Full Tree Walk Cluster Mask— There is one bit per cluster. Each bit set in this mask indicates that the corresponding Clusters shall begin work. In dual LUF mode, only LFTWCLMSK[7:0] from each scheduler is used.
  KCLMSK—Key Cluster Mask—There is one bit per cluster. Each bit set in this mask indicates that the corresponding Clusters latch the KEYREQ when it is broadcast, because the cluster may need to make use of the data. In dual LUF mode, only KCLMSK[7:0] from each scheduler is used.

The LFCG block responds to the Scheduler with:
  SCL
  LFTWCLMKS
  KCLMSK
  ACK/NAK—LFTWCLMSK generation Success=1, fail=0.

The LFCG 492 generates the LFTWCLMSK based on information it reads from the TLT 433 and its own credits. Each bit in this mask causes a thread to start work. Due to details within the lookup cluster complex (LCC), this may not necessarily match the number of responses that the LUF received back. Thus, the TWRSPCNT from the TLT contains the actual number of responses that the LUF should expect.

When a scheduling attempt for a single Key fails, the request is moved to the retry queue 493 to avoid head of line (HOL) blocking HOL blocking will happen when the clusters that match the TWCLMSK are too busy to accept the job.

The retry queue 493 is sized to hold up to 8 KRQ beats. Only lookup requests go to the retry queue 493. Host read/write commands do not go to the retry queue and will cause HOL blocking if these commands are not successful.

Lookup requests placed on the retry queue 493 will get out of order with respect to in-order host R/W commands. If this is not acceptable for the given application, then either the retry queue 493 may be disabled or the host may intervene using the provided atomic commands.

The retry queue 493 entries may be of the same format as the interface from the PHE 470 (FIG. 12). This includes both the fully formed KRQ (in 160-bit increments of data) plus the entire TLT data for that Key. It may require up to 4 FIFO entries (4 clocks) to store the entire KRQ data. The scheduler 428*a-b* (FIG. 11) outputs IDLE to the KRQ busses while the scheduler 428*a-b* moves the data from the PHE 470 to the retry queue 493.

The scheduler output manager 490 may include a programmable RETRY_LOCKOUT_COUNTER to determine how many host commands are pulled from the new queue 472 before the retry queue 493 is drained (emptied). The counter is reset to the value in the RETRY_LOCKOUT_CFG register and decremented each time the PHE reads an SOP from the New Queue Payload FIFO (before the multiple KRQs are generated). The RETRY_LOCKOUT_CFG may also be set to disable the retry queue 493.

Further, a programmable RETRY_HIGH_WATERMARK determines the maximum fill level for the retry queue before the retry queue is drained. The minimum setting for RETRY_HIGH_WATERMARK is 0x3. A setting of "N" means that the Retry Queue will be drained when N+1 KRQ Beats are written into it. If the RETRY_HIGH_WATERMARK is set larger than the size of the RETRY_QUEUE, then the retry queue 493 will be drained if it reaches the maximum fill level of the memory.

In addition, the retry queue 493 is drained before processing an Atomic command. (Atomic commands drain all of a specified TID before proceeding.) Draining is required to handle the case where a specified TID is in the retry queue.

Once the retry queue 493 is selected for draining, the new queue data from the PHE 470 will not be selected again until the retry queue is empty (i.e., drained). This prevents a lockout condition. During the draining of the retry queue 493, any KRQ that cannot be scheduled due to lack of success from the LFCG 492 are recirculated to the back of the retry queue 493. The scheduler 428*a-b* will output IDLE (up to 4 clock cycles) while the KRQ is recirculated to the back the queue and new data is advanced to the front of the retry queue.

In summary, the retry queue may be completely drained (i.e., emptied of requests) under 3 conditions: RETRY_LOCKOUT_COUNTER, Atomic Command, and RETRY_HIGH_WATERMARK.

The retry queue 493 may also be accessed but not fully drained on a further condition. If the retry queue 493 is not selected but there is an idle cycle on the flow of data from the PHE 470, and if the LFCG 492 from retry would succeed, then a single KRQ is pulled and scheduled from the retry queue 493. These idle cycles could occur either because of an empty new queue 472, or by an occasional bubble caused by forming a small key from a large header, for example a 384 bit key (3 cycles) from a 512 bit header (4 cycles). The LFCG 492 may be constantly calculated on the entry on the head of the retry queue even when it is not selected to be completely drained, and so it is not necessary to pop the entry to determine if the entry would be successfully scheduled.

All channel 0 Host Read/Write requests may include the following flags: Atomic, Host-Resp, and Local-Resp. These flags may not be valid for Channel 1 requests or for lookup requests. The flags are described below.

Atomic access is a mechanism that stops all traffic into the system until all activity for a single table identifier (TID) is entirely drained. Atomic access can be useful for table updates because it ensures that all searches in progress using these tables are finished before writes can occur. Atomic access allows all searches to work on Atomic data either before the update or after the update but not in the middle of an update.

To implement Atomic access, an array of 256 per-TID counters is provided to track the number of jobs in flight for each TID. These counters are incremented when the LUF actually schedules a key/SXID, and decremented when all responses for that key/SXID have returned. Key requests that are on the retry queue may not increment these counters until those keys are actually scheduled.

When a command is processed with an Atomic bit set, the scheduler output manager 490 performs the following:
  Drains the retry queue
  HOL blocks while waiting for the TID counter that matches the TID field in the command to go to zero.
  Issues the host read or host write command.

A Host-Resp flag causes the search processor to send a response back to the host. The Host-Resp flag only has meaning for host writes (host reads always send a response). The Host-Resp flag allows the host to determine when a write has completed.

To implement the Host-Resp flag, the scheduler sets a signal as part of a command that is sent downstream. Response block handles sending back a response.

A Local-Resp flag causes the search processor to issue the host read or host write command, and then HOL block all traffic until the command is retired. A response may be sent later.

The scheduler output manager 490 maintains the following credit/debit counters to determine if an access to the KRQ bus is allowed:

Cluster Credits—1 counter per engine. SCH0 needs 16 clusters for single LUF mode, and 8 counters for dual LUF mode. SCH1 operates only in dual LUF mode, so needs only 8 counters. Each counter keeps up to 16 credits per cluster. Each credit represents one KRQ beat. These are debited for the following:
  Lookup Requests
  OCMEM RD/WRT
  LCC Table RD/WRT Global Interface Credits—both SCH0 and SCH1 feed into a small FIFO in the global block, which is also fed by the channel 1 distributer. All 3 of these sources keep a credit/debit to ensure they do not over-run the FIFO, and must ensure at least 3 credits remain.

DDR Write Credits—kept only by SCH0, as SCH1 does not get DDR commands. MBC can accept 16 host writes.

DDR Read Credits—Kept by SCH0 only. BPP can buffer up to 4 host reads. Credit/debit ensures BPP is not over-run.

BPP Host Table Credits—Kept by SCH0 only. Credit/debit ensures BPP is not over-run. Credits are shared between BPP reads and write with responses. Credits are not adjusted for writes without responses, as LOP can buffer an unlimited number of responses.

The scheduler output source selector 494 provides for selection among the connect outputs for transfer of the output of the SOM FSM 495. The Schedule Output Manager 490 controls the selector 494 to select the source of the next KRQ to be sent from the scheduler (SCH) 428*a-b* based on the following states:
  Select PHE (SCH outputs new queue data on the next clock)
  Select RetryQ (SCH outputs retry queue data on the next clock)
  Select LD1 (SCH outputs ILKN channel 1 data on the next clock)
  PHE to RetryQ (SCH pushes new queue data from PHE onto the retry queue and outputs idle on the next clock)
  Recirculate RetryQ (SCH recirculates data on the retry queue and outputs idle on the next clock Once a source has been selected, the entire KRQ packet is sent (SOP through EOP) before the source for the next SOP is selected.

Figure 16:
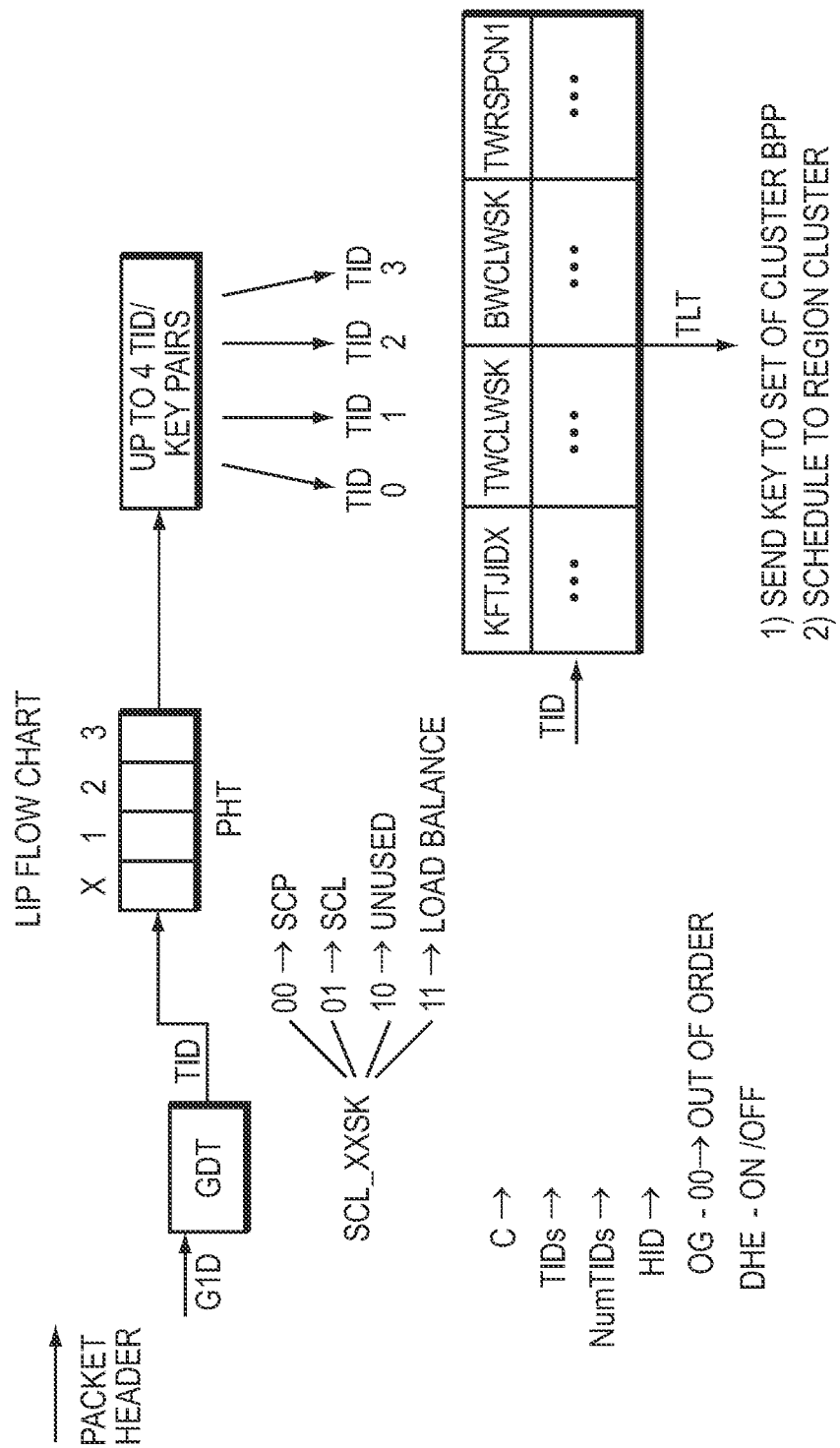
FIG. 16 is a data flow diagram of an example procedure for parsing requests and commands and scheduling them to internal resources.

FIG. 16 is a data flow diagram of an example procedure for parsing requests and commands and scheduling them to internal resources for packet classification. The procedure is derived from the processes described above with reference to FIGS. 11-15. The procedure may be performed by a LIP (e.g., the LIP 424 of FIG. 11). The procedure may also be performed by a computer (or processor) transformed into a LIP by loading and executing instructions representing the example procedure described below.

According to embodiments of the present invention, a LUF input processor (LIP) may be a physical network node (or device), such as a switch or router, in a network of other nodes. The LIP may be part of a physical network node (or device) as a component, module, blade or card of that node.

According to another embodiment of the present invention, the LIP is a general purpose computer having a processor, memory, communication interface, etc. (described in greater detail below in reference to FIG. 23). The general purpose computer is transformed into the LUF and its components, for example, by loading instructions into the processor that cause the computer to process lookup requests received from a host to determine the best match and return responses to the host.

Figure 17:
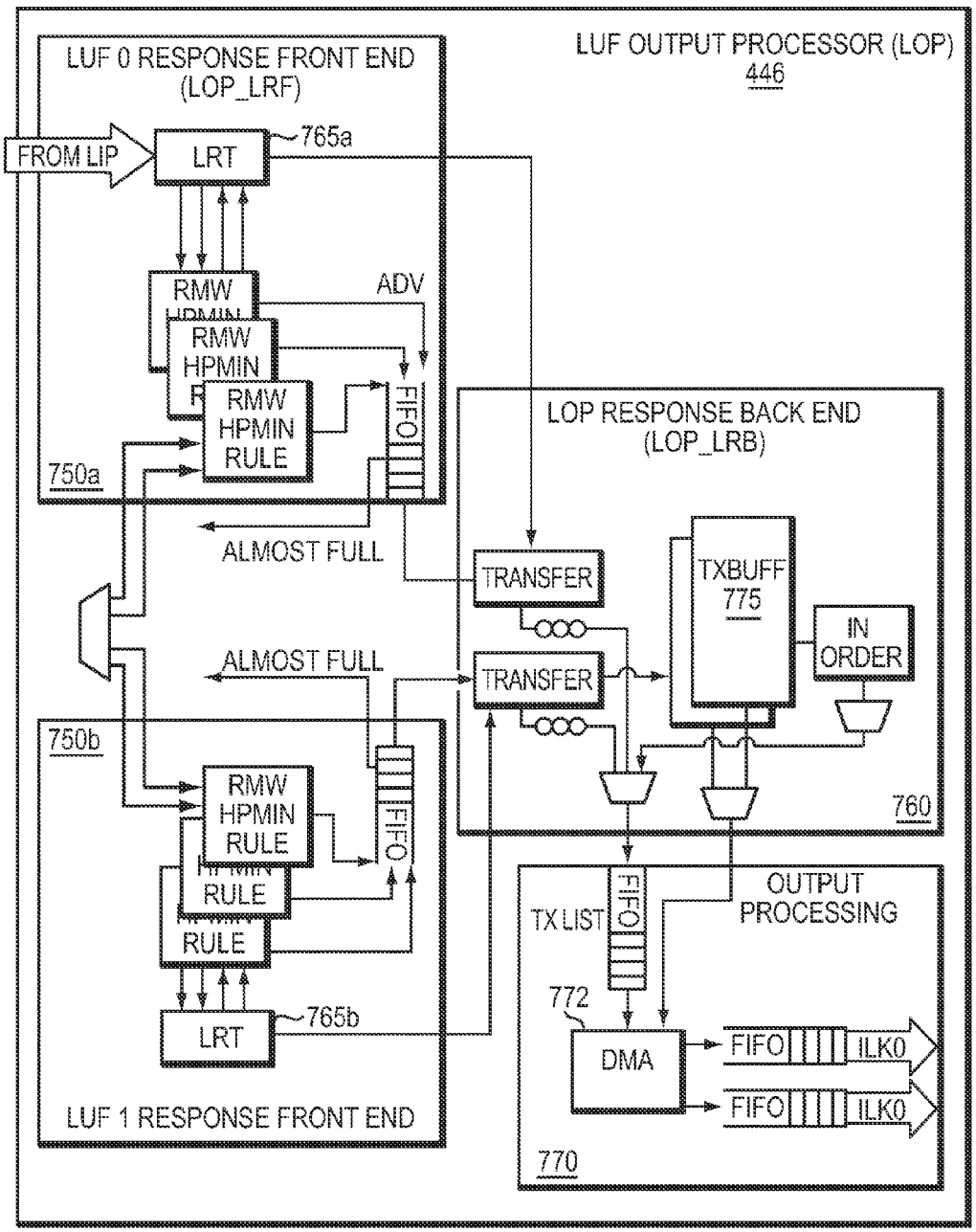
FIG. 17 is a block diagram of an example LUF output processor (LOP).

FIG. 17 is a block diagram of an example LUF output processor (LOP) 446, which is a component of lookup front end (LUF) 408 as described above with reference to FIG. 4B. The LOP 446 receives responses from internal chip resources (e.g., lookup clusters 413a-d, FIG. 4A) that are initiated by the LIP (e.g., LIP 424, FIG. 11). These responses are processed and transmitted back to the host processor over Interlaken or I2C modules. Responses may include host read or write responses from resources, such as DDR, Clusters, BPP or global tables, and CSRs. Responses may also include lookup responses that are evaluated by the LOP for best match before transmission back to the host processor.

The LOP 446 includes a response-processing front end block (LOP_FE) 750a-b, a response-processing backend block (LOP_BE) 760, and output processing block (LOP_OP) 770.

Further, The LOP 446 maintains two tables that are initialized by the LIP 424 (FIG. 11) and lookup clusters. The tables hold the context for searches in progress, and include the lookup response table (LRT) 765a-b, which tracks searches currently being performed by the clusters; and the transmit Buffer (TXBUFF) 775, which buffers results of searches that the clusters have completed. As described below, the results are optionally stored and returned in order of request or coalesced.

In a general operation, the LOP_FE 750a-b receives work from either the LUE clusters or Bucket Packet Processors (BPP). As responses are received, they are located in the LRT 765a-b, and optionally coalesced with other keys from the same packet, an operation described in detail below. A single LOP_FE 750a may be configured to interface with a single corresponding super cluster (e.g., super cluster 410a in FIG. 4A), may interface with multiple super clusters, or may share a common super cluster with another LOP_FE 750b.

The LOP_BE 760 interfaces with the LUF_FE 750a-b. The LOP_BE 760 may provide for buffering and reordering responses. The buffering and reordering of responses is done to preserve lookup order and for grouping responses into coalescing groups. The LOP_BE 760 collects responses and places them into the TXBUFF 775 slots that were reserved by the LIP 424 (FIG. 11) prior to initiating a search. When responses are ready for transmit, the LOP_BE 760 places indexes of TXBUFF 775 into a TX_LIST register for the output processing block LOP_OP 770.

The LOP_OP 770 manages the interface to the TX Interlaken controller. The LOP_OP 770 includes output queues for host read/write responses, as well as a direct memory access (DMA) engine 772 for pulling lookup responses from TXBUFF according to the TX_LIST. The LOP_OP 770 formats the internal queue data into packets output to the host.

Lookup responses are tracked and processed by a coordinated operation of the LIP 424 and LOP 446. The tracking of responses is begun, as described above, by the LIP 424 distributer (e.g., 460a-b, FIG. 11) when the LIP distributer initializes fields in the TXBUFF. The operation is continued by the LIP 424 schedulers (e.g., 428a-b, FIG. 11) when the LIP schedulers initialize the LRT and LRT_INFO tables. The LOP_FE 750a-b uses this information to process the responses to determine the best response of all tree walks for a given KEY/SXID. Control then passes to the LOP_BE 760 to process the now finished KEY/SXID. Based on the coalesce bit of the LRT 765a, the LOP_BE 760 will either coalesce all the SXIDs for a given XID into a single response or send a response to the host as soon as available. Based on the range of TXID, the LOP_BE 760 will either reorder this response or return the response in the order that the associated request was received.

Component blocks of the LOP and their operation are described in further detail below with reference to FIGS. 18-22B.

Figure 18:
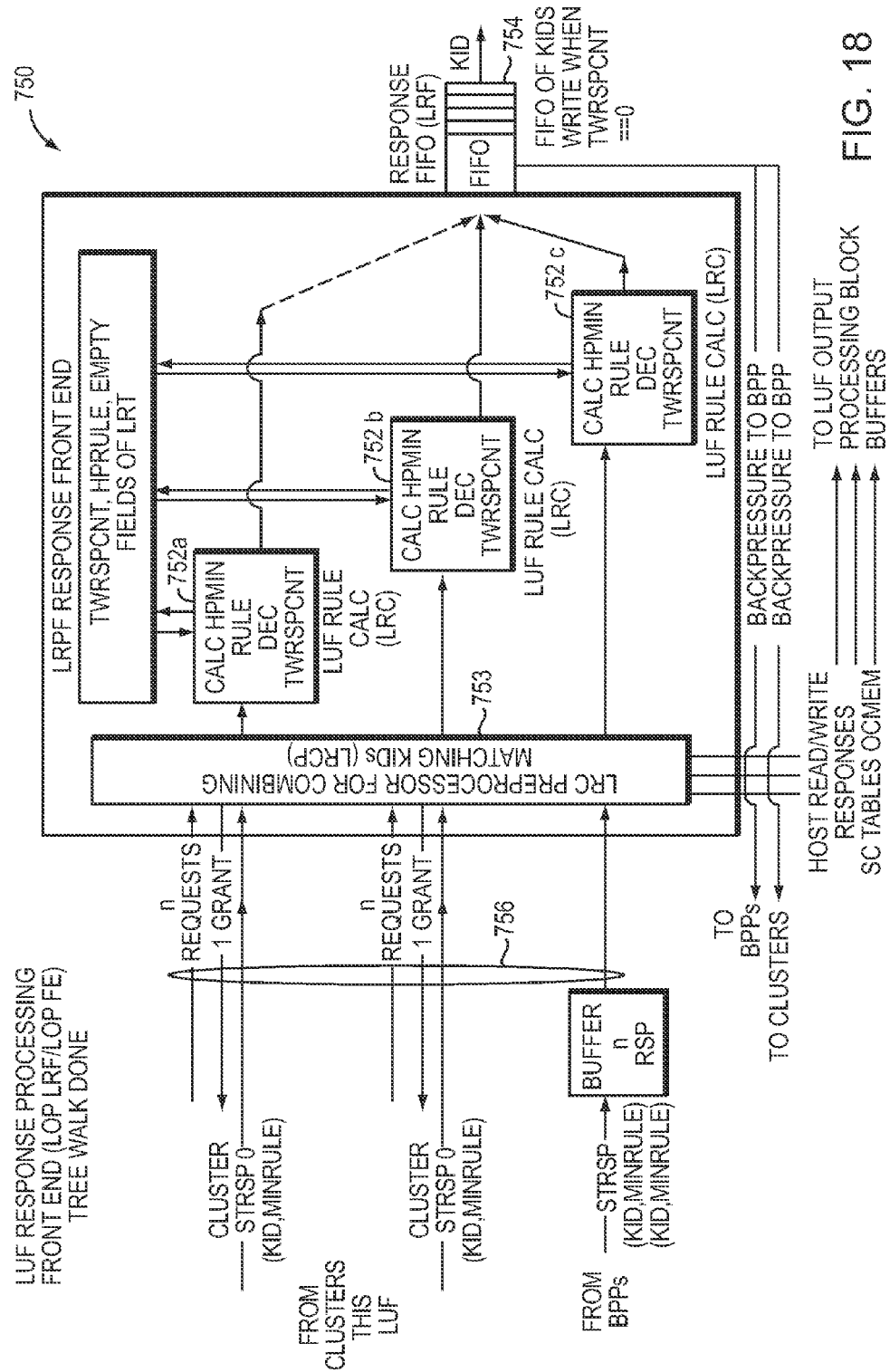
FIG. 18 is a block diagram of an example LUF Response Processing Front End (LOP_FE).

FIG. 18 is a block diagram of an example LUF Response Processing Front End (LOP_FE) 750. The LOP_FE 750 includes, among other components, a LUF Rule Calculator (LRC) 752a-c, LUF Rule Calculator Preprocessor (LRCP) 753, and LUF Response FIFO (LRF) 754, which are described in greater detail below.

In operation, the LOP_FE 750 receives responses from the clusters and BPP returned over the sub-tree response (STRSP) bus 756. The clusters return both lookup responses, as well as, the responses for host read/write commands on the STRSP bus 756. The BPP returns only lookup response on the STRSP bus. The BPP host read/write commands may be returned on a different bus.

When the STRSP bus 756 carries lookup responses, each of the lookup responses includes:
RSPTYPE—Indicates lookup response, OCM response, Table or CSR response.
KID—Key ID
DATA—Indicates which rule matched (SC Num, DDR/COM address, and other info).
STMIN—Quality of result—LUF chooses the minimum. In case of a tie, first response back wins.

In general, the LOP_FE 750 accepts a new response every clock. The LOP_FE 750 may not be configured to back-pressure the clusters without impacting performance. In the cases where a number of sub-trees return their final response on back-to-back clocks, the RESPONSE_FIFO 754 may become full. To prevent this, the RESPONSE_FIFO 754 may send a stall signal to both BPPs and to the super cluster based on a programmable watermark CSR.

Host read/write responses from the clusters may also be transmitted across the STRSP bus 756. Such responses may flow to a different FIFO (not shown), the fill level of which can be managed by the super clusters.

The LUF Rule Calculator (LRC) 752a-c receives sub-tree responses (STRSPs) from the clusters via the STRSP bus 756. One of the LRCs (e.g., 752c) may receive responses exclusively from the BPPs.

Each sub-tree response (STRSP) may include the following:
STMIN—consumed by LOP 446
STDATA—Adjusted by LOP 446 as follows, and then returned to the Host:
  If the response is from BPP, then STDATA[32] contains the DDR port #, STDATA[31:0] contains DDR address with 16 bit granularity.
  If Response is from LCC, then STDATA[23:0] contains rule address in OCMEM={SCL, CLNUM, CLADR, RULEOFF}. In this case, the LRC should always set STDATA[32] to 0. STDATA[31:24] are expected to be returned from LCC as zeros, but LRC should use all the bits returned (only zero STDATA[32]).

For each STMIN response returned, the LRC 752*a-c* does the following:
  If LRT[VALID]=0, then the STMIN returned is written to the LRT. If LRT[VALID]=1, then the STMIN that is returned is compared to the STMIN in the LRT, and the lowest value of the two values written back into the LRT.
  Decrement TWRSPCNT (tree walk response count. When TWRSPCNT becomes zero, it indicates all the responses for this SXID have been received. If so, write KID to the response FIFO (LRF).
  Set LRT[STDATA] to the STDATA field associated with the STMIN being written.
  If response is from BPP, clear LRT[OCRF], otherwise set LRT[OCRF]
  If the error bit in the response is set, the LRC is to consider this the "winning" response and maintain the data returned with the response. Any time LRT[E] is already set, then new responses are to be ignored.

Each of the LRCs 752*a-c* may receive responses for the same KID on the same clock. This result would be a problem if each LRC 752*a-c* attempted to update the same HPM-RULE and TWRSPCNT on the same clock. To avoid this, the preprocessing block LRCP 753 combines the STRSP responses for any matching keys into a single response by retaining the minimum and discarding the others. The "winning" response continues to the LRC 752*a-c*, while the others are eliminated. A LRC_TWRSPCNT_DEC[1:0] signal is generated and passed to LRC0, causing TWRSPCNT to be decremented by the number of responses returned, rather than just by one as in a typical case. Any responses for KIDs that do not match may be passed through unmodified with a LRC_TWRSPCNT_DEC=1.

Host read/writes responses for OCMEM and Super Cluster and BPP tables also flow to the LRCP 753 over their respective clusters and BPP response busses 756. Such responses are redirected to the LUF output processing block (LOP_OP 770, FIG. 20) to be buffered for transmit. They may not flow to the LRC 752*a-c*.

The LRCP 753 can also provide a request/acknowledge function to enable the lookup cluster complex (LCC) to send data.

The 64-entry LUF RESPONSE_FIFO (LRF) 754 holds KIDs for Keys/SXIDs that have received all the responses for that key, meaning that STRSP (sub-tree response) has been determined. In this manner, when a key request was split into multiple sub-tree request by the LIP 424 (described above with reference to FIG. 11), the corresponding results are merged back into a single response at the LRF 754. The LOP_BE 446 (FIGS. 17, 20) reads the LRF 754 to determine the entries that are ready to transfer from the LRT 765*a-b* to the TXBUFF 775.

The LRF 754 may be fed by busses associated with the output of the LRC 752*a-c* and the BPP buses. In an example embodiment, up to 3 KIDs may be written to the LRF (FIFO) during each clock cycle each clock. One entry is read from the LRF each clock. In general, reads may occur more quickly than writes, as multiple STRSPs are required for a single KID write.

Due to alignment of independent Keys finishing back-to-back on successive clock cycles, the LRF (FIFO) 754 may occasionally start to become full. A programmable watermark (threshold) may determine when the LRF 754 is about to be full. The watermark may cause the LRCP 753 (LUF rule calculator preprocessor) to stop accepting responses on the STRSP bus 756.

Figure 19:
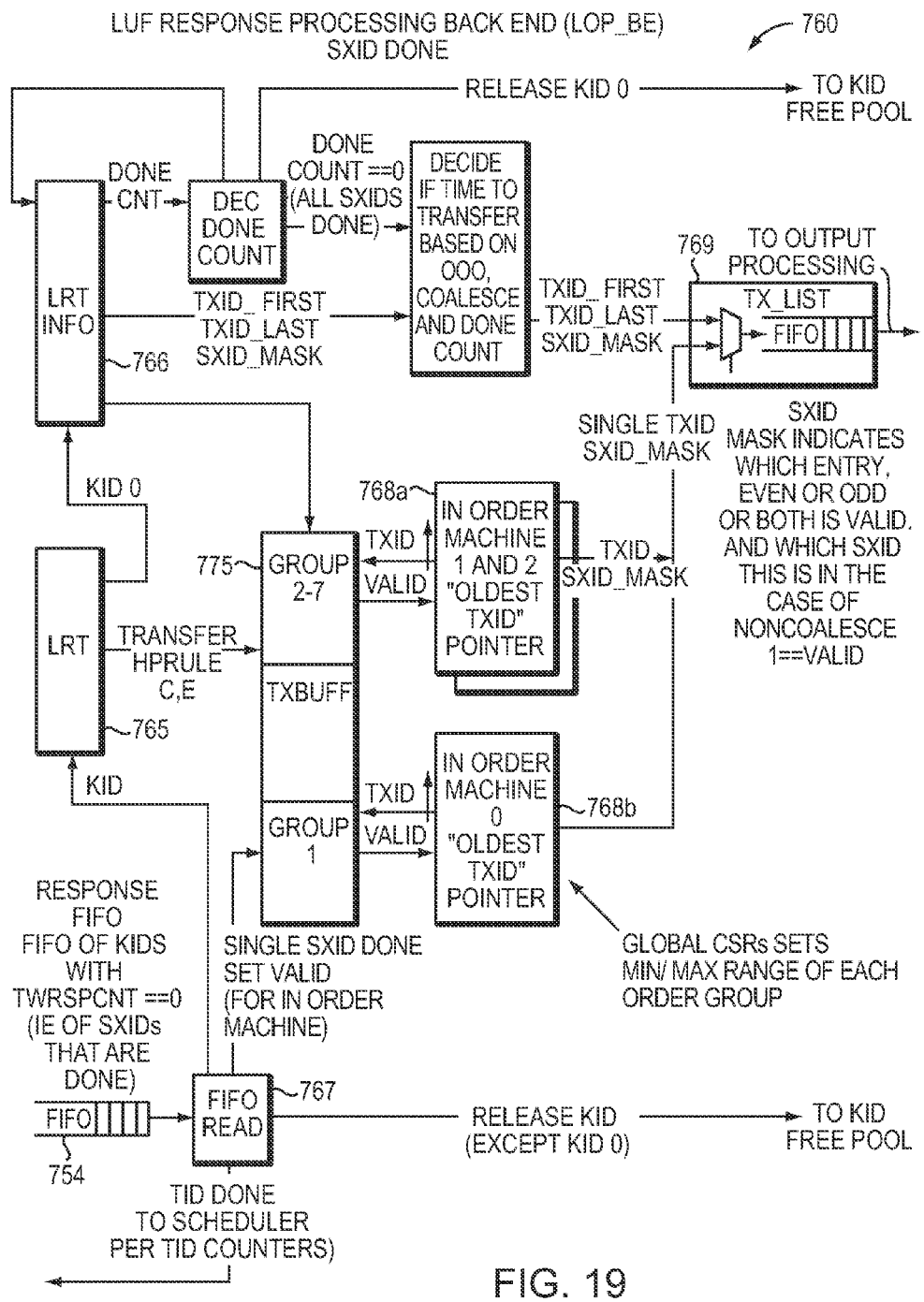
FIG. 19 is a block diagram of an example Lookup Response Processing Back End (LOP_BE).

FIG. 19 is a block diagram of an example lookup response processing back end (LOP_BE) in an example embodiment. The LOP_BE 760 pulls work from the response FIFO 754 at the LOP_FE 750 (FIG. 18). The LOP_BE 760 works on both in-order and out-of-order responses, as determined by the order group of the TXID being accessed. TXIDs in group 0 range are out of order. All other TXIDs may be in order. The LOP_BE 760 operates in one of two modes to accommodate in-order and out-of-order responses as follows:
  In-order responses (polling mode): A pointer tracks the TXBUFF entry corresponding to the oldest request (determined by walking TXIDs in a circular fashion within that order group range) in the LRT. When the final STRSP for that XID is received, all SXID's are enqueued for transmission to the host, and may be removed from the LRT. The pointer is then incremented to point to the next oldest TXID. This causes HOL blocking until the next in order response returns.
  Out-of-order responses (interrupt mode): The return of the final STRSP for an XID causes all SXID's to be enqueued for transmission to the host, and removed from the LRT.

In addition, the LOP_BE 760 can either coalesce multiple lookup responses (LURSP) into a single packet or send them individually. All in-order responses may be coalesced. Out-of-order (OOO) responses may be either coalesced or returned to host as soon as available. Details of the foregoing operation are described below.

As an initial step in both in-order and out-of-order processing, the LOP_BE 760 works in interrupt mode in response to the RESPONSE FIFO becoming non-empty. It completely handles out-of-order responses, and does the initial step of the processing the in-order responses. The final processing of in-order responses is handled by the in-order machines, described below.

In all cases of ordering and coalescing, when an entry is read off the Response FIFO 754 by FIFO read block 767, the LOP 760 does the following:
  Read Look Response Table (LRT) 765 and then LRT_INFO 766.
  When the LRT 765 and LRT_INFO 766 are read, the response has the following information available:
    KID
    TXID_FIRST
    TXID_LAST
    SXID—which SXID is this one.
    SXID_NUM—how many SXIDs are there in this request
    DONE_CNT—how many SXIDs left to coalesce
  Move LRT data to TXBUFF 775
    When moving SXID0 or SXID1 data from LRT to TXBUFF, TXID_FIRST is used as TXID index into TXBUFF.
    When moving SXID2 or SXID3, TXID_LAST is used as TXID index.
    SXID0 or SXID2 data is moved into STDATA_EVEN.
    SXID1 or SXID3 data is moved into STDATA_ODD.
  Return KID to free pool, unless this is SXID0. Hold KID for SXID0 until indicated by table below.

The LOP may perform the following additional actions listed in Table 1.

TABLE 1

Response Processing Machine Actions Based On Case

| Order Mode | Coalesce | LOP Action based on reading Response FIFO, then LRT and LRT_INFO |
|---|---|---|
| OOO | No | If LRT[SXID] == SXID0 or SXID1,<br>    Place TXID_FIRST on TXLIST.<br>Else if LRT[SXID] == SXID2 or SXID2<br>    Place TXID_LAST on TXLIST.<br>Set SXID_INFO of TXLIST to indicate which SXID. (Set to value of LRT[SXID]).<br>    Possible values:<br>        2'b00 for SXID0<br>        2'b01 for SXID1<br>        2'b10 for SXID2<br>        2'b11 for SXID3<br>If SXID0 or SXID2<br>    Set VALID_EVEN<br>Else if SXID1 or SXID3<br>    Set VALID_ODD<br>If NEED_BOTH==1 and VALID_EVEN and VALID_ODD<br>    set FREE_TXID<br>Else if NEED_BOTH==0 and VALID_EVEN<br>    set FREE_TXID |
| OOO | Yes | If( DONE_CNT==0)<br>    Place TXID_FIRST and TXID_LAST on TX_LIST<br>    Set SXID_INFO = LRT_INFO[SXID_NUM] to indicate the number of SXIDs that are valid.<br>    Set FREE_TXID<br>Else<br>    DONE_CNT = DONE_CNT-1 |
| In Order | No | If this is SXID 0 or 2, set valid_even<br>If this is SXID 1 or 3, set valid_odd<br>In order machine will handle from there. |
| In Order | Yes | If( DONE_CNT == 0)<br>    Case(LRT[SXID_NUM]) //How many SXIDs are there?<br>    2'd1: // One entry<br>        Set TXID_FIRST[VALID_EVEN]<br>        Set TXID_FIRST[LAST]<br>        Set TXID_FIRST[C]<br>    2'd2: // 2 entries<br>        Set TXID_FIRST[VALID_EVEN]<br>        Set TXID_FIRST[VALID_ODD]<br>        Set TXID_FIRST[LAST]<br>        Set TXID_FIRST[C]<br>    2'd3: // 3 entries<br>        Set TXID_FIRST[VALID_EVEN]<br>        Set TXID_FIRST[VALID_ODD]<br>        Set TXID_FIRST[C]<br>        Set TXID_LAST[VALID_EVEN]<br>        Set TXID_LAST[LAST]<br>        Set TXID_LAST[C]<br>    2'd0: // 4 entries<br>        Set TXID_FIRST[VALID_EVEN]<br>        Set TXID_FIRST[VALID_ODD]<br>        Set TXID_FIRST[C]<br>        Set TXID_LAST[VALID_EVEN]<br>        Set TXID_LAST[VALID_EVEN]<br>        Set TXID_LAST[LAST]<br>        Set TXID_LAST[C]<br>In order machine will handle from there. |

The in-order machine 768a-b provides for reordering responses so they are returned in order of requests, rather than in order of finishing processing. The in-order machine 768a-b will park at the first non-valid TXBUFF location within a region, which is defined by IN_ORDER_MIN_N to IN_ORDER_MAX CSR values. When the LOP_BE sets the valid flags for that location, indicating that all necessary information has been moved from LRT 765 to TXBUFF 775, the in-order machine 768a-b will process this line of TXBUFF 775 and then increment to the next location in TXBUFF 775, waiting to repeat the process. Since TXBUFF 775 entries are assigned to incoming packets in increasing sequential order as they arrive, the in-order machine 768a-b will pull the entries off the list in order, regardless of the sequence that the arrive in the TXBUFF 775. When the in-order machine 768a-b determine it has a handle to all the TXIDs required for a single coalesced packet, it writes these TXIDs to the TXLIST 769.

The in-order machine 768a-b may put up to two TXBUFF lines at a time in the TXLIST 769. The downstream output processor may read these lines off the FIFO back-to-back. For this mode, if 3 or 4 keys, the machine 768a-b must store TXID_FIRST in TXID_FIRST_REGISTER, and write TXID_FIRST and TXID_LAST onto the TXLIST 769 in a single cycle. Like the out-of-order machine, it keeps a SXID_COUNTER to track which SXID we are working on. The in-order machine 768a-b actions are detailed in Table 2.

TABLE 2

In Order and Coalesce - In-Order Machine Actions

| Order Mode | Coalesce | Need Both | Valid Even | Valid Odd | LOP In Order Machine Action |
|---|---|---|---|---|---|
| In Order | 1 | 0 | 0 | 0 | Wait at this TXID |
| In Order | 1 | 0 | 0 | 1 | Invalid Case |
| In Order | 1 | 0 | 1 | 0 | LAST must be ==1.<br>We know this because it must be SXID0 of a 1 key packet, or SXID3 of a 3 key packet.<br>SXID COUNTER++<br>Write SXID_COUNTER to TXLIST[SXID_INFO]<br>If SXID_COUNTER indicates one or 2 keys:<br>    Write TXID to TXLIST[TXID_FIRST]<br>    Write anything to TXLIST[TXID_LAST]<br>Else we have 3 or 4 keys:<br>    Write TXID_FIRST_LATCHED to TXLIST[TXID_FIRST].<br>    Write TXID to TXLIST[TXID_LAST]<br>set FREE TXID<br>Advance TXID,<br>Reset SXID_COUNTER |
| In Order | 1 | 0 | 1 | 1 | Invalid Case |
| In Order | 1 | 1 | 0 | 0 | Wait at this TXID |
| In Order | 1 | 1 | 0 | 1 | Wait at this TXID |
| In Order | 1 | 1 | 1 | 0 | Wait at this TXID |
| In Order | 1 | 1 | 1 | 1 | If LAST == 0<br>    Advance TXID<br>    SXID_COUNTER++<br>Otherwise, LAST==1<br>    SXID_COUNTER++<br>    Update TXLIST:<br>    Write SXID_COUNTER to SXID_INFO<br>    If SXID_COUNTER indicates one or 2 keys:<br>        Write TXID to TXLIST[TXID_FIRST]<br>        Write anything to TXLIST[TXID_LAST] |

TABLE 2-continued

In Order and Coalesce - In-Order Machine Actions

| Order Mode | Coa-lesce | Need Both | Valid Even | Valid Odd | LOP In Order Machine Action |
|---|---|---|---|---|---|
| | | | | | Else we have 3 or 4 keys: Write TXID_FIRST_LATCHED to TXLIST[TXID_FIRST]. Write TXID to TXLIST[TXID_LAST] set TXLIST[FREE_TXID] Advance TXID, Reset SXID_COUNTER |

The TXLIST 769 is a FIFO of TXIDs. The TXLIST 769 is written by the LOP, and is used by the TX Queue DMA engine (described below with reference to FIG. 20) to determine which TXBUFFs to transfer to the Interlaken SHIM for transmission back to the host. For in-order processing, the order of TXIDs on the list generally determines the order of transmission to the host. In embodiments configured to operate with multiple hosts as described below with reference to FIGS. 24-28, the TXLIST 769 may be a plurality of TXLISTs, where each TXLIST is assigned to a respective host.

The TXLIST 769 may accept 1 or 2 entries per clock. Each entry represents a line in the TXBUFF 775 which in turn holds 1 or 2 HPRULE entries (representing one or two SXIDs). Thus each line written into TXLIST 769 can represent all the responses for a given XID.

The TXLIST 769 is read by the DMA engine (FIG. 20) one entry at a time. The order that TXIDs are placed on this list may generally determine the order of transmission. In an example embodiment, the TXLIST 769 includes the following information, which can be stored as one or more bits in corresponding entries: C—Coalesce.
 If C==1 then form response into a Key response, with up to 4 keys.
 If C==0 then return a lookup response, with a single key.
SXID_INFO—Definition depends on coalesce:
 If C==1 then SXID_INFO is the number of keys to coalesce. If SXID_INFO==0 then to coalesce 4 keys.
 If C==0 then SXID_INFO is the SXID of this Key. If SXID_INFO==0 then this is SXID0.
FREE_TXID—Indicates that the TXIDs with valid data may be released after packet is formed.
 The TXID to be freed is determined as follows:
 If C==0
  if SXID_INFO indicates this is SXID0 or SXID1, then release TXID_FIRST.
  if SXID_INFO indicates this is SXID2 or SXID3, then release TXID_LAST.
 If C==1
  If SXID_INFO indicates 1 or 2 valid SXIDs on the line, then release only TXID_FIRST
  If SXID_INFO indicates 3 or 4 valid SXIDs on the line, then release both TXID_FIRST and TXID_LAST
TXID_FIRST—TXID that holds SXID0 and SXID1.
TXID_LAST—TXID that holds SXID2 and SXID3.
 if C==0, only one of TXID_FIRST or TXID_LAST will have valid data, depending on the SXID value indicated by SXID_INFO.
 If C==1, then valid data will be in either TXID_FIRST alone, or TXID_FIRST and TXID_LAST, depending on the SXID count indicated by SXID_INFO.

Figure 20:
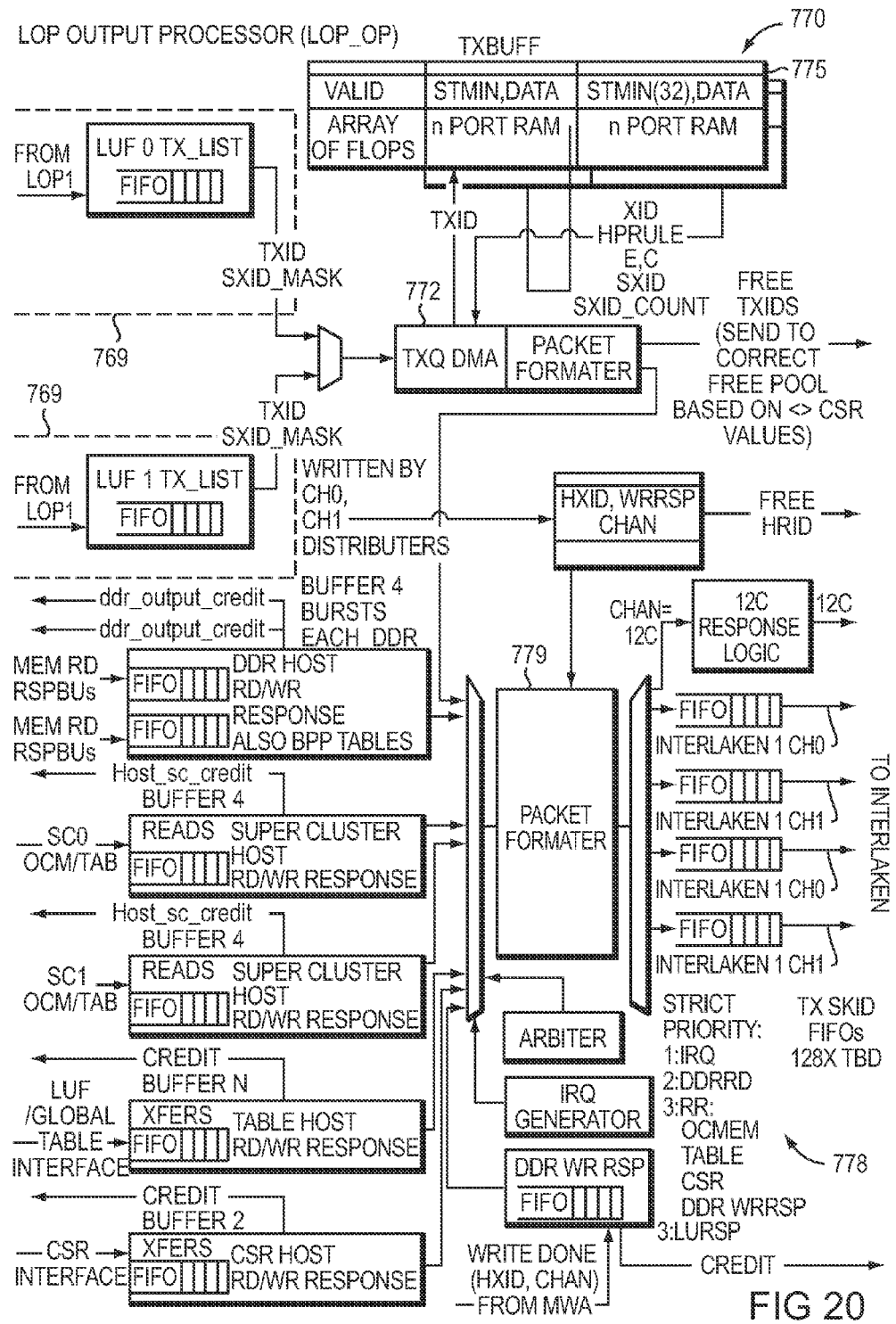
FIG. 20 is a block diagram of an example LOP Output Processor (LOP_OP).

FIG. 20 is a block diagram of an example LOP Output Processor (LOP_OP) 770 in an example embodiment. The TXQ DMA engine 772 pulls TXIDs from the TX_LIST FIFO. In the case of multiple TXLISTs, the DMA engine 772 may pull TXIDs from each of the TXLISTs in a round-robin manner. The corresponding locations in the TXBUFF 775 are then read and formed into response packets before being placed in the TX FIFO 778 for transmission over Interlaken.

The LOP_OP 770 may operate in two different modes, coalesced and non-coalesced. The coalesced mode is determined by the C bit in the TXLIST 769 FIFO (described above). If a packet is to be coalesced, the LOP_OP 770 use SXID_INFO to determine if one or two lines of TXLIST 769 need to be read to get pointers to all necessary TXIDs for the up to 4 keys. These four keys will then be combined (coalesced) into a single packet. If a packet is not to be coalesced, then TXLIST 769 will have a single SXID per line. In the case which a packet is not to be coalesced, SXID_INFO specifies the SXID and the appropriate TXID is located as follows:
 SXID0—use only TXID_FIRST to index TXBUFF, DATA_EVEN field is valid
 SXID1—use only TXID_FIRST to index TXBUFF, DATA_ODD field is valid
 SXID2—use only TXID_LAST to index TXBUFF, DATA_EVEN field is valid
 SXID3—use only TXID_LAST to index TXBUFF, DATA_ODD field is valid The LOP_OP does not make a difference between In Order and Out of Order (OOO) modes because entries in the TXLIST are expected to be already put In Order, if that is required. The LOP_BE 760 may be set C if a packet is in order.

The packet formatter 779 formats packets to be sent back to the host via Interlaken. Lookup responses may be either a single SXID or multiple coalesced SXIDs. The interface to the OSI Interlaken core may be 128 bits; thus, each cycle may carry two Interlaken words. The packet formatter 779 packs the multiple SXID responses into the 128-bit packets for the Interlaken core.

Figure 21B:
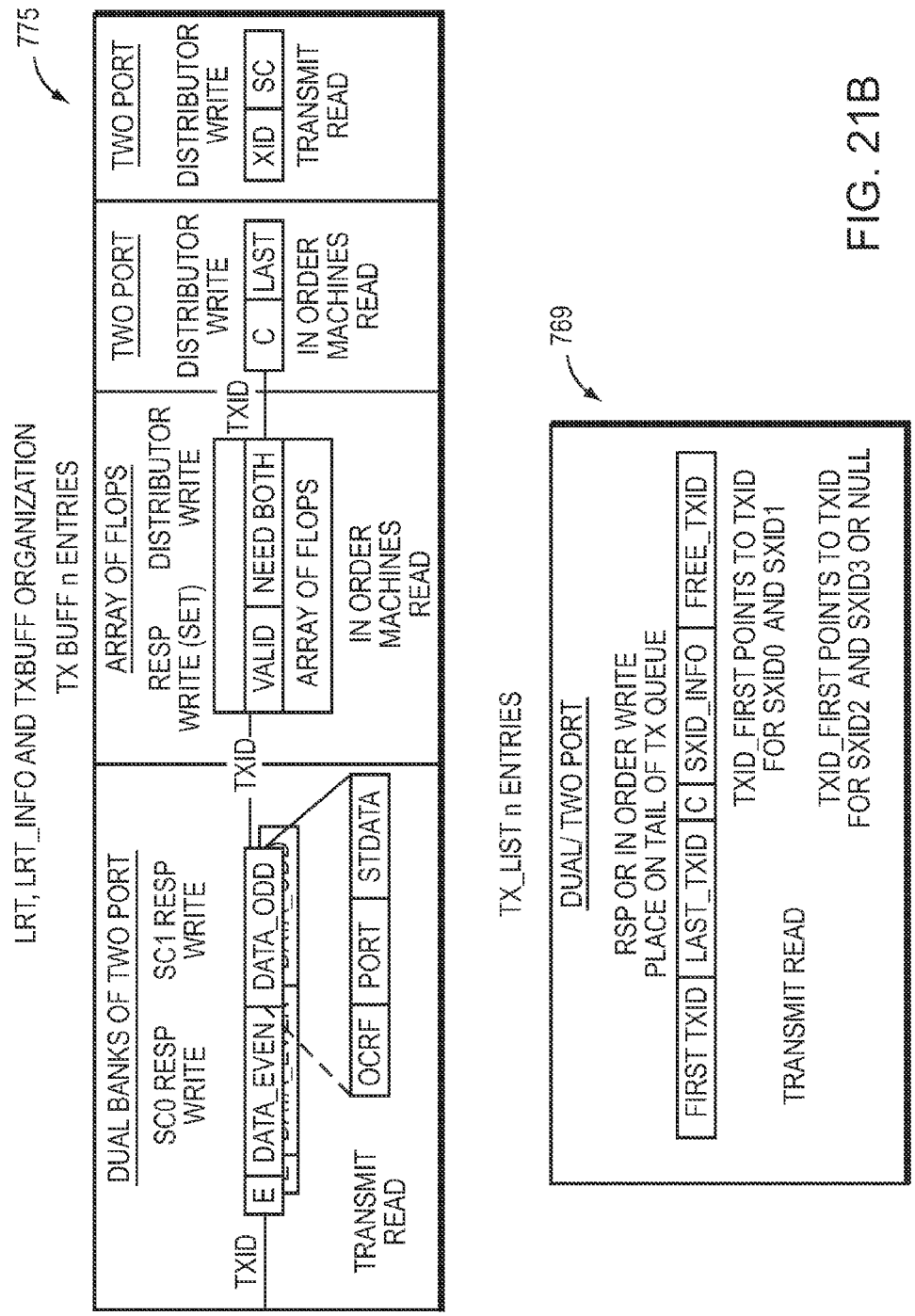
FIGS. 21A and B (collectively referred to as FIG. 21) are block diagrams of example data structures for implementing example embodiments of the present disclosure.

FIG. 21 is a block diagram of example data structures for implementing embodiments of the present invention. Specifically, entries in the LRT 765, LRT_INFO 766, and TXBUFF 775 tables are shown as they may be organized in memory, such as RAM or arrays of flops. In each of the tables, bits may be organized by the number of simultaneous accesses required. For example, the TWRSPCNT bits of the LRT 765 may do a read and write access every clock to service up to 3 responses per clock, and at the same time, service writes for new keys being scheduled. In a convenient embodiment, the TWRSPCNT and similar multiple access fields may be organized in an array of flops.

The LRT 765 and LRT_INFO 766 tables are initialized by the scheduler 428*a-b* of the LIP 424 (FIG. 11) as lookup requests are sent to the clusters. The LRT 765 and LRT_INFO 766 tables are used by the LRC 752*a-c* to determine the minimum highest-priority rule (HPRULE) for each key, and to determine that all responses for that key have been returned. Each LRT 765 entry corresponds to a single key search (single SXID) that is in progress. The LRT 765 is indexed/referenced by a KID, which in turn is distributed from a KID free pool (described below). After scheduling, fields in the LRT 765 are updated by the LUF output processor front end (LOP_FE) 750*a-b*.

According to a convenient embodiment, the LRT 765 may be organized as follows (with reference to FIG. 21):

E—Error—None, Correctable, uncorrectable or Fatal error. Cleared or set by Scheduler, updated by LOP_FE.

TWRSPCNT—Tree walk response count—LOP_FE decrements each time a response is received. Initialized by the scheduler to the number read from the TLT. When zero, all responses for this SXID have been returned.

VALID—Cleared by scheduler, LOP_FE reads and then always sets to 1 for the bank of response data fields that it updates. When LOP_FE reads zero, it knows that the response data fields from LRT for corresponding bank are not yet valid.

Valid=3'b1xx-RSP0 bank is valid
Valid=3'bx1x-RSP1 bank is valid
Valid=3'bxx1=BPP bank is valid Response data fields—implemented by array of flops, or 3 banks of dual ports managed with valid STMIN—Minimum rule—If valid==1, LOP_FE compares values returned from LCC to value read from LRT, and keeps the minimum of the two.

PORT—If from BPP, then this is STDATA[32] returned from BPP response. If from LCC, then this is zero.

OCRF—On chip rule flag. If response is from BPP, LOP_FE sets to 0. If response is from LCC, then LOP_FE sets to 1.

STDATA—Data to be returned to host as response. If the LCC returns STMIN indicating "NO MATCH" then LOP_FE should force to 0xFFFFFFFF. Otherwise, LOP_FE should use the STDATA value associated with the minimum STMIN.

LRTID—index into the LRT_INFO table. LRT_INFO holds information about the entire group, so is pointed to by each KID entry.

SXID—Sub Transfer ID for this key. 0=SXID0, 1=SXID1, 2=SXID2, 3=SXID3.

C—Coalesce this response. This information is read from the GDT.

TID—Tree ID for this transfer. Decrement the corresponding TID counter when all responses for this SXID are returned (TWRSPCNT==0).

Each LRT_INFO 766 entry corresponds to all keys for the same lookup request (as described above, one lookup request can generate up to 4 Keys each having multiple SXIDs). The LRT_INFO 766 table contains information needed to coalesce a group of keys. The LRT_INFO 766 table is indexed/referenced by a LRTID, which is distributed from a LRTID free pool (described below). In one embodiment, the LRT_INFO has the same depth as the LRT.

According to a convenient embodiment, the LRT_INFO 766 may be organized as follows (with reference to FIG. 21):

DONE_COUNT—Counter for number Keys for this group that still need to be coalesced. This is set by the scheduler, and decremented each time a SXID receives all the responses (IE TWRSPCNT goes to zero).

TXID_FIRST—Pointer to TXID corresponding to SXID0 and SXID1. (Used to transfer both TXIDs for to TX LIST in single clock, in the case of coalesce when in Out of Order Mode (OOO)).

TXID_LAST—Pointer to TXID corresponding to SXID2 and SXID3. (Used to transfer both TXIDs for to TX LIST in single clock, in the case of coalesce when in Out of Order Mode (OOO)).

NUM_OF_SXIDS—The total number of SXIDs for this request. 2'b00 indicates 4 SXIDs.

The TXBUFF 775 table is initialized by a LIP distributer 460a-b (FIG. 11) as requests arrive from the host. The TXBUFF 775 table is used by the LOP output processor (LOP_OP) 770 (FIG. 20) to optionally reorder responses so that the responses are sent back to the host in the same order that the requests were received. The TXBUFF 775 table also provides buffering for times when the rate that lookup responses are returned by the clusters exceeds the rate that the host interface can drain them. The TXBUFF 775 table is indexed/referenced by a TXID, which is distributed from a TXID free pool (described later in greater detail).

The ORDER_GROUP field of the GDT table 426 (FIG. 11) defines whether responses are returned in the order of the requests or whether the responses are returned out of order meaning the responses are returned as soon as they are ready.

According to a convenient embodiment, the TXBUFF 775 may be organized as follows (with reference to FIG. 7):

E—Error—None, Correctable, uncorrectable or Fatal error.

DATA ODD—Minimum rule for SXID1 or SXID3

OCRF—On chip Rule Flag—set if result from LCC, cleared for BPP

PORT—DDR Port if result from BPP, cleared if LCC

STDATA—address of DDR if BPP, of cluster if LCC

DATA EVEN—Minimum rule for SXID0 or SXID2

Same sub field definitions as DATA_ODD above.

XID—Transfer ID

VALID_EVEN, valid_odd—Set to 1 if corresponding DATA entry is valid—used by in order engine only C—Coalesce this response. This information is read from the GDT.

LAST—Indicates this TXBUFF line contains the last SXID in the group.

Need both—0 Indicates that only even data/valid are needed. 1 indicates both even and odd are needed.

IL—Indicates a Host (i.e., a corresponding TXLIST) to which the response should be routed.

The KID free pool distributes KIDs to the scheduler. Each KID represents one line in the lookup response table (LRT) 765. The KIDs are distributed to the scheduler in any order. The KIDs are returned one at a time to the free pool by the LURSP engine in any order, as soon as the LRT 765 data is moved to the TXBUFF 775. The KID free pool may be implemented as a FIFO, and initialized by setting each location to its own address. In an example embodiment, there may be one KID free pool per super-cluster.

The LRTID free pool distributes LRTIDs to the scheduler. Each LRTID represents one line in the lookup response info table (LRT_INFO) 766. The LRTIDs are distributed to the scheduler in any order. The LRTIDs are returned one at a time to the free pool by the LURSP engine in any order, as keys finish coalescing. The LRTID free pool may be implemented as a FIFO, and initialized by setting each location to its own address. In an example embodiment, there may be one LRTID free pool per super-cluster.

The TXID free pool distributes TXIDs to the scheduler 428a-b (FIG. 11). Each TXID represents one line in the TXBUFF 775 array. The TXID free pool is built from a memory-less FIFO, and may be initialized to full. The TXID free pool may be employed for in-order operation, wherein entries are distributed in increasing order and returned in the same order. Therefore, when an increasing TXID is used to index the TXBUFF 775, the entries will be pulled in order.

The returned TXID may be compared with the tail pointer. An error output (FIFO error) can be set if these values ever mismatch indicating some error in the TXBUFF and the tail pointer is not incremented. Operations may eventually stall when the head pointer reaches the tail pointer. Another error output (overflow error) is set if there is an attempt to push when the FIFO is full, also indicating an error in the TXBUFF 775. The TXID outputs on the pop output interface may be valid only if empty signal is low in that cycle.

The min and max values of the in-order free pool are host programmable via CSRs on a 64 location granularity. This CSR sets bits [11:6] of the max value. Bits [11:6] of min value are determined by adding 1 to max value of previous group. Bits [5:0] of max are set to all ones, Bits [5:0] of min value are set to all zeros. After changing these values, the txid_reset_pointers CSR must transition from 1 to 0 in order the change to take effect. In an example embodiment, two in-order free pools, for respective order groups 1 and 2, may be implemented.

The out-of-order TXID free pools distribute TXIDs to the scheduler. This distribution corresponds to order group 0. Each TXID may represent one line in the TXBUFF 775 array. The array may be a FIFO, and is initialized so that each entry contains its own address.

During in-order operation entries will be distributed in increasing order and returned in the same order. Therefore, when an increasing TXID is used to index the TXBUFF 775, the entries will be pulled in order. In contrast, during out-of-order (OOO) operations, entries will be returned in any order and thus, the list may become out-of-order. There should be no disadvantage in lack of order because order is ignored under such operations. In an example embodiment, a single out-of-order pool may be implemented for order group 0. The max value for TXIDs from the out-of-order free pool is host programmable, via CSRs, on a 64 location granularity. After changing these values, the txid_reset_pointers CSR may transition from 1 to 0 in order the change to take effect.

Figure 22A:
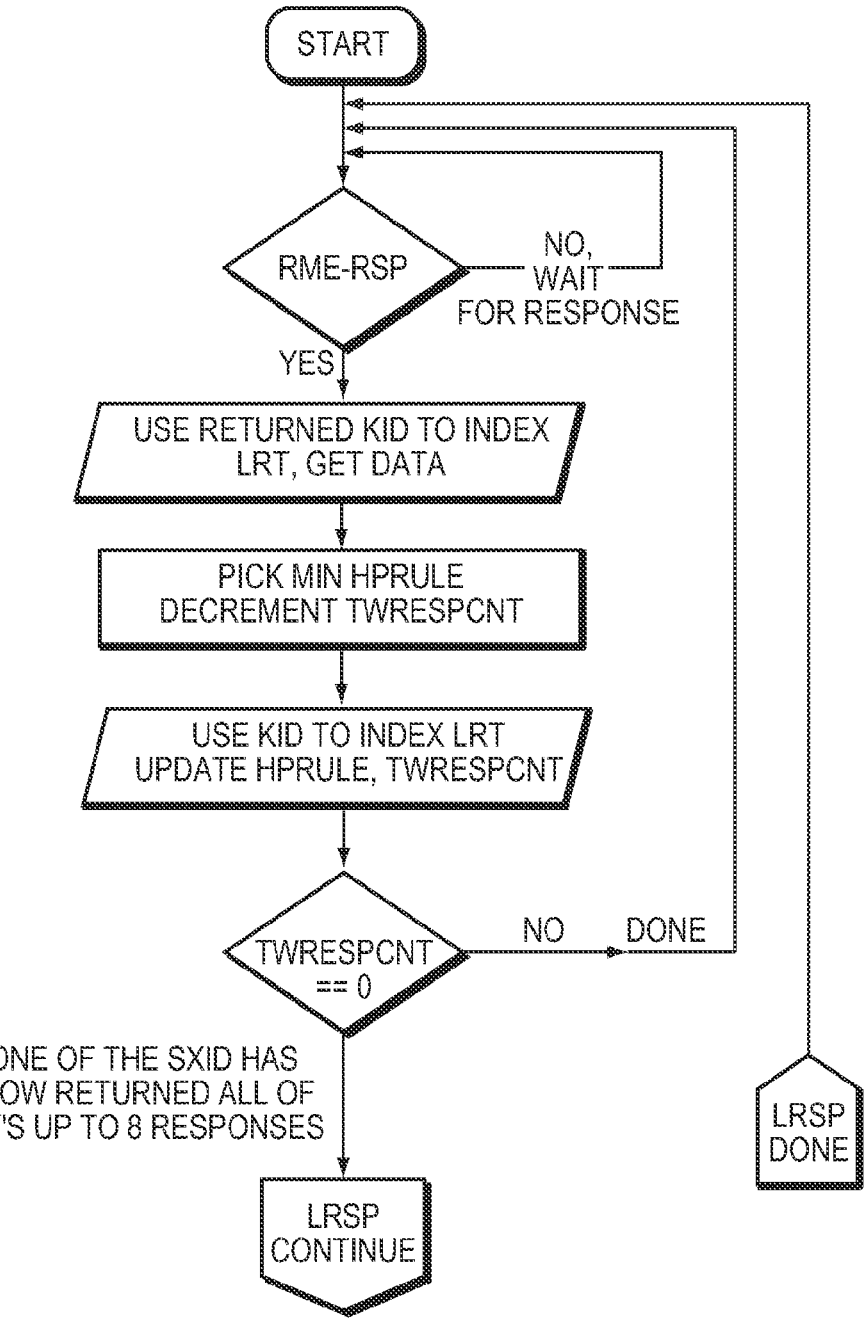
FIGS. 22A and 22B are flow charts of an example procedure for ordering and coalescing responses received from internal resources.
Figure 22B:
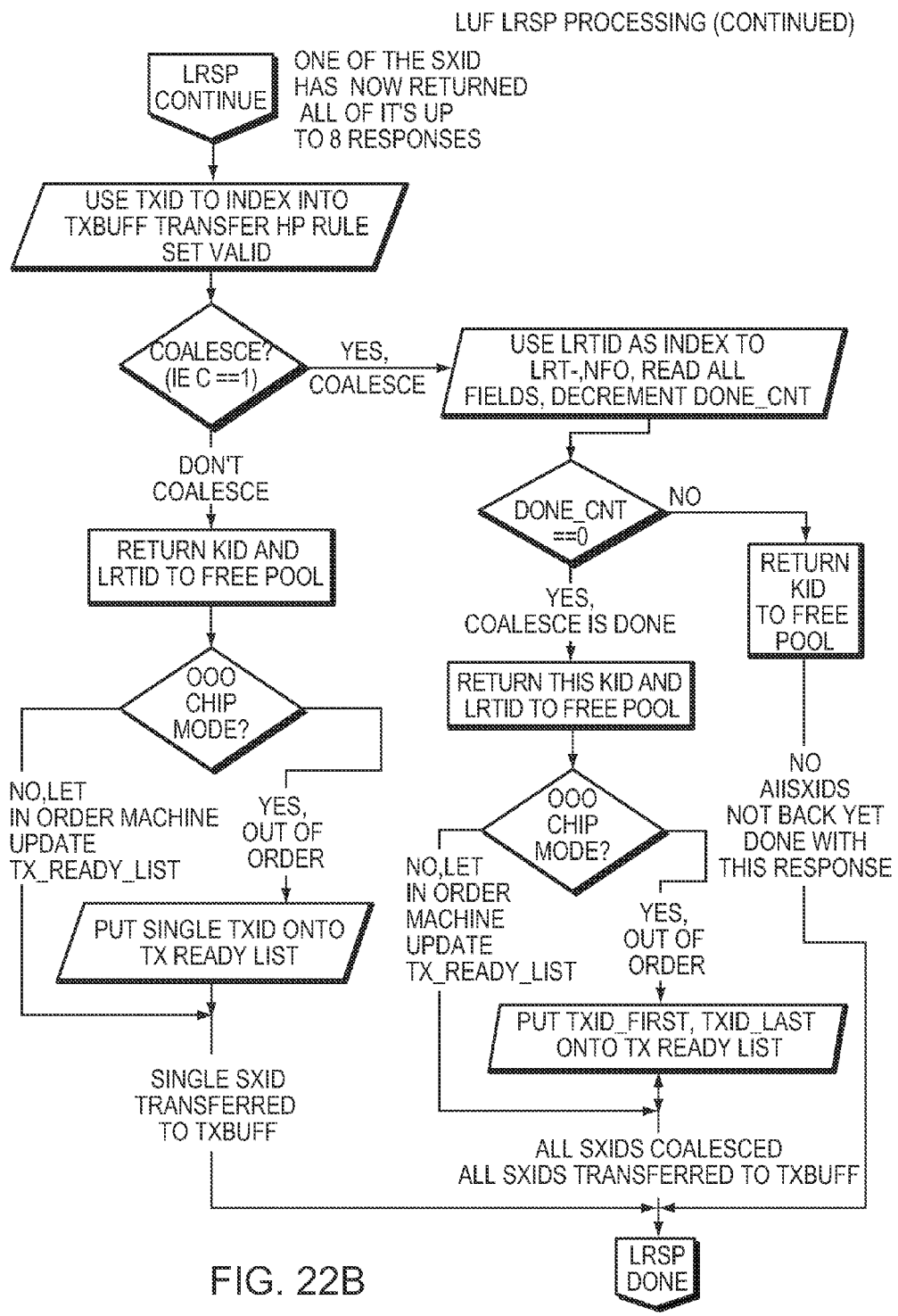

FIG. 22A is a flow chart of an example procedure for selecting the highest priority response out of multiple sub-tree responses belonging to a single SXID. This process is referred to as "merging." FIG. 22B is a flow chart of an example procedure for ordering and coalescing responses received from internal resources, in accordance with an example embodiment. The procedure is derived from the processes described above with reference to FIGS. 17-21. The procedure may be performed by a LOP (e.g., the LOP 446 of FIG. 17). The procedure may also be performed by a computer (or processor) transformed into a LOP by loading and executing instructions representing the example procedure described below.

According to embodiments of the present invention, a LUF output processor (LOP) may be a physical network node (or device), such as a switch or router, in a network of other nodes. The LOP may be part of a physical network node (or device) as a component, module, blade or card of that node.

According to another embodiment of the present invention, the LOP is a general purpose computer having a processor, memory, communication interface, etc. (described in greater detail below in reference to FIG. 23). The general purpose computer is transformed into the LOP and its components, for example, by loading instructions into the processor that cause the computer to process lookup requests received from a host to determine the best match and return responses to the host.

Figure 23:
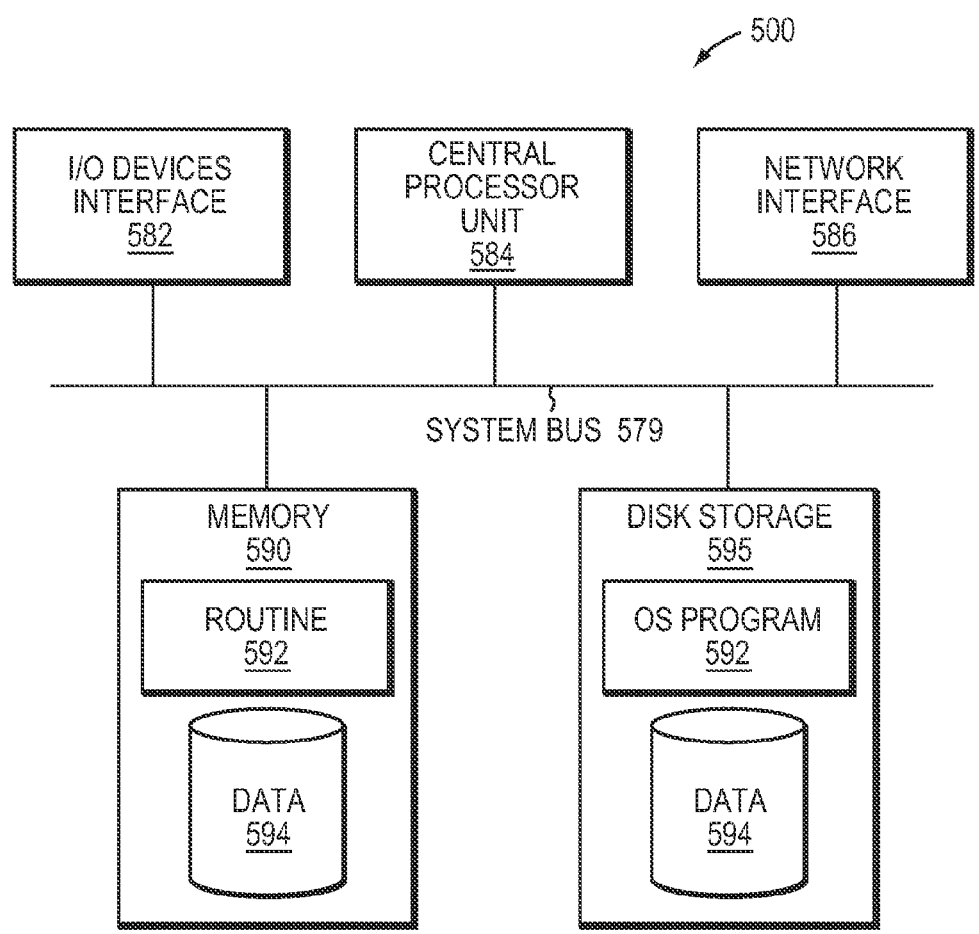
FIG. 23 is a block diagram of a computer in which various embodiments of the present disclosure may be implemented.

FIG. 23 is a block diagram of the internal structure of a computer 500 in which various embodiments of the present invention may be implemented. The computer 500 contains system bus 579, where a bus is a set of hardware lines used for data transfer among the components of a computer or processing system. Bus 579 is essentially a shared conduit that connects different elements of a computer system (e.g., processor, disk storage, memory, input/output ports, network ports, etc.) that enables the transfer of information between the elements. Attached to system bus 579 is I/O device interface 582 for connecting various input and output devices (e.g., keyboard, mouse, displays, printers, speakers, etc.) to the computer 500. Network interface 586 allows the computer 500 to connect to various other devices attached to a network. Memory 590 provides volatile storage for computer software instructions 592 and data 594 used to implement an embodiment of the present invention (e.g., the procedure of FIG. 8). Disk storage 595 provides non-volatile storage for computer software instructions 592 and data 594 used to implement an embodiment of the present invention. Central processor unit 584 is also attached to system bus 579 and provides for the execution of computer instructions.

In one embodiment, the processor routines 592 and data 594 are a computer program product (generally referenced 592), including a computer readable medium (e.g., a removable storage medium, such as one or more DVD-ROM's, CD-ROM's, diskettes, tapes, etc.) that provides at least a portion of the software instructions for embodiments of the invention system. Computer program product 592 can be installed by any suitable software installation procedure, as is well known in the art. In another embodiment, at least a portion of the software instructions may also be downloaded over a cable, communication and/or wireless connection.

Further, embodiments of the present invention may be implemented in a variety of computer architectures. The general computer of FIG. 23 is for purposes of illustration and not limitation of any embodiments of the present invention.

Figure 24:
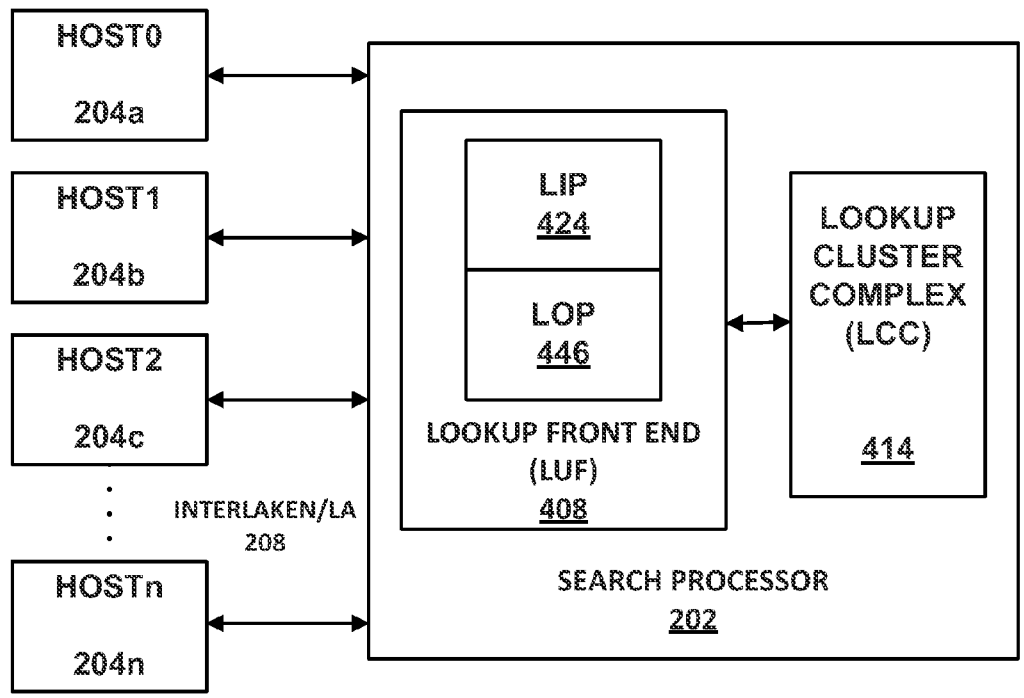
FIG. 24 is a block diagram of a search processor servicing multiple hosts.

FIG. 24 is a block diagram of a search processor 202 configured to service multiple hosts 204*a-n*. The hosts 204*a-n* may be configured as described above with reference to FIG. 2A, and communicate with the search processor via respective Interlaken/LA interconnects 208 to forward lookup requests to the search processor 202. The search processor may be configured as described above with reference to FIG. 4A, and processes the lookup requests from each of the hosts 204*a-n*, returning corresponding lookup results to the hosts 204*a-n*.

Servicing multiple hosts 204*a-n* by a single search processor 202 may present additional challenges over servicing a single host. For example, lookup responses must be directed to the host that originated the corresponding lookup request. To ensure lookup responses are accurately directed, the payload header extractor (PHE) 470 (described above with reference to FIG. 12) of the LIP 424 and the LOP response back end 760 (described above with reference to FIG. 17) may be employed to track each lookup request and corresponding lookup response according to its originating host. In particular, for each search, a "host ID" may be stored at the LRT of the PHE 470 (FIG. 12) and at the TXBUFF 775 of the LOP response back end 760 (FIG. 17). The host ID identifies the host originating the lookup request, and can be referenced by the LOP 446 to direct each lookup response to the correct host 204*a-n*.

A further challenge in servicing multiple hosts 204*a-n* is in managing traffic such that all hosts 204*a-n* are serviced sufficiently. A particular challenge in managing traffic is in preventing one or more hosts from queuing an unduly large amount of lookup requests, filling the shared new queue 472 (FIG. 12) and preventing other hosts from forwarding requests to the search processor 202.

A solution to managing traffic among multiple hosts 204*a-n* may be provided by the LUF 408. In particular, the LIP 424 may be configured to maintain a credit/debit counter for each host based on a number of pending lookup requests, comparing the per-host counts to respective programmable watermarks and preventing or limiting further lookup requests from a host that exceeds its watermark. Such a configuration of a LIP 424 is described in further detail below with reference to FIG. 25. Likewise, the LOP 446 may be configured to maintain a credit/debit counter for each host based on a number of pending lookup responses, comparing the per-host counts to respective programmable watermarks and preventing or limiting further lookup requests from a host that exceeds its watermark. Such a configuration of a LOP 446 is described in further detail below with reference to FIG. 27.

Figure 25:
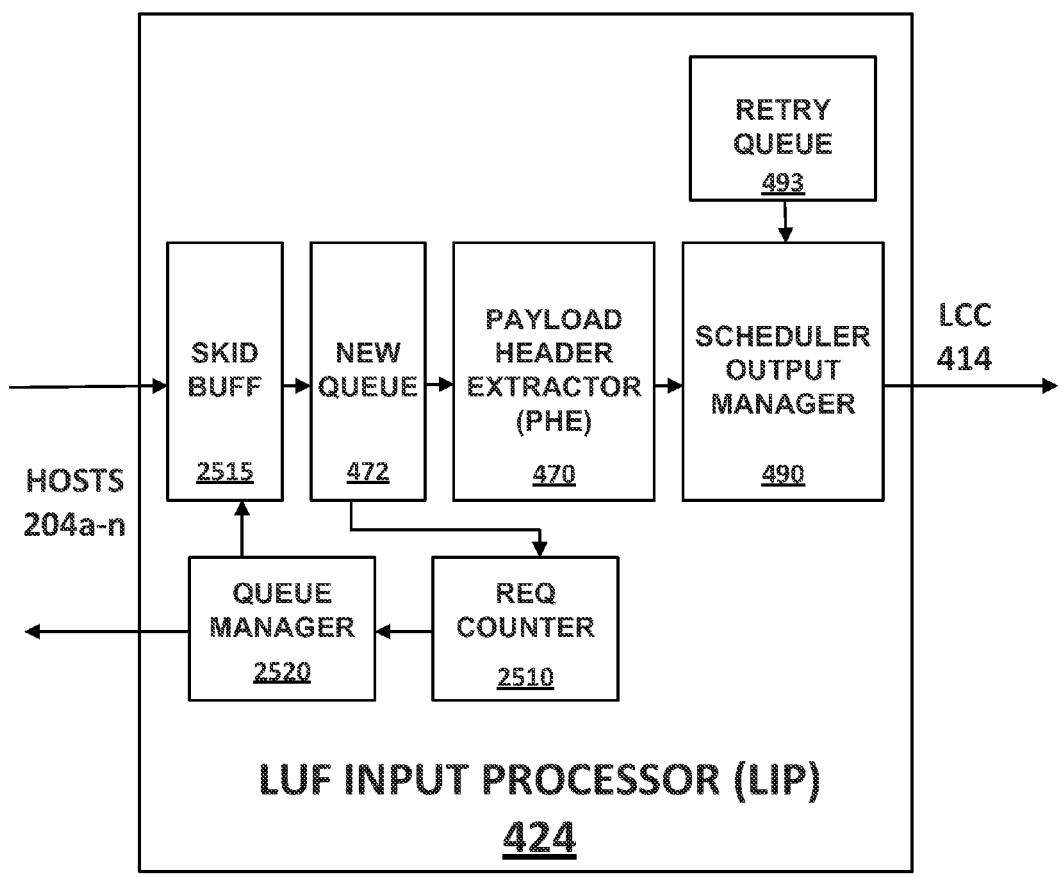
FIG. 25 is a block diagram of a LUF input processor (LIP) configured to service multiple hosts.

FIG. 25 is a block diagram of a LUF input processor (LIP) 424 configured to service lookup requests from multiple hosts. The LIP 424 may be configured as described above with reference to FIGS. 11-16, particularly with respect to the new queue 472 (FIG. 12), payload header extractor (PHE) 470 (FIG. 12), scheduler output manager (SOM) 490 (FIG. 15) and retry queue 493 (FIG. 15). In addition, per-host skid buffers 2515 receive lookup requests for forwarding to the new queue 472, a request counter 2510 maintains a per-host count of lookup requests pending at the new queue 472, and a queue manager 2520 manages per-host traffic responsive to the request counter 2510. Operation of the LIP 424 with respect to managing lookup requests from multiple hosts is described below with reference to FIG. 26.

Figure 26:
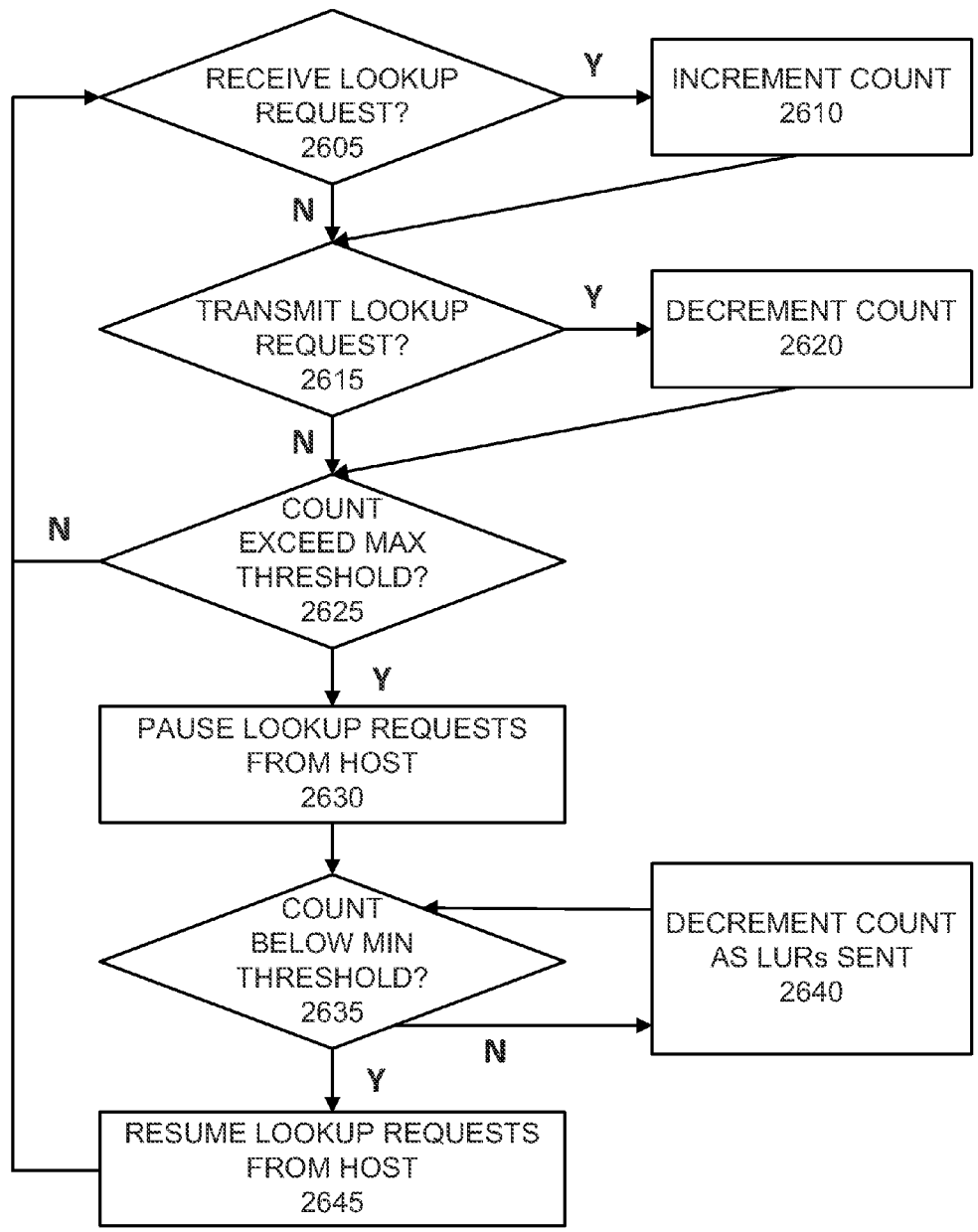
FIG. 26 is a flow diagram of a process for managing lookup requests at an input processor.

FIG. 26 is a flow diagram of a process 2600 for managing lookup requests at the LIP 424. The process 2600 is operated with respect to a single host of the plurality of hosts 204a-n, and may be operated in parallel for each of the hosts 204a-n. With reference to FIG. 25, the LIP 424 receives lookup requests from the plurality of hosts 204a-n to the new queue 472 via the per-host skid buffers 2515 (2605). The lookup requests are forwarded to the payload header extractor (PHE) 470 to be processed into key requests, and the scheduler output manager 490 transmits those key requests to the lookup cluster complex (LCC) 414. If a destination processing cluster is unable to process a key request at a given time, the key request may be placed into the retry queue 493 for output at a later time. (Operation of the LIP with respect to the new queue 472, PHE 470, scheduler output manager 490 and retry queue 493 is described in further detail above with reference to FIGS. 12-15.) The request counter 2510 maintains a count of the number of lookup requests in the new queue 472 on a per-host basis, which may be enabled by the host ID indicator of each lookup request. When a lookup request is received to the new queue 472 (2605), the request counter 2510 increments the count for the respective host 204a-n (2610). Likewise, when a lookup request is forwarded from the new queue 472 to the PHE 470 (2615), the request counter 2510 decrements the count for the respective host 204a-n (2620).

The queue manager 2520 compares the present per-host count against a per-host maximum threshold (also referred to as a "watermark"). This comparison may be done continuously, periodically, or in response to an increment or decrement in a per-host count. The maximum threshold may be programmable such that the hosts 204a-n may have different thresholds from one another. Different thresholds may be programmed, for example, in order to give one or more hosts 204a-n (e.g., higher-priority hosts) a greater share of the bandwidth for processing packets than the share allotted to other hosts 204a-n. If the per-host count is within the maximum threshold, then the new queue 472 may continue receiving lookup requests from that host (2605). However, if the per-host count exceeds the programmed maximum threshold, then the queue manager 2520 operates to prevent receiving further lookup requests from the respective host (2630). The queue manager 2520 may pause lookup requests by forwarding a backpressure message directly to the respective host 204a-n, and may also control the host's respective skid buffer 2515 to prevent lookup requests in the host's skid buffer 2515 from reaching the new queue. By controlling the skid buffer 2515 in this manner, new lookup requests from the given host can be blocked from the shared new queue 472 immediately, rather than after a delay to account for draining the respective skid buffer 2515. Alternatively, the queue manager 2520 may prevent further lookup requests only by pausing the host's skid buffer 2515. In doing so, the host's skid buffer 2515 may fill, indicating to the respective host 204a-n to pause sending further lookup requests. As a result, new lookup requests from that host can be temporarily blocked from the shared new queue 472 without the queue manager 2520 communicating directly with the host 204a-n. Further, if the lookup requests are resumed before the host's skid buffer 2515 fills, then the host 204a-n need not be paused, thereby reducing latency in processing lookup requests.

Once the queue manager 2520 pauses lookup requests for the given host 204a-n, it proceeds to compare the present per-host count against a second per-host threshold, referred to as a "minimum" threshold ("watermark") (2635). This comparison may be done continuously, periodically, or in response to an increment or decrement in a per-host count. As with the maximum thresholds, the minimum threshold may be programmable such that the hosts 204a-n may have different thresholds from one another. Although the minimum threshold can be programmed to be identical to the maximum threshold, in order to prevent frequent pausing and resuming of the host's lookup request, the minimum threshold can be programmed to be substantially lower than the maximum threshold. If the count remains above the minimum, then further lookup requests from the host continue to be paused while the new queue 472 continues to forward lookup requests to the PHE 470, decrementing the counter over time (2640). When the count falls below the minimum threshold, the queue manager 2520 may enable further lookup requests from the host 204a-n to the new queue 472 to resume (2645). Resumption may be enabled in a manner similar to that of pausing the lookup requests (2630), such as by messaging the given host 204a-n, controlling the host's respective skid buffer 2515, or through both such means.

As a result of this method 2600, the given host is prevented from occupying more than a predetermined share of the new queue 472 with its lookup requests, and new lookup requests can be paused until its share of the new queue 472 falls to an acceptable, predetermined level. Other hosts are prevented from being "starved" of packet processing bandwidth due to the given host, and particular hosts can be given relative priority through programmable maximum and minimum thresholds.

Figure 27:
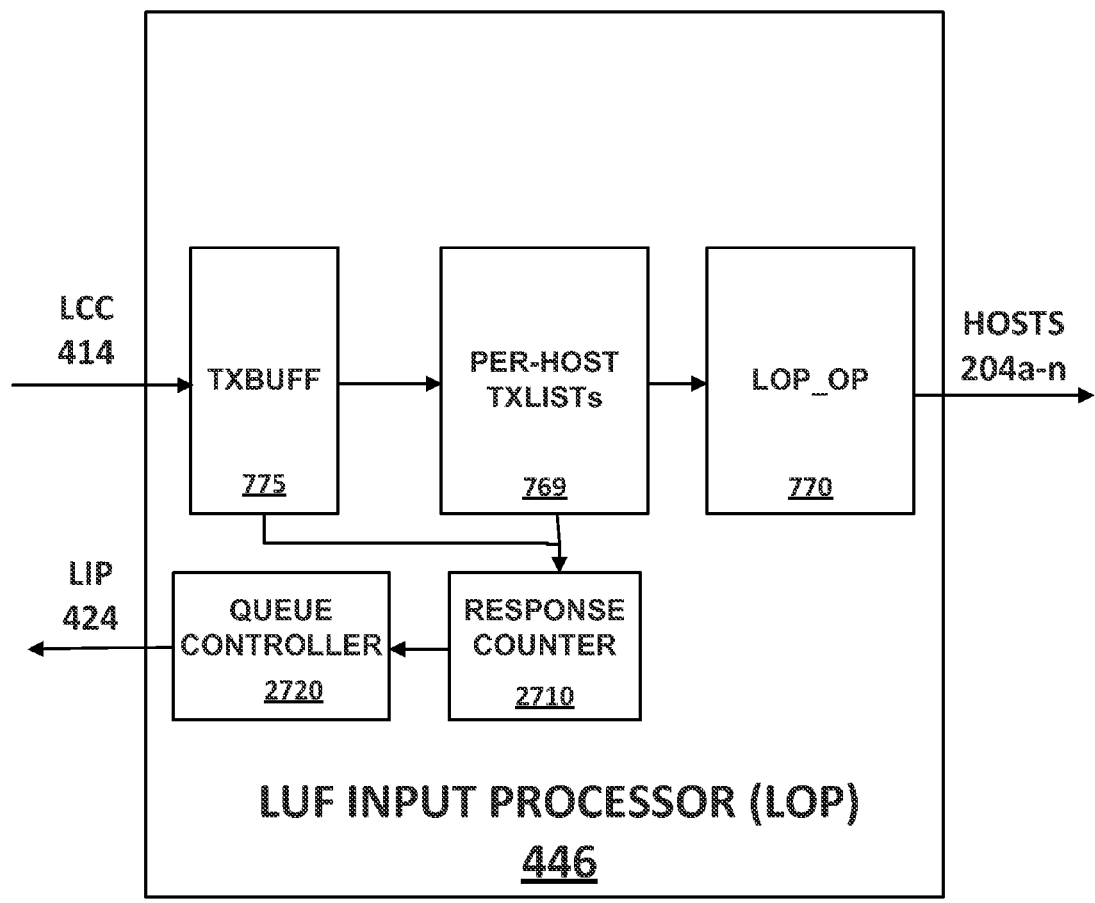
FIG. 27 is a block diagram of a LUF output processor (LOP) configured to service multiple hosts.

FIG. 27 is a block diagram of a LUF output processor (LOP) 446 configured to service lookup responses to multiple hosts. The LOP 446 may be configured as described above with reference to FIGS. 17-20, particularly with respect to the shared transmit buffer (TXBUFF) 775 (FIGS. 17, 19), per-host transmit lists (TXLISTs) 769 (FIG. 19), and LOP output processor (LOP_OP) 490 (FIGS. 17, 20). In addition, a response counter 2710 maintains a per-host count of lookup responses pending at the TXLISTs 769, and a queue controller 2720 manages per-host traffic responsive to the response counter 2710. Operation of the LOP 446 with respect to managing lookup requests from multiple hosts is described below with reference to FIG. 28.

Figure 28:
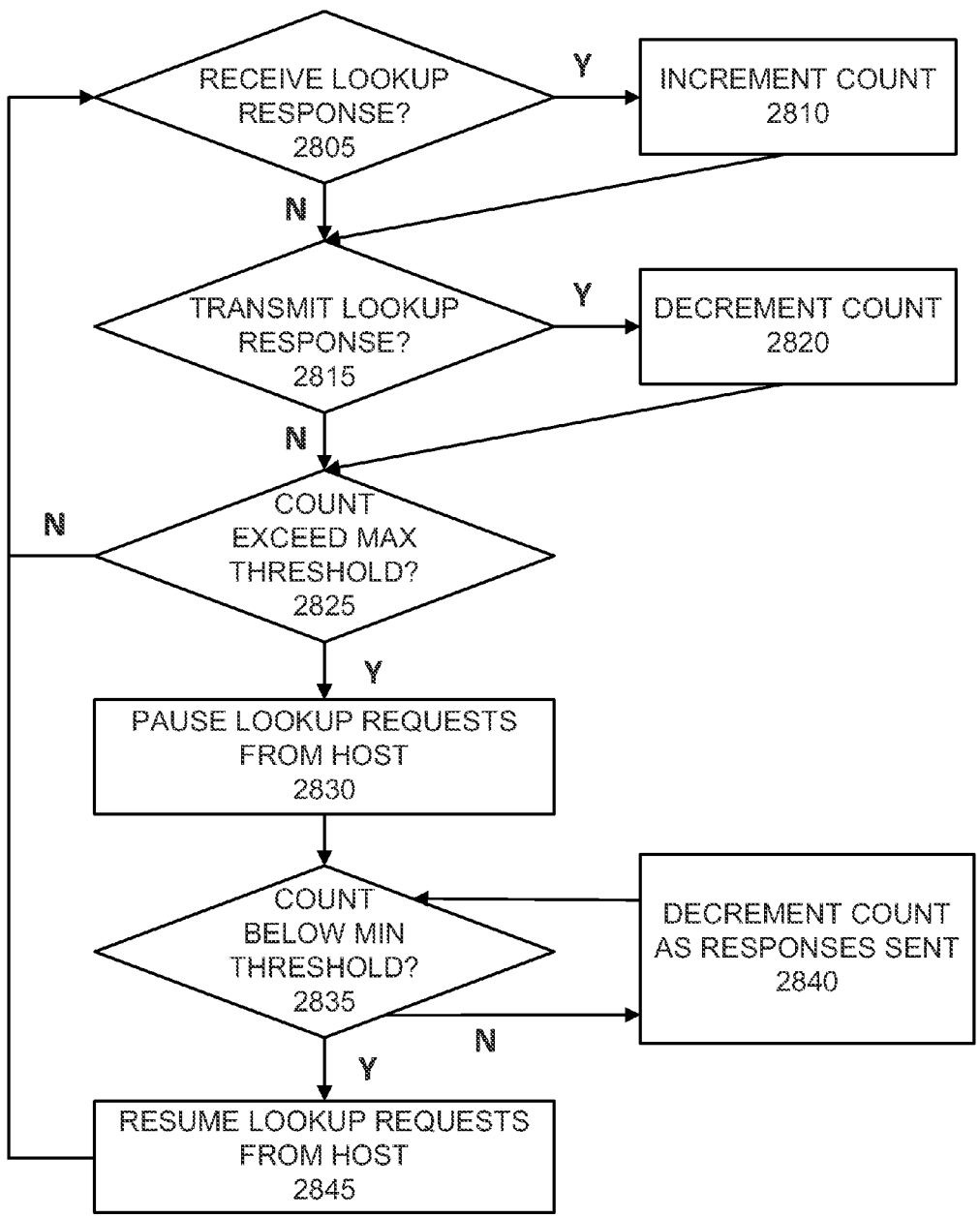
FIG. 28 is a flow diagram of a process for managing lookup requests at an output processor.

FIG. 28 is a flow diagram of a process 2800 for managing lookup responses at the LOP 446. The process 2800 may be operated with respect to a single host of the plurality of hosts 204a-n, and may be operated in parallel for each of the hosts 204a-n. With reference to FIG. 27, the LOP 446 receives lookup responses from the LCC 414 to the TXBUFF 775 (2805). The lookup responses are forwarded to per-host transmit lists (TXLISTs) 769, which in turn forward the lookup responses to the LOP_OP 770. The LOP_OP 770 then schedules and transmits those lookup responses to the respective host 204a-n. (Operation of the LOP 446 with respect to the TXBUFF 775, TXLISTs 769, and LOP_OP 770 is described in further detail above with reference to FIGS. 17-20.) The response counter 2710 maintains a count of the number of lookup responses in each of the TXLISTs 769, which may be enabled by the host ID indicator associated with each lookup response. Because the TXLISTs 769 are maintained individually for each host, the response counter 2710 maintains a count of the number of pending lookup responses on a per-host basis. When a lookup response is received to the respective TXLIST 769 (2805), the response counter 2710 increments the count for the respective host 204a-n (2810). Likewise, when a lookup response is forwarded from the TXLIST 769 to the LOP_OP 770 (2815), the response counter 2710 decrements the count for the respective host 204a-n (2820).

The queue controller 2720 compares the present per-host count against a per-host maximum threshold (also referred to as a "watermark"). This comparison may be done continuously, periodically, or in response to an increment or decrement in a per-host count. As with the thresholds of the request counter of the LIP 424, the maximum threshold may be programmable such that the hosts 204a-n may have different thresholds from one another. Different thresholds may be programmed, for example, in order to give one or more hosts 204a-n (e.g., higher-priority hosts) a greater share of the bandwidth for processing packets than the share allotted to other hosts 204a-n. If the per-host count is within the maximum threshold, then the queue controller makes no change to incoming requests at the LIP 446, and the TXBUFF 775 may continue receiving lookup responses from that host (2805). However, if the per-host count exceeds the programmed maximum threshold, then the queue controller 2720 operates to prevent further lookup requests from the respective host from being received by the LIP 424 (2830). The queue controller 2720 may pause lookup requests by forwarding a message to the LIP 424 (specifically, e.g., the queue manager 2520 of the LIP 424), allowing the LIP to pause lookup requests as described above with reference to FIG. 26. Alternatively, or in addition, the queue controller may transmit a backpressure message directly to the respective host 204a-n.

Once the queue controller 2720 pauses lookup requests for the given host 204a-n, it proceeds to compare the present per-host count against a second per-host threshold, referred to as a "minimum" threshold ("watermark") (2835). This comparison may be done continuously, periodically, or in response to an increment or decrement in a per-host count. As with the maximum thresholds, the minimum threshold may be programmable such that the hosts 204a-n may have different thresholds from one another. Although the minimum threshold can be programmed to be identical to the maximum threshold, in order to prevent frequent pausing and resuming of the host's lookup response, the minimum threshold can be programmed to be substantially lower than the maximum threshold. If the count remains above the minimum, then further lookup requests from the host 204a-n continue to be paused while the TXLIST 769 continues to forward lookup responses to the LOP_OP 770, decrementing the counter over time (2840). Because it is the lookup requests rather than the lookup responses that are paused, there may be a substantial delay between when the queue controller 2720 initiates a pause of lookup requests and when the TXLIST 769 is decremented as a result of this pause. During this time, the LCC 414 may continue to process lookup requests already received to the new queue 472 at the LIP 424, and the LOP 446 may continue to transmit the lookup responses to the host 204a-n, eventually draining the respective TXLIST 769. When the TXLIST count falls below the minimum threshold, the queue controller 2720 may enable further lookup requests from the host 204a-n to the LIP 424 to resume (2845). Resumption may be enabled in a manner similar to that of pausing the lookup requests (2830), such as by messaging the queue manager 2520 at the LIP 424, by messaging the given host 204a-n, or through both such means.

As a result of this method 2800, the given host is prevented from occupying more than a predetermined share of bandwidth at the LOP 446 with its lookup responses, and new lookup requests can be paused until pending lookup requests are processed into lookup responses that are transmitted back to the host 204a-n, causing the count at the respective TXLIST 769 to fall to an acceptable, predetermined level. Other hosts are prevented from being "starved" of packet processing bandwidth due to the given host, and particular hosts can be given relative priority through programmable maximum and minimum thresholds. The method 2800 can be implemented in combination with the LIP-side method 2600, described above, to provide traffic management among a plurality of hosts with regard to both incoming lookup requests and outgoing lookup responses.

While this invention has been particularly shown and described with references to example embodiments thereof, it will be understood by those skilled in the art that various changes in form and details may be made therein without departing from the scope of the invention encompassed by the appended claims.

Embodiments may be implemented in hardware, firmware, software, or any combination thereof. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; and others. Further, firmware, software, routines, or instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the block and flow diagrams (e.g., FIG. 6) may include more or fewer elements, be arranged differently, or be represented differently. It should be understood that implementation may dictate the block and flow diagrams and the number of block and flow diagrams illustrating the execution of embodiments of the invention.

What is claimed is:

1. An apparatus for processing a packet comprising:
a packet processor configured to operate rule matching for packets received from a plurality of hosts; and
an input processor comprising:
a queue register configured to receive lookup requests from the plurality of hosts, each lookup request corresponding to a packet;
a payload header extractor (PHE) configured to 1) extract a host identifier from each lookup request and store the host identifier extracted from each lookup request, the host identifier indicating the one of the plurality of hosts originating the lookup request, the lookup request indicating a request to determine a path to forward the packet on a network, and 2) generate at least one key request for each lookup request, the at least one key request including a key for comparing against a set of rules to determine the path to forward the packet on the network;
a request counter configured to maintain a request count of the number of lookup requests per host in the queue register based on the host identifier of each lookup request;
a queue manager configured to compare the request count for each host against a respective input threshold, the queue manager preventing receipt of additional lookup requests from a given host to the queue register in response to the request count for the given host exceeding the respective input threshold; and
a scheduler output manager configured to forward the at least one key request for each of the lookup requests from the queue register to the packet processor.

2. The apparatus of claim 1, wherein the queue manager transmits a command to the given host in response to the request count for the given host exceeding the respective input threshold, the command directing the given host to pause transmission of lookup requests.

3. The apparatus of claim 1, wherein the queue manager, in response to the request count for the given host returning below the respective input threshold, enables receipt of additional lookup requests for the given host.

4. The apparatus of claim 3, wherein the queue manager, in response to the request count for the given host returning below the respective input threshold, transmits a message to the given host, the message indicating to the given host to resume transmission of lookup requests.

5. The apparatus of claim 1, wherein the queue manager further compares the request count for each host against a respective input low threshold, the queue manager enabling receipt of additional lookup requests from a given host to the queue register in response to the request count for the given host being below the respective input low threshold.

6. The apparatus of claim 1, wherein the respective input threshold is configurable to distinct values among the plurality of hosts.

7. The apparatus of claim 1, further comprising an output processor comprising:
an output queue configured to receive an indication of lookup responses from the packet processor for transmission to the plurality of hosts;
a response counter configured to maintain a response count of the number of lookup responses per host in the output queue;
a controller configured to compare the response count for each host against a respective output threshold, the controller preventing receipt of additional lookup requests from a selected host to the output queue in response to the response count for the selected host exceeding the respective output threshold; and
a scheduler output manager configured to forward the lookup responses from the output queue to the plurality of hosts.

8. The apparatus of claim 7, wherein the controller transmits a message to the selected host in response to the response count for the selected host exceeding the respective output threshold, the message indicating to the selected host to pause transmission of lookup requests.

9. The apparatus of claim 7, wherein the controller, in response to the response count for the selected host returning below the respective output threshold, enables receipt of additional lookup requests for the selected host.

10. The apparatus of claim 9, wherein the controller, in response to the response count for the selected host returning below the respective output threshold, transmits a message to the selected host, the message indicating to the selected host to resume transmission of lookup requests.

11. The apparatus of claim 7, wherein the respective output threshold is configurable to distinct values among the plurality of hosts.

12. An apparatus for processing a packet comprising:
a packet processor configured to operate rule matching for packets received from a plurality of hosts; and
an output processor comprising:
an output queue configured to receive an indication of lookup responses from the packet processor for transmission to the plurality of hosts;
a transmission buffer configured to store a host identifier extracted by a packet header extractor from each lookup request corresponding to the lookup responses, the host identifier indicating the one of the plurality of hosts originating the lookup request, the lookup request indicating a request to the packet processor to determine a path to forward the packet on a network, the lookup responses indicating a result of a comparison between a key extracted from the packets against a set of rules to determine the path to forward the packet on the network;
a counter configured to maintain a count of the number of lookup responses per host in the output queue based on the host identifier of each lookup request;
a controller configured to compare the count for each host against a respective output threshold, the controller preventing receipt of additional lookup requests from a selected host to the output queue in response to the count for the selected host exceeding the respective output threshold; and
a scheduler output manager configured to forward the lookup responses from the output queue to the plurality of hosts.

13. The apparatus of claim 12, wherein the controller transmits a command to the selected host in response to the response count for the selected host exceeding the respective output threshold, the command directing the selected host to pause transmission of lookup requests.

14. The apparatus of claim 12, wherein the controller, in response to the response count for the selected host returning below the respective output threshold, enables receipt of additional lookup requests for the selected host.

15. The apparatus of claim 14, wherein the controller, in response to the response count for the selected host returning below the respective output threshold, transmits a message to the selected host, the message indicating to the selected host to resume transmission of lookup requests.

16. The apparatus of claim 12, wherein the respective output threshold is configurable to distinct values among the plurality of hosts.

17. A method of processing a packet comprising:
receiving lookup requests from a plurality of hosts to a queue register, each lookup request corresponding to a packet;
extracting a host identifier from each lookup request, the lookup request indicating a request to determine a path to forward the packet on a network;
generating at least one key request for each lookup request, the at least one key request including a key for comparing against a set of rules to determine the path to forward the packet on the network;
forwarding the at least one key request for each of the lookup requests from the queue register to the packet processor;
storing the host identifier extracted from each lookup request, the host identifier indicating the one of the plurality of hosts originating the lookup request;
maintaining a count of the number of lookup requests per host in a queue register based on the host identifier of each lookup request;
comparing the count for each host against a respective input threshold; and
preventing receipt of additional lookup requests from a given host to the queue register in response to the count for the given host exceeding the respective input threshold.

18. The method of claim 17, further comprising transmitting a command to the given host in response to the request count for the given host exceeding the respective input threshold, the command directing the given host to pause transmission of lookup requests.

19. The method of claim 17, further comprising, in response to the request count for the given host returning below the respective input threshold, enabling receipt of additional lookup requests for the given host.

20. The method of claim 19, further comprising, in response to the request count for the given host returning below the respective input threshold, transmitting a message to the given host, the message indicating to the given host to resume transmission of lookup requests.

21. The method of claim 17, further comprising comparing the request count for each host against a respective input low threshold, the queue manager enabling receipt of additional lookup requests from a given host to the queue register in response to the request count for the given host being below the respective input low threshold.

22. The method of claim 17, wherein the respective input threshold is configurable to distinct values among the plurality of hosts.

23. A method of processing a packet comprising:
receiving, to an output queue, an indication of lookup responses from a packet processor for transmission to a plurality of hosts;
storing a host identifier extracted by a packet header extractor from each lookup request corresponding to the lookup requests, the host identifier indicating the one of the plurality of hosts originating the lookup request, the lookup request indicating a request to the packet processor to determine a path to forward the packet on a network, the lookup responses indicating a result of a comparison between a key extracted from the packets against a set of rules to determine the path to forward the packet on the network;
maintaining a count of a number of lookup responses per host in the output queue based on the host identifier of each lookup request;
comparing the count for each host against a respective output threshold; and
preventing receipt of additional lookup requests from a selected host to the output queue in response to the count for the selected host exceeding the respective output threshold.

24. The method of claim 23, further comprising transmitting a command to the selected host in response to the response count for the selected host exceeding the respective output threshold, the command directing the selected host to pause transmission of lookup requests.

25. The method of claim 23, further comprising, in response to the response count for the selected host returning below the respective output threshold, enabling receipt of additional lookup requests for the selected host.

26. The method of claim 25, further comprising, in response to the response count for the selected host returning below the respective output threshold, transmitting a message to the selected host, the message indicating to the selected host to resume transmission of lookup requests.

27. The method of claim 23, wherein the respective output threshold is configurable to distinct values among the plurality of hosts.

* * * * *